(12) United States Patent
Bailey et al.

(10) Patent No.: US 11,680,464 B2
(45) Date of Patent: Jun. 20, 2023

(54) METHODS AND SYSTEMS FOR RESERVOIR AND WELLBORE SIMULATION

(71) Applicant: Schlumberger Technology Corporation, Sugar Land, TX (US)

(72) Inventors: William J. Bailey, Somerville, MA (US); Hewei Tang, Changchun (CN); Terry Wayne Stone, Kings Worthy (GB)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 246 days.

(21) Appl. No.: 16/707,715

(22) Filed: Dec. 9, 2019

(65) Prior Publication Data

US 2020/0190950 A1 Jun. 18, 2020

Related U.S. Application Data

(60) Provisional application No. 62/777,706, filed on Dec. 10, 2018.

(51) Int. Cl.
*E21B 41/00* (2006.01)
*E21B 43/14* (2006.01)
*E21B 49/00* (2006.01)

(52) U.S. Cl.
CPC .......... *E21B 41/0092* (2013.01); *E21B 43/14* (2013.01); *E21B 49/003* (2013.01); *G01V 2210/663* (2013.01)

(58) Field of Classification Search
CPC combination set(s) only.
See application file for complete search history.

(56) References Cited

U.S. PATENT DOCUMENTS

| | | | |
|---|---|---|---|
| 5,762,149 A * | 6/1998 | Donovan | B04B 1/08 175/40 |
| 9,708,899 B2 | 7/2017 | Prange et al. | |
| 9,816,353 B2 | 11/2017 | Rashid et al. | |
| 2015/0167453 A1* | 6/2015 | Forstner | E21B 47/022 702/11 |
| 2016/0319655 A1* | 11/2016 | Awadh | G05B 19/402 |

OTHER PUBLICATIONS

"ECLIPS reservoir simulation software" (Year: 2014).*
(Continued)

*Primary Examiner* — Catherine T. Rastovski
*Assistant Examiner* — Kaleria Knox
(74) *Attorney, Agent, or Firm* — Jeffrey D. Frantz

(57) ABSTRACT

Methods of exploiting a formation containing a reservoir of hydrocarbons utilize a gas-liquid drift-flux (DF) model for a multi-segmented wellbore (MSW). The DF model is provided for use in conjunction with a reservoir simulator. The DF model is configured to account for pipe inclinations of the MSW between −90° and +90° including horizontal or near-horizontal wellbores in addition to vertical and slanted wellbores. The DF model is based on mixture velocity as opposed to superficial velocities, thereby permitting the DF model to be integrated with reservoir models that utilize mixture velocity. The DF model can also be continuous and differentiable over all primary variables.

19 Claims, 48 Drawing Sheets

(56) References Cited

OTHER PUBLICATIONS

Abdul-Majeed, G. H., "Liquid slug holdup in horizontal and slightly inclined two-phase slug flow," Journal of Petroleum Science & Engineering, 2000, 27(1-2), pp. 27-32.

Al-Safran et al., "Prediction of Slug Liquid Holdup in High Viscosity Liquid and Gas Two-Phase Flow in Horizontal Pipes", J. Petroleum Science & Engineering, Elsevier, Holland, 133, Sep. 2015, pp. 566-575.

Beggs, H.D. and Brill, J.P., "A Study of Two-Phase Flow in Inclined Pipes", J. Petroleum Technology, Tans., AIME, 25, No. 5, May 1973, pp. 607-617.

Bendiksen, K. H., "An experimental investigation of the motion of long bubbles in inclined tubes," International Journal of Multiphase Flow, 1984, 10(4), pp. 467-483.

Ben-Mansour, R. et al., "Effect of Pipe Diameter and High Oil Viscosity on Drift Velocity for Horizontal Pipes," presented at the 7th North American Conference on Multiphase Flow Technology, Banff, Canada, 2010, pp. 237-248.

Bhagwat, S. M. et al., "A flow pattern independent drift flux model based void fraction correlation for a wide range of gas-liquid two phase flow," International Journal of Multiphase Flow, 2014, 59, pp. 186-205.

Bhagwat, S. M. et al., "An Empirical Model to Predict the Transition Between Stratified and Nonstratified Gas-Liquid Two-Phase Flow in Horizontal and Downward Inclined Pipes," Heat Transfer Engineering, 2015, 36(18), pp. 1485-1494.

Bhagwat, S. M. et al., "Similarities and differences in the flow patterns and void fraction in vertical upward and downward two phase flow," Experimental Thermal and Fluid Science, 2012, 39, pp. 213-227.

Bond, W. N.,"The Viscosity of Air," Proceedings of the Physical Society, 1937, 49(3), pp. 205-213.

Choi, J. et al., "An Efficient Drift-Flux Closure Relationship to Estimate Liquid Holdups of Gas-Liquid Two-Phase Flow in Pipes," Energies, 2012, 5(12), pp. 5295-5306.

Cioncolini, a., "Void fraction prediction in annular two-phase flow", Journal of Multiphase Flow, 43, Jul. 2012, pp. 72-84.

Colebrook, C. F. et al., "Experiments with Fluid Friction in Roughened Pipes," Proceedings of the Royal Society Series A: Math. Phys. Sci., London, UK, 1937, 161(906), pp. 367-381.

Colebrook, C.F.: "Turbulent Flow in Pipes with particular reference to the Transition Region between Smooth and Rough Pipe Laws," Journal of Institute of Civil Engineering, London, UK, 11, 1938/1939, pp. 133-156.

Eghorieta, R. A. et al., "Drift flux modeling of transient high-viscosity-liquid and gas two-phase flow in horizontal pipes," Journal of Petroleum Science & Engineering, 2018, 171, pp. 605-617.

Froude, W., "On the Rolling of Ships", Parker, Son and Bourn, West Strand, London, UK, 1862, 52 pages.

Ghajar, A. J. et al., "Gas-Liquid Two Phase Flow Phenomenon in Near Horizontal Upward and Downward Inclined Pipe Orientations," International Journal of Mechanical, Aerospace, Industrial, Mechatronic and Manufacturing Engineering, 2014, 8(6), pp. 1091-1053.

Harmathy, T.Z., "Velocity of Large Drops and Bubbles in Media of Infinite and Restricted Extent," AlChE Journal, 1960, 6(2), pp. 281-288.

Hasan, A. R. et al.,"A Simplified Model for Oil/Water Flow in Vertical and Deviated Wellbores," SPE-54131-PA, SPE Production & Facilities, 1999, 14(1), pp. 56-62.

Holmes, J. A., "Description of the Drift Flux Model in the LOCA code RELAP-UK," Institute of Mechanical Engineers, UK, 1977, pp. 103-108.

Sao, K. et al., "Drift flux model for large diameter pipe and new correlation for pool void fraction," International Journal of Heat & Mass Transfer, 1987, 30(9), pp. 1927-1939.

Jeyachandra et al., "Inclination Effects on Flow Characteristics of High Viscosity Oil/Gas Two Phase Flow", paper SPE 159217, presented at the SPE Annual Technical Conference & Exhibition, San Antonio, TX, Oct. 8-10, 2012, 10 pages.

Jeyachandra, B. C. et al., "Drift-Velocity Closure Relationships for Slug Two-Phase High-Viscosity Oil Flow in Pipes," paper SPE-151616-PA, SPE Journal, 2010, 17(2), Jun. 2012, pp. 593-601.

Jiang, Y.: "Techniques for Modeling Complex Reservoirs and Advanced Wells," PhD thesis, Department of Petroleum Engineering, Stanford University, California, USA, 2008, 220 pages.

Landman, M. J., "Non-Unique Holdup and Pressure Drop in Two-Phase Stratified Inclined Pipe Flow," International Journal of Multiphase Flow, 1991, 17(3), pp. 377-394.

Li, Y., Bailey, W.J., Rashid, K., Cou¨et, B., Shippen, M.E. and Holmes, J.A.: "Optimized Parameters and Extension of a 2-Phase Flow-Regime-Independent Flow Model," paper #39, Proc., Hunt, Alex P. (Ed.), 15th International Conference on Multiphase Technology, Cannes, France. BHR Group Limited, Cranfield, Bedfordshire, UK, Jun. 15-17, 2011, pp. 225-239.

Livescu, S., Durlofsky, L.J., Aziz, K. and Ginestra, J.C.: "A Fully-Coupled Thermal Multiphase Wellbore Flow Model for Use in Reservoir Simulation," Journal Petroleum Science & Engineering, 71, Nos. 3-4, Apr. 2010, pp. 138-146.

Peng, D.-Y. and Robinson, D.B.: "A New Two-Constant Equation of State," Industrial & Engineering Chemistry Fundamentals, 15, No. 1, Feb. 1976, pp. 59-64.

Reynolds, O.: "An Experimental Investigation of the Circumstances Which Determine Whether the Motion of Water Shall Be Direct or Sinuous, and of the Law of Resistance in Parallel Channels," Philosophical Transactions of the Royal Society, 174, 1883, pp. 935-982.

Shi, H., Holmes, J.A., Durlofsky, L.J., Aziz, K., Diaz, L.R., Alkaya, B. and Oddie, G.: "Drift-Flux Modeling of Two-Phase Flow in Wellbores," paper SPE-84228-PA, Spe Journal, 10, No. 1, Mar. 2005, pp. 24-33. Originally presented at the SPE Annual Technical Conference & Exhibition, Denver, CO, Oct. 5-8, 2003.

Shi, H., Holmes, J.A., Durlofsky, L.J., Aziz, K., Diaz, L.R., Alkaya, B. and Oddie, G.: "Drift-Flux Parameters for Three-Phase Steady-State Flow in Wellbores," paper SPE-89836-PA, SPE Journal, 10, No. 2, Jun. 2005, pp. 130-137. Originally presented at the SPE Annual Technical Conference & Exhibition, Houston, TX, Sep. 26-29, 2004.

Stone, T., Damas, C.E.P., Woiceshyn, G., Law, D. H-S., Brown, G., Olapade, P. and Bailey, W.J.: "Advanced Wellbore Simulation of Flow Control Devices with Feedback Control for Thermal Operations," paper SPE-163594, presented at the SPE Reservoir Simulation Symposium, The Woodlands, TX, Feb. 18-20, 2013.

Tang, H., Chai, Z. and Killough, J.: "Application of Multi-Segmented Well Modelling to Simulate Well Interference," URTeC: 2668100, Society of Exploration Geophysicists (SEG), Proc., Unconventional Resources Technology Conference, Austin, TX, Jul. 24-26, 2017, 11 pages.

Tang, H., Hasan, A.R. and Killough, J.: "Development and Application of a Fully Implicitly Coupled Wellbore/Reservoir Simulator to Characterize the Transient Liquid Loading in Horizontal Gas Wells," paper SPE-187354-PA, SPE Journal, 23, 2018, pp. 1615-1629. Originally presented at the Annual Technical Conference & Exhibition of the SPE, San Antonio, TX, Oct. 9-11, 2017.

Tang, H.: "Development and Application of a Fully Implicitly Coupled Wellbore-Reservoir Simulator," PhD thesis, Department of Petroleum Engineering, Texas A&M University, 2019, 182 pages.

Wallis, G. B. et al., "The Hanging Film Phenomenon in Vertical Annular Two-Phase Flow," Journal of Fluids Engineering, Transactions of the ASME, Series I, 1974, 96(3), pp. 297-298.

Woldesemayat, M. A. et al., "Comparison of void fraction correlations for different flow patterns in horizontal and upward inclined pipes," International Journal of Multiphase Flow, 2007, 33(4), pp. 347-370.

Yan, B.: "Development of General unstructured Reservoir Utility and Fracture Reservoir Modeling," PhD Dissertation, Department of Petroleum Engineering, Texas A&M University, May 2017, 214 pages.

Zuber, N. and Findlay, J.A.: "Average Volumetric Concentration in Two-Phase Flow Systems," Journal of Heat Transfer, Trans. ASME, 26, No. 3, Nov. 1965, pp. 453-468.

(56) References Cited

OTHER PUBLICATIONS

Zukoski, E.E.: "Influence of Viscosity, Surface Tension, and Inclination Angle on Motion of Long Bubbles in Closed Tubes," Journal of Fluid Mechanics, Trans. ASME, 25, No. 4, Aug. 1966, pp. 821-837.
Shippen, M. and Bailey, W.J.: "Steady State Multiphase Flow—Past, Present and Future with Flow Assurance Perspective," in special issue of ACS Publications titled 'Upstream Engineering and Flow Assurance' (UEFA). Energy & Fuels, 26, No. 7, Jul./Aug. 2012, pp. 4145-4157. Originally presented at the AIChE Upstream and Flow Assurance Forum, Houston, TX, Apr. 1-4, 2012.
Al-Safran, E.M., Kora, C. and Sarica, C.: Prediction of Liquid Volume Fraction in Slugs in Two-Phase Horizontal Pipe Flow with High Viscosity Liquid, paper BHR-2013-H4, BHR Group, Proc. 16th International Conference on Multiphase Production Technology, Cannes, France, Jun. 12-14, 2013, pp. 415-428.
Kataoka, I. and Ishii, M.: "Drift Flux Model for Large Diameter Pipe and New Correlation for Pool Void Fraction," International Journal of Heat & Mass Transfer, 30, 1987, pp. 1927-1939.
Weber, M.E.: "Drift in Intermittent Two-Phase Flow in Horizontal Pipes," Canadian Journal of Chemical Engineering, 59, No. 3, Jun. 1981, pp. 398-399.
Xu, Z., Song, X., Li, G., Wu, K., Pang, Z. and Zhu, Z.: "Development of a Transient Non-Isothermal Two-Phase Flow Model for Gas Kick Simulation in HTHP Deep Well Drilling," Applied Thermal Engineering, 141, Aug. 2018, pp. 1055-1069.
Yildirim, G.: "Computer-Based Analysis of Explicit Approximations to the Implicit Colebrook-White Equation in Turbulent Flow Friction Factor Calculation," Advances in Engineering Software, 40, No. 11, Nov. 2009, pp. 1183-1190.

* cited by examiner

FIG. 11(a)(iii)

FIG. 11(a)(ii)

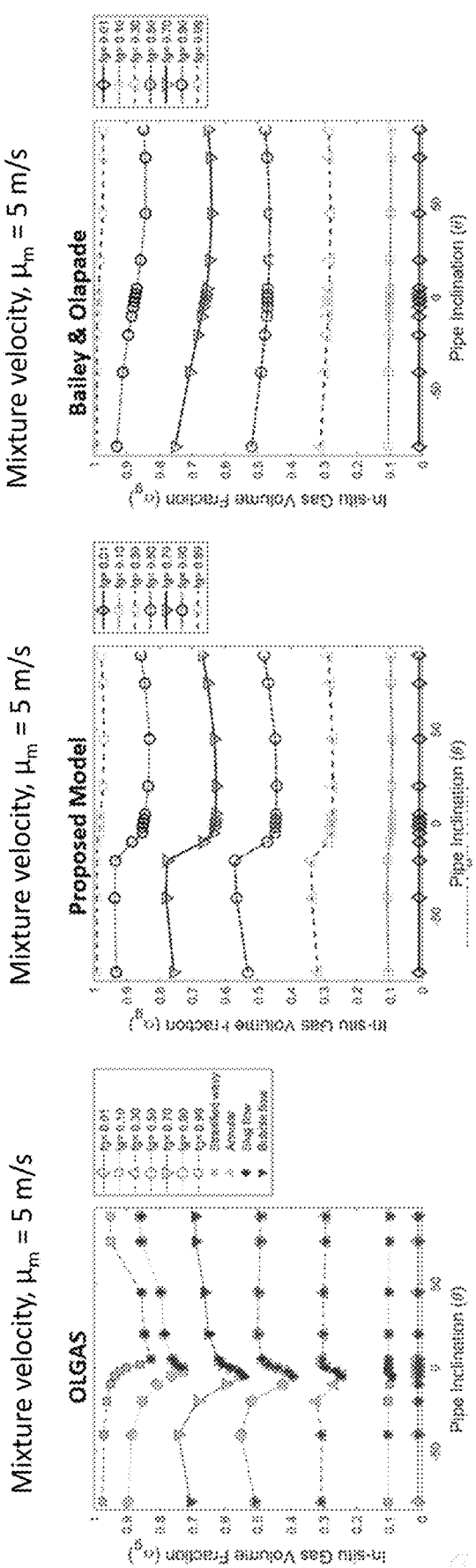
FIG. 11(b)(i)  FIG. 11(b)(ii)  FIG. 11(b)(iii)

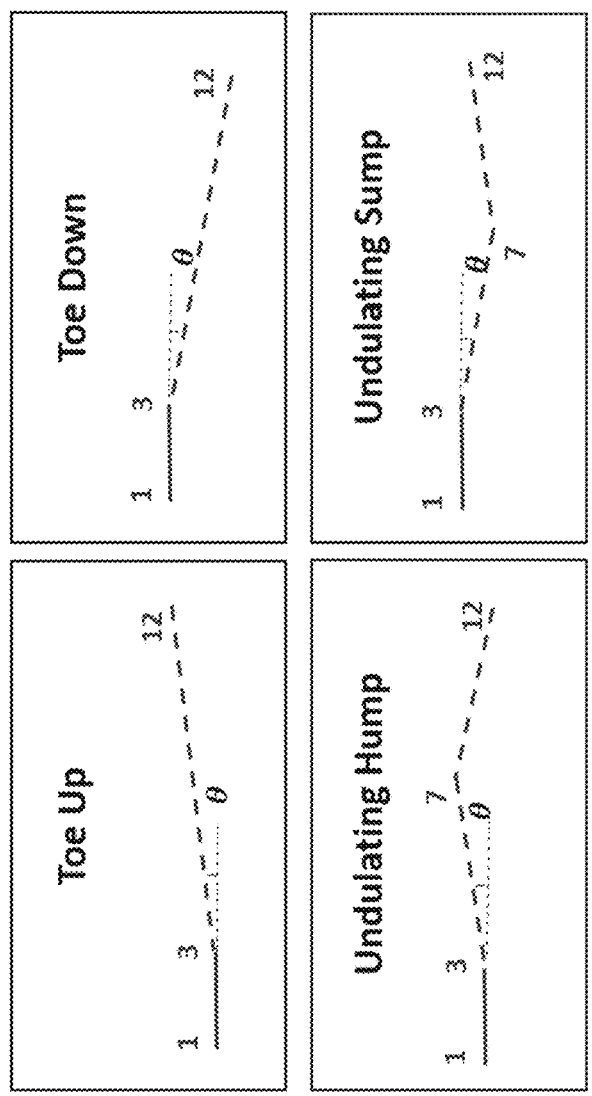
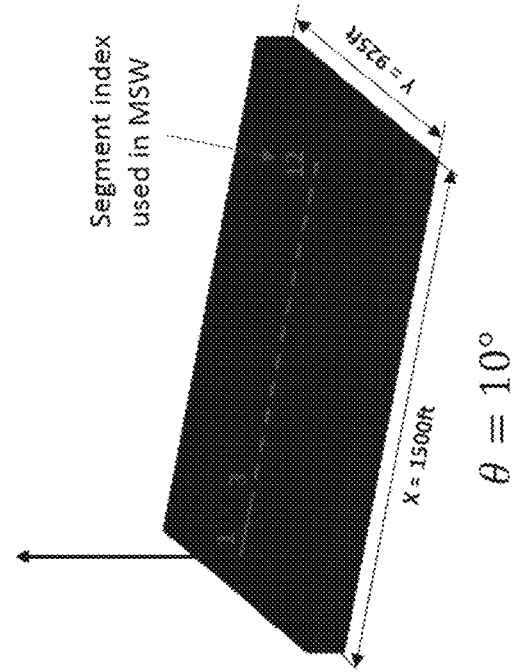
FIG. 21

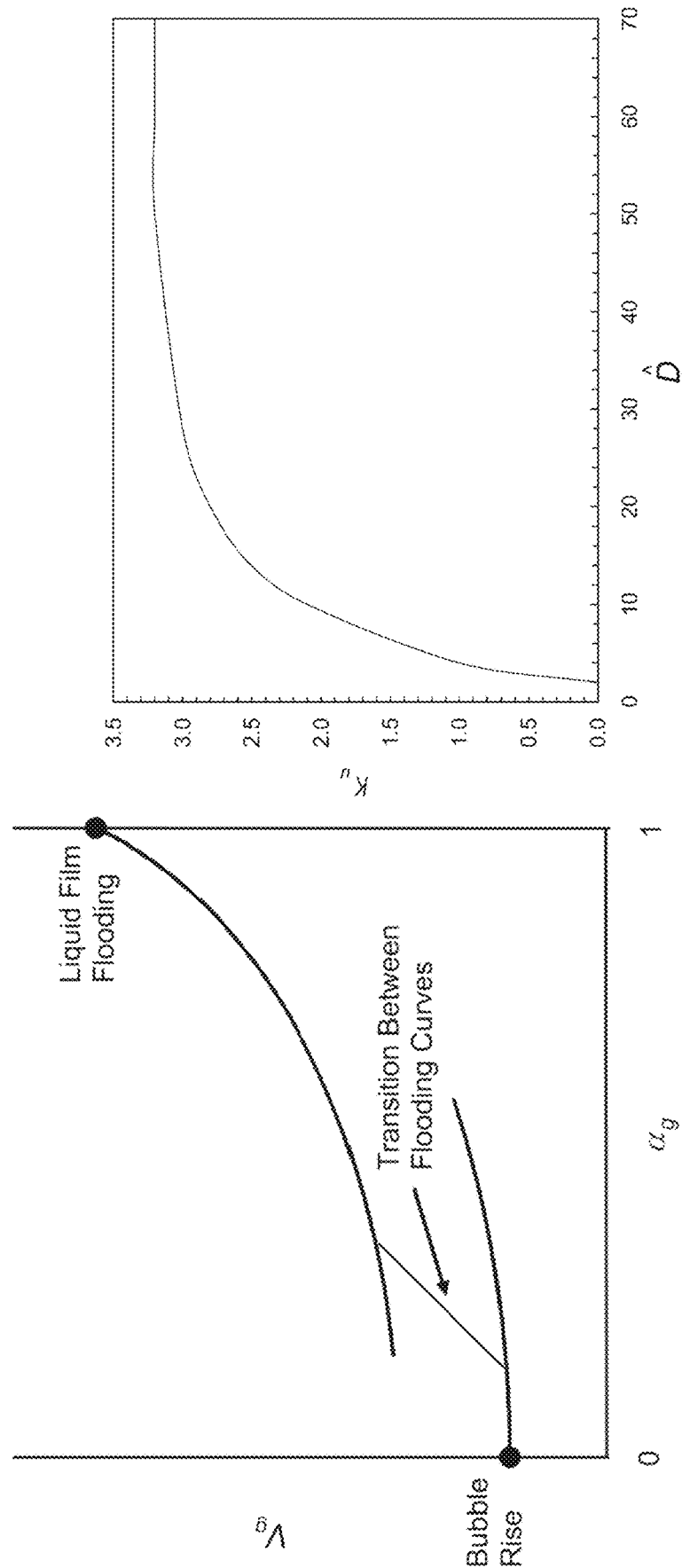

METHODS AND SYSTEMS FOR RESERVOIR AND WELLBORE SIMULATION

CROSS-REFERENCE TO RELATED APPLICATION(S)

This disclosure claims priority from U.S. Provisional Appl. No. 62/777,706, filed on Dec. 10, 2018, entitled "Methods and Systems for Optimizing Hydrocarbon Production from Reservoirs Subject to Horizontal Drilling, "herein incorporated by reference in its entirety.

FIELD

This disclosure relates to the hydrocarbon industry and petroleum reservoir engineering. In particular, this disclosure relates to methods and systems for simulating fluid flow in a reservoir and connected wellbore(s).

BACKGROUND

In order to maximize the return on investment in exploiting a hydrocarbon reservoir, information regarding the spatial distribution of reservoir fluid properties over the volume of the reservoir, information regarding a completion and associated wellbore that traverses the reservoir can be obtained by various means, and such information can be fed to a reservoir simulator which models and predicts the multi-phase fluid flow between the reservoir and the wellbore and through the wellbore over time. By way of example, reservoir fluid properties may include volume fractions or mass fractions of constituent gaseous and liquid hydrocarbon components and water, viscosity and fluid density of these components, and reservoir pressure and reservoir temperature. Also, by way of example, the information fed to the simulator may include information describing the number and location of connections between the reservoir and the wellbore, information describing location and operation of flow control devices, such as chokes and valves, labyrinth devices, and downhole separators, between the reservoir and the wellbore, and information describing the geometry of the wellbore. One function of the reservoir simulator is to help determine completion strategies and associated parameters (e.g., locations and settings of flow control valves, production pressure, etc.) that will help maximize/optimize the production of hydrocarbon fluids from the reservoir. See, e.g., co-owned U.S. Pat. No. 9,816,353 to Rashid et al., and co-owned U.S. Pat. No. 9,708,899 to Prange et al., both of which are hereby incorporated by reference herein in their entireties. Real-world implications of properly and optimally completing and exploiting a hydrocarbon reservoir can amount differences of hundreds of millions of dollars of revenue.

One known state-of-the-art reservoir simulator is the ECLIPSE simulator of Schlumberger, which is described in the reference manual available at www.ipt.ntnu.no/~kleppe/TPG4150/EclipseReferenceManual.pdf, which is hereby incorporated by reference in its entirety. The ECLIPSE simulator utilizes a drift-flux model developed by John Holmes that simulates upward fluid flow within a multi-segmented wellbore. This drift-flux model is described in Holmes, J. A.: "Description of the Drift-Flux Model in the LOCA Code RELAP-UK," *Institute of Mechanical Engineers*, UK, pp. 103-108 (1977), which is hereby incorporated by reference herein in its entirety. Upward flow here refers to any flow in a conduit inclined (from horizontal, which is defined as being at 0° degrees) from approximately +2° (near-horizontal to pure upwards vertical flow (defined as +90°).

While the ECLIPSE simulator with the drift-flux model of Holmes is very useful, the drift-flux model is undefined for horizontal, near-horizontal, and downward flow; i.e., it is undefined in the range of $-90°\leq\theta\leq+2°$ (the negative sign denotes downward flow). Accordingly, when a multi-segmented wellbore (MSW) has one or more segments that are expected to have an inclination in this 'undefined' range, the ECLIPSE simulator may still function to provide valuable results through application of the homogeneous flow (no-slip) assumption, but the computations may take much longer to converge than otherwise, and the answer forthcoming may be less accurate. In particular, friction drops in horizontal wells impact production, and the porpoising of the horizontal well that often results from a horizontal well drilling can have the side-effect that water can accumulate at various points along the well, thereby impacting the accuracy of the simulation and the resulting predicted hydrocarbon production. These accumulations are particularly prevalent at any "sump" that may exist in the wellbore. Note that horizontal wells are rarely, if ever, perfectly horizontal but rather have very slight undulations thereby giving rise to potential sumps which act as water traps for water accumulation (a phenomenon known as water loading).

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This subject disclosure relates to methods and systems that define completion and/or production parameters for wells used to exploit a hydrocarbon-containing formation. A reservoir simulator incorporates a gas-liquid drift-flux (DF) model that accounts for pipe inclinations between -90° and +90° of a multi-segmented wellbore (MSW), thereby permitting accurate modelling of horizontal or near-horizontal wellbores (in addition to vertical and slanted wellbores). The DF model allows users to specify segments of the MSW with pipe inclinations in the range between -90° and +90°. In the manner, users can specify segments of the MSW that experience upward flow where the inclination angle of adjacent segments is between +90° and +10° (e.g., Toe Up configuration). Users can also specify segments of the MSW that experience downward flow where the inclination angle of adjacent segments is between -90° and -10° (e.g., Toe Down configuration). Users can also specify segments of the MSW that experience upward to downward flow, for example, where the inclination angle of adjacent segments goes from +10° and -10° (e.g., Undulating Hump configuration). Users can also specify segments of the MSW that experience downward to upward flow, for example, where the inclination angle of adjacent segments goes from -10° and +10° (e.g., Undulating Sump configuration). The DF model also allows the reservoir simulator to effectively and efficiently model (and solve for) fluid flow into and through the MSW for all of these conditions as specified by user(s).

In embodiments, the DF model relates drift velocity to mixture velocity, which is the average velocity of the gas phase and the liquid phase. In this case, the average velocity refers to average velocity over the cross-sectional area with gas-phase slippage considered (with respect to the liquid mixture phase). The drift velocity accounts for local slip between the gas and liquid phases. The DF model is based on mixture velocity as opposed to superficial velocities, thereby permitting the DF model to be integrated with reservoir models that utilize mixture velocity where the superficial conduit velocities are not known.

In embodiments, the DF model is continuous and differentiable over all primary variables, and is applicable for all stated pipe inclinations.

In one embodiment, the DF model for two phase flow (e.g., gas phase and liquid hydrocarbon phase) is defined according to $$u_{dr}^\theta = (m_1\{u_{dr}^V\}\sin\theta + M_2\{u_{dr}^H\}\cos\theta) \times M_3 \qquad \text{Eqn. (0.1)}$$

where $u_{dr}^\theta$ is the drift velocity as a function of inclination angle $\theta$ for any inclination angle $\theta$ in the stated range (−90° to +900), $u_{dr}^V$ and $u_{dr}^H$ are vertical and horizontal drift velocities, respectively, $m_1$ is a multiplier or coefficient that is fitted through optimization and applied to the vertical drift velocity component $u_{dr}^V$, $M_2$ is a multiplier or coefficient that is fitted through optimization and applied to the horizontal drift velocity component $u_{dr}^H$ and corrects for transition at horizontal (i.e., $\theta=0°$), and $M_3$ is a multiplier or coefficient that is fitted through optimization and applied to contributions from both the vertical drift velocity component $u_{dr}^V$ and the horizontal drift velocity component $u_{dr}^H$ and compensates for divergence when the mixture velocity is below a predefined threshold criterion, such as $u_m \leq 1$ m/s.

In embodiments, the vertical drift velocity component $u_{dr}^V$ can be defined according to:

$$u_{dr}^V = \frac{(1-\alpha_g C_0)C_0 N_{Ku}(\alpha_g)u_{ch}}{\alpha_g C_0 \sqrt{\frac{\rho_g}{\rho_L}} + 1 - (\alpha_g C_0)} \qquad \text{Eqn. (0.2)}$$

where $\alpha_g$ is the void fraction of the gas phase (typically provided by the reservoir simulator as $f_g$), $N_{Ku}$ is the critical Kutateladze number, $u_{ch}$ is a characteristic velocity, $\rho_g$ is the density of the gas phase, $\rho_L$ is the density of the liquid phase, and $C_0$ is a profile parameter.

In embodiments, the horizontal drift velocity component $u_{dr}^H$ can be defined according to:

$$u_{dr}^H = \sqrt{gD}\left(\xi_1 - \xi_2\left[\frac{(N_\mu)^{\xi_3}}{(N_{E\ddot{o}})^{\xi_4}}\right]\right)\alpha_g(1-\alpha_g) \qquad \text{Eqn. (0.3)}$$

where g is the gravity constant, D is the diameter the conduit, $\xi_1$, $\xi_2$, $\xi_3$, and $\xi_4$ are horizontal flow parameters fitted through optimization against data, $N_\mu$ is a viscosity number, and $N_{E\ddot{o}}$ o an Eötvös number (also known as the 'Bond' number).

In embodiments, the multiplier $M_2$ can be based on mixture velocity $u_m$ and the inclination angle $\theta$, for example, according to:

$$M_2 = \left[1 - \frac{2}{1+\exp[50\sin(\theta+m_2 u_m)]}\right] \qquad \text{Eqn. (0.4)}$$

where $m_2$ is a fitted parameter. This function is essentially a "logistic function" with the primary intention of better defining the complex phase transition near horizontal flow (both upwards and downwards).

In embodiments, the multiplier $M_3$ can be based on the mixture Reynold's number $(N_{Re})_m$, for example, according to:

$$M_3 = \left[1 + \frac{1000}{(N_{Re})_m + 1000}\right]^{m_3}, \qquad \text{Eqn. (0.5)}$$

where $m_3$ is a fitted parameter. The severity of the phase transition around horizontal was also found to be sensitive to mixture velocity. This term based on Reynolds number accounts for this.

According to aspects, equation (0.1) is a general equation. Thus, is will be appreciated that $m_1$ is generally equal to 1, but could be selected differently for specific hydrocarbons being produced. Based on equation (0.1), it will be appreciated that where the well segment is vertical, cos $\theta=0$, and the second term of the sum goes to zero, thereby reducing equation (0.1) to a modification (accounting for flow velocity) of the prior art equation of J. A. Holmes (previously referenced). On the other hand, when the well segment is horizontal or nearly horizontal, sin $\theta$ equals, or approaches zero, thereby reducing equation (0.1) to a modification (accounting for flow velocity) of the horizontal drift velocity with the logistic function multiplier $M_2$ that corrects for transition at the horizontal. As a result, the DF model of equation (0.1) is shown to be continuous and differentiable over all primary variables, and is applicable for all pipe inclinations in the stated range.

In one aspect, the reservoir simulator that incorporates a DF model according to equation (0.1) can be extended to support three-phase flow (a gas phase, a liquid hydrocarbon phase, and a water phase) by treating three-phase flow as a two-phase (gas-liquid) flow with average properties for the liquid phase; computing the two-phase volume fractions applying the presented model; and computing oil and water volume fractions within the liquid phase by applying the existing MSW drift-flux oil-water model without any modification. In this case, the methodology essentially assumes no slippage between the oil and liquid phases—hence average refers to no-slip in the liquid phase such that the average property calculation is trivial.

In embodiments, a reservoir simulator incorporating the DF model defined according to equation (0.1) can be used to aid in determining drilling and/or completion strategies and associated parameters (e.g., locations and settings of flow control valves, production pressure, etc.) that will help maximize/optimize the production of hydrocarbon fluids from the reservoir.

For example, the reservoir simulator can be used in determining locations that define a drilling path for drilling one or more multi-segmented-wellbores in a formation containing a hydrocarbon reservoir and a completion for the MSW. Thus, a proposed drilling path or drilling paths with defined segments, and components and parameters of the completion such as valves, pressures, etc., are specified in the reservoir simulator, and the simulator is run to perform a predictive simulation of the oilfield and provide expected production outputs over a specified timeframe. Changes are then made to the drilling path(s), and/or the completion automatically, or through operator intervention, and the reservoir simulator may be run again with the changed inputs. The outputs of the model simulate production from the reservoir over a specified timeframe. The outputs may be evaluated to optimize the return on investment. When a desired solution is obtained, the formation is drilled accordingly.

In another example, once a formation has been drilled, the reservoir simulator can be used to optimize production of hydrocarbons in the formation. Thus, the geometry of the wellbore as well as components and parameters of the completion and optionally, the well rate, are specified in the reservoir simulator (that incorporates the DF model), and the simulator is run to perform a predictive simulation of production from the oilfield and provide expected production outputs over a specified timeframe. Changes are then made to the components and parameters of the completion, or well rates, automatically, or through operator intervention and the reservoir simulator may be run again with the changed inputs. When a desired solution is obtained, a completion is conducted with the components and parameters specified by the solution. At any time during production, additional information obtained from the formation may be entered into the reservoir simulator to update the reservoir simulator, and the model may be rerun to obtain results that may be used to modify the components and parameters of the completion.

BRIEF DESCRIPTION OF DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein:

FIGS. 11(b)(i) to (iii) are plots generated using OLGA-S data, the proposed model and the Bailey & Olapade model showing in situ gas volume fraction, $\alpha_g$, against inclination angle, $\theta$, for different input gas fractions, $f_g$. The mixture velocity $u_m=5$ m/s.

FIG. 13(a) is the cross-plot for the proposed model with the $X_{opt.}^{TUFFP}$ parameter set. FIG. 13(b) is the cross-plot for the proposed model with the $X_{opt.}^{OLGA-S}$ parameter set. FIG. 13(c) is the cross-plot for Choi's model. FIG. 13(d) is the cross-plot for the B&G's model. The subscript "opt" denotes that parameter fitting has been optimized. The superscript (TUFFP or OLGA-S) denotes the data set used to tune these parameters. Notat that two very different data sets were used: OLGA-S and TUFFP, as described herein.

FIG. 14(a) is the cross-plot for the proposed model with the $X_{opt.}^{TUFFP}$ parameter set. FIG. 14(b) is the cross-plot for the proposed model with the $X_{opt.}^{OLGA-S}$ parameter set. FIG. 14(c) is the cross-plot for Choi's model. FIG. 14(d) is the cross-plot for the B&G's model.

FIG. 15(a) is the cross-plot for the proposed model with the $X_{opt.}^{TUFFP}$ parameter set. FIG. 15(b) is the cross-plot for the proposed model with the $X_{opt.}^{OLGA-S}$ parameter set. FIG. 15(c) is the cross-plot for Choi's model. FIG. 15(d) is the cross-plot for the B&G's model.

FIG. 16(a) is the cross-plot for the proposed model with the $X_{opt.}^{TUFFP}$ parameter set. FIG. 16(b) is the cross-plot for the proposed model with the $X_{opt.}^{OLGA-S}$ parameter set. FIG. 16(c) is the cross-plot for Choi's model. FIG. 16(d) is the cross-plot for the B&G's model.

FIG. 21 is a schematic diagram illustrating a multi-segmented wellbore (MSW) as well as four configurations for the segments of the multi-segmented wellbore (MSW) with varying inclination angle orientations.

FIG. 23(a) shows the void fraction predicted by the OLGA-S model for various input gas fractions where $u_m = 1$ m/s. FIG. 23(b) shows the void fraction predicted by the proposed model for various input gas fractions where $u_m = 1$ m/s. FIG. 23(c) shows the void fraction predicted by the OLGA-S model for various input gas fractions where $u_m = 5$ m/s. FIG. 23(d) shows the void fraction predicted by the proposed model for various input gas fractions where $u_m = 5$ m/s.

FIG. 25(a) is a plot that shows gas rise velocity in a stagnant liquid column against $\alpha_g$.

FIG. 25(b) is a plot of the intermediate Kutateladze number, $N_{Ku}$, as a function of $\hat{D}$.

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Figure 1:
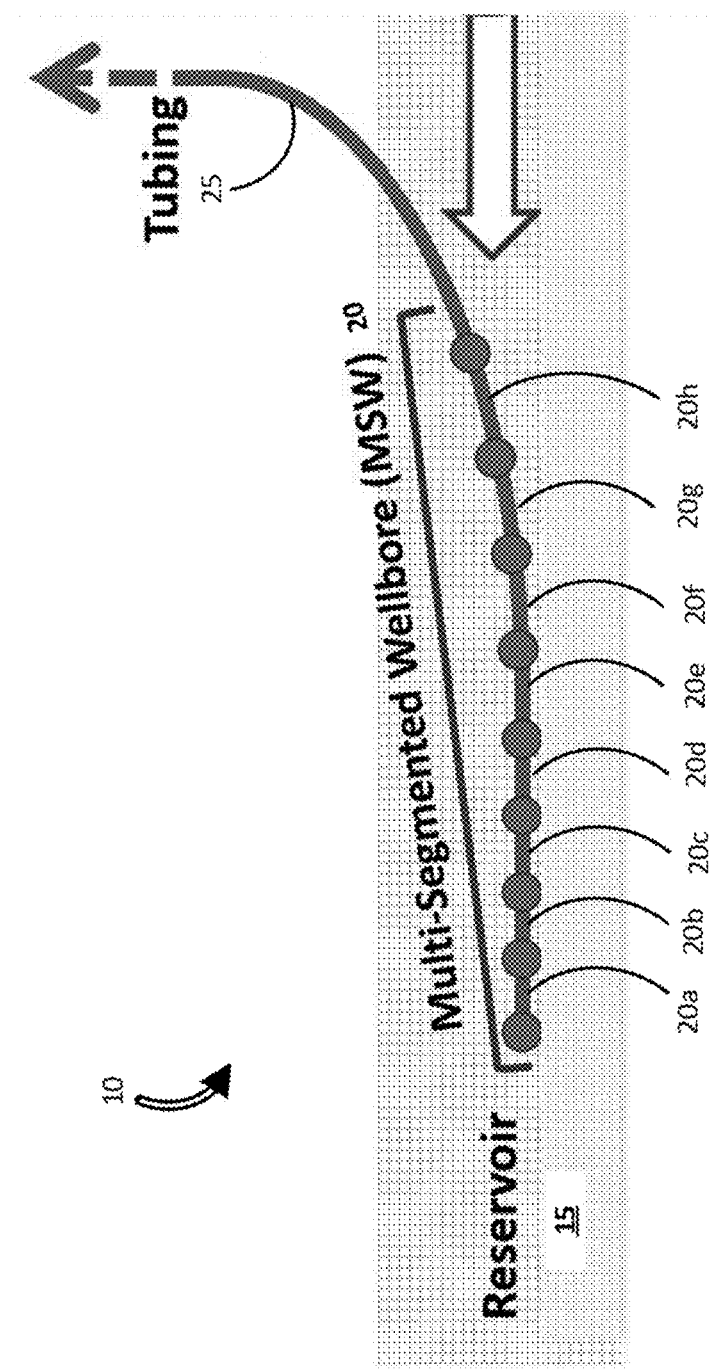
FIG. 1 is a diagram of components associated with simulator-to-flowline modelling.

In FIG. 1, a formation 10 having a hydrocarbon reservoir 15 is shown. The formation 10 can be modeled by a formation/reservoir simulator (discussed below with reference to FIG. 2). According to one aspect, the reservoir simulator can include simulation of a multi-segmented wellbore (MSW) 20 that extends into the hydrocarbon reservoir. The MSW may include horizontal segments 20a, 20b, 20c, 20d, substantially horizontal segments (which is defined herein to be within two degrees of the horizontal) 20f, negatively angled segments with inclination angles between −2 and −90° (not shown), and positively angled segments 20g, 20h with inclination angles between +2 and +90 degrees. The reservoir simulator may also be coupled or integrated to a flowline simulator that simulates flow in vertical tubing 25.

According to some embodiments, the hydrocarbon reservoir 15 of the formation 10 may be exploited by gathering information regarding the formation (via all available sources, including logging of boreholes in the formation, geological surveys, etc.), providing such information to a reservoir simulator (as discussed hereinafter with reference to FIG. 2) that incorporates a gas-liquid drift-flux (DF) model, and running the reservoir simulator to generate a solution that predicts multi-phase fluid flow between the reservoir and the wellbore and through the wellbore over time. The solution can be used to aid in determining drilling and/or completion strategies and associated parameters (e.g., locations and settings of flow control valves, production pressure, etc.) that will help maximize/optimize the production of hydrocarbon fluids from the reservoir.

For example, the reservoir simulator can be used in determining locations that define a drilling path for drilling one or more multi-segmented-wellbores in a formation containing a hydrocarbon reservoir and a completion for the MSW. Thus, a proposed drilling path or drilling paths with defined segments, and components and parameters of the completion such as valves, pressures, etc., are specified in the reservoir simulator, and the simulator is run to perform a predictive simulation of the oilfield and provide expected production outputs over a specified timeframe. Changes are then made to the drilling path(s), and/or the completion automatically, or through operator intervention, and the reservoir simulator may be run again with the changed inputs. The outputs of the model simulate production from the reservoir over a specified timeframe. The outputs may be evaluated to optimize the return on investment. When a desired solution is obtained, the formation is drilled accordingly.

In another example, once a formation has been drilled, the reservoir simulator can be used to optimize production of hydrocarbons in the formation. Thus, the geometry of the wellbore as well as components and parameters of the completion and optionally, the well rate, are specified in the reservoir simulator (that incorporates the DF model), and the simulator is run to perform a predictive simulation of production from the oilfield and provide expected production outputs over a specified timeframe. Changes are then made to the components and parameters of the completion, or well rates, automatically, or through operator intervention and the reservoir simulator may be run again with the changed inputs. When a desired solution is obtained, a completion is conducted with the components and parameters specified by the solution. At any time during production, additional information obtained from the formation may be entered into the reservoir simulator to update the reservoir simulator, and the model may be rerun to obtain results that may be used to modify the components and parameters of the completion.

The use of the DF model as part of the reservoir simulator allows users to specify segments of the MSW with pipe inclinations in the range between −90° and 90°. In the manner, users can specify segments of the MSW that experience upward flow where the inclination angle of adjacent segments is between +90° and +10° (e.g., the Toe Up configuration of FIGS. 2 and 21). Users can also specify segments of the MSW where the inclination angle of adjacent segments is between −90° and −10° (e.g., the Toe Down configuration of FIGS. 2 and 21) thereby resulting in downward flow. Users can also specify segments of the MSW where the inclination angle of adjacent segments goes from +10° and −10° (e.g., the Undulating Hump configuration of FIGS. 2 and 21) thereby resulting in upward to downward flow. Users can also specify segments of the MSW where the inclination angle of adjacent segments goes from −10° and +10° (e.g., the Undulating Sump configuration of FIGS. 2 and 21) thereby resulting in downward to upward flow. The DF model allows the reservoir simulator to effectively and efficiently model (and solve for) fluid flow into and through the MSW for all of these conditions as specified by user(s).

In embodiments, the DF model relates drift velocity to mixture velocity, which is the average velocity of the gas phase and the liquid phase. The drift velocity accounts for local slip between the gas and liquid phases. The DF model is based on mixture velocity as opposed to superficial velocities, thereby permitting the DF model to be integrated with reservoir models that utilize mixture velocity.

In embodiments, the DF model can be continuous and differentiable over all primary variables, and can be applicable for pipe inclinations of the MSW in the range between −90° and +90°.

Figure 2:
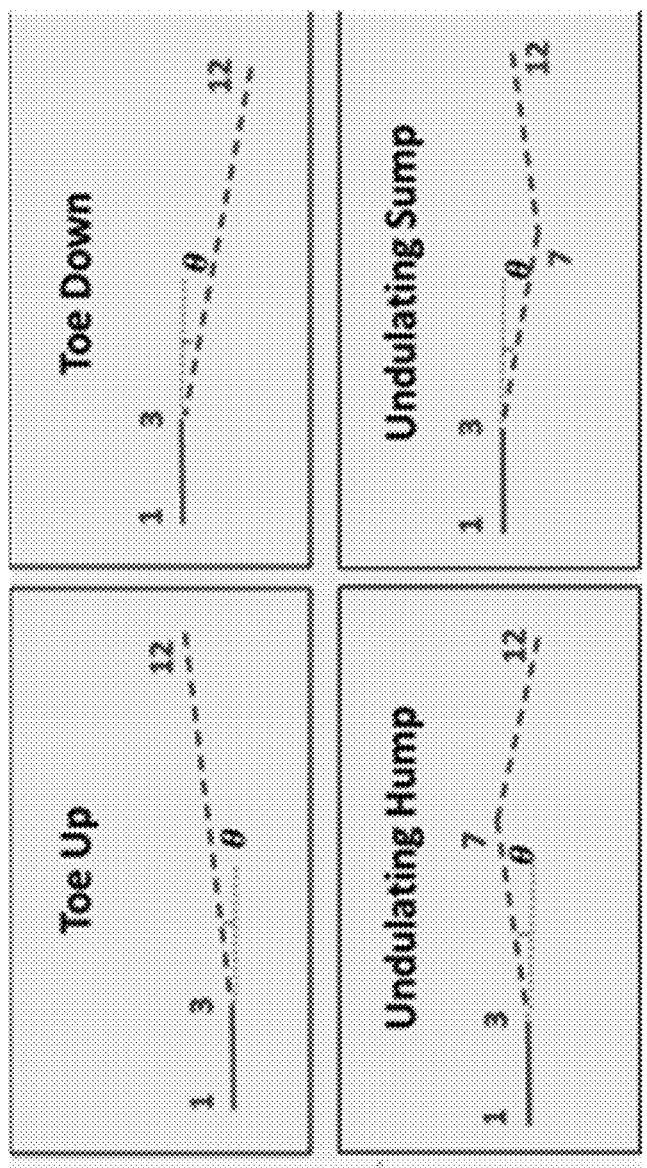
FIG. 2 is a diagram of four configurations of the multi-segmented wellbore (MSW) of FIG. 1, with varying inclination angle orientations.
Figure 3:
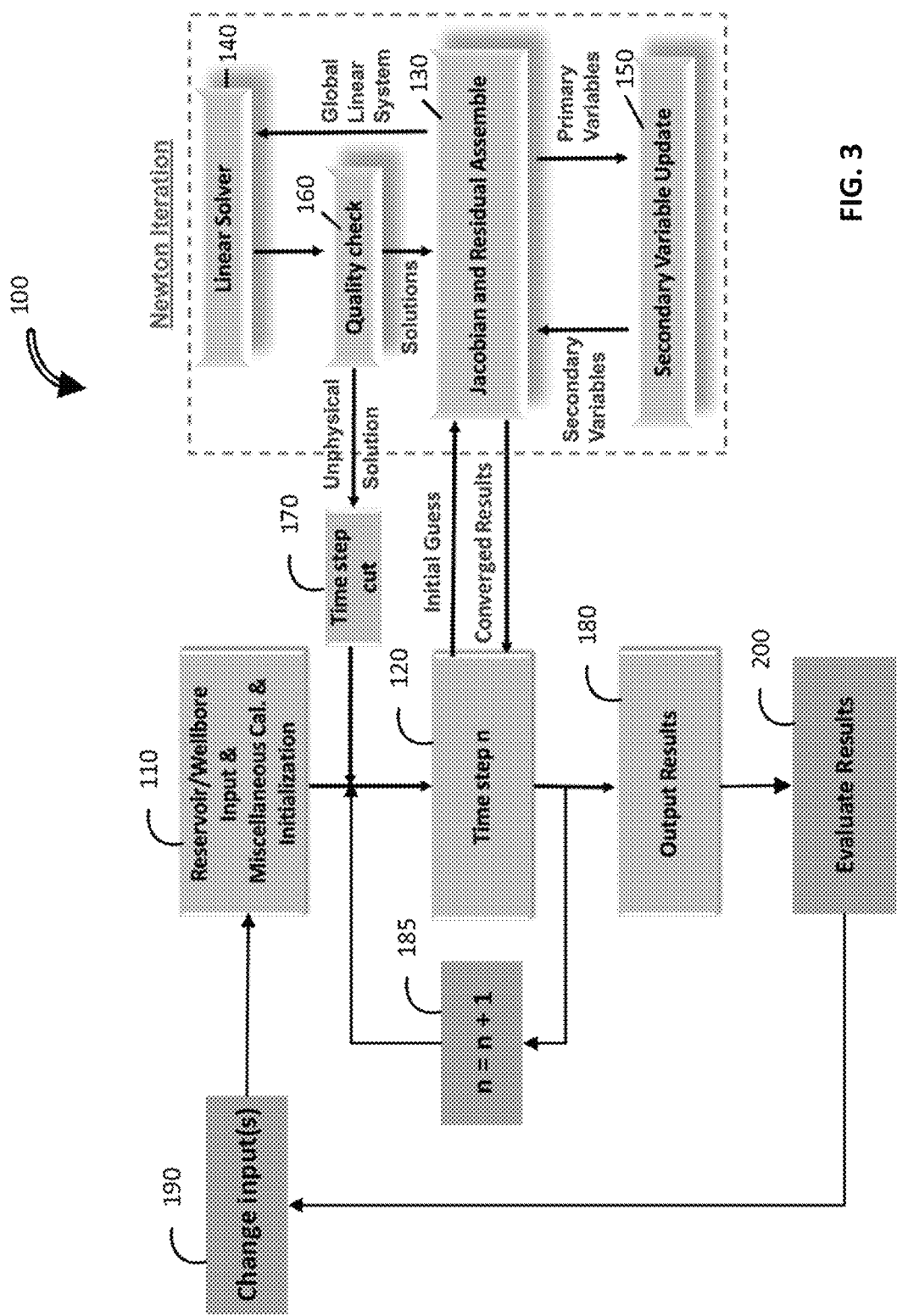
FIG. 3 is a high level schematic diagram of a reservoir simulator and its operation.

Turning to FIG. 2, a high level schematic diagram is provided of an exemplary reservoir simulator 100 and methods for optimizing hydrocarbon production from reservoirs subject to horizontal drilling. The reservoir simulator 100 is a processor-based system that employs a discretized form of a set of partial differential equations to model multi-phase, multiple component fluid flow in natural porous media through the reservoir and the connected wellbore(s). The governing equations typically used to describe the fluid flow are based on the assumption of thermodynamic equilibrium and the principles of conservation of mass, momentum and energy, as described in Aziz, K. and Settari, A., Petroleum Reservoir Simulation, Elsevier Applied Science Publishers, London, 1979. The complexity of the physics that govern reservoir fluid flow leads to systems of coupled nonlinear partial differential equations that are not amenable to conventional analytical methods. As a result, numerical solution techniques are necessary. The numerical solution techniques divide the reservoir into computational elements (e.g., cells or grid blocks) that cover the spatial extent of the reservoir, and divide time into time intervals or time steps (e.g., days or months). At each time step, the coupled system of nonlinear equations is solved using Newton's method, which is an iterative method where the approximate solution to the nonlinear system is obtained by an iterative process of linearization, linear system solution and updating.

The simulator 100 incorporates a reservoir-wellbore model, which is a set of partial differential equations which govern multi-phase, multiple component fluid flow through the reservoir and the connected wellbore(s). The underlying partial differential equations are discretized on computational elements (e.g., grid cells or grid blocks) that cover the spatial extent of the reservoir, the segments of the MSW(s), and the connections between the reservoir rock and one or more segments of the MSW(s). State variables are defined for the computational elements (e.g., grid cells or grid blocks) of the reservoir, the segments of the MSW, and the connections between the reservoir rock and the MSW(s), (e.g., see table D.1 below). The partial differential equations for the MSW are based on the new (or proposed) DF model as described herein.

At 110, information regarding the reservoir and one or more wellbores that traverse the reservoir (which can be drilled or a candidate for drilling), is input into the reservoir simulator 100. Such information can include initial distributions of reservoir fluid properties such as volume fractions or mass fractions of constituent gaseous and liquid hydrocarbon components and water, viscosity and fluid density of these components, and reservoir pressure and reservoir temperature. Also, by way of example, the information fed to the simulator may include information describing the number and location of connections between the reservoir and the wellbore, information describing location and operation of flow control devices (if installed), such as chokes and valves, labyrinth devices, and downhole separators, between the reservoir and the wellbore, and information describing the geometry of the wellbore (if drilled).

After parsing the information input in 110, the reservoir simulator solves the reservoir-wellbore model for a time step n at 120. In order to approximate a solution to the discretized partial differential equations of the reservoir-wellbore model using Newton's method, a Jacobian matrix (which is part of the Jacobian and Residual Assembly 140) is constructed for the discretized partial differential equations of reservoir-wellbore model. Initial guesses (values) for the state variables (which may have been provided to the model as inputs at 110 for the initial time step) are fed into a program that conducts a Newton Iteration 130 to solve for the reservoir-wellbore model at time step n. As part of the Newton Iteration 130, the Jacobian and Residual Assembly 140 provides primary variable values 142 to conduct a secondary variable update 150 (which in turn provides secondary variable values 152 back to the Jacobian), and a global linear system 144 is provided to a linear solver 160 which provides solutions 166 for output where results converge. If there is no convergence, a quality check 170 is used to stop the process so that different criteria may used in selecting input information at 110. However, where results converge, the results for time step n are provided as output results at 180. The operations may then continue by stepping through time (n=n+1) at 185 and running the Newton Iteration 130 for the next time step. Eventually, the results for all times of interest are assessed at 190 for suitability (e.g., return on investment).

The solution (results) of the reservoir simulator can be used to aid in determining drilling and/or completion strategies and associated parameters (e.g., locations and settings of flow control valves, production pressure, etc.) that will help maximize/optimize the production of hydrocarbon fluids from the reservoir. For example, if the solution of the reservoir-wellbore model is deemed suitable and the wellbore(s) is/are not yet drilled, the formation may then be drilled, valves located, and valve and pressure parameters for production of hydrocarbons set according to the solution, and hydrocarbons may be produced from the completion. Where the wellbores are in place, the wellbores may be completed according to the solution (e.g., valves placed and valve and pressure parameters set) and hydrocarbons may be produced from the completion.

In embodiments, the reservoir simulator 100 may be a simulator such as the ECLIPSE simulator of Schlumberger or the General Unstructured Reservoir Utility (GURU) simulator developed by Texas A&M University and described in Yan, Bicheng, "Development of General Unstructured Reservoir Utility and Fractured Reservoir Modeling," Doctoral dissertation, Texas A & M University, 2017, available electronically from http://hdl.handle.net/1969, where the reservoir-wellbore model is extended to incorporate a gas-liquid drift-flux (DF) model that accounts for pipe inclinations θ in the range −90° to +900 of a multi-segmented wellbore (MSW), thereby permitting accurate modelling of horizontal or near-horizontal wellbores (in addition to vertical and slanted wellbores). The DF model is based on mixture velocity (which is the average velocity of the gas and liquid phases in a two-phase flow) as opposed to superficial velocities, thereby permitting the DF model to be integrated with reservoir-wellbore models that utilize mixture velocity. The mixture velocity can be a primary variable of one or more equations that are part of the DF model and solved by the execution of the reservoir simulator. For example, the mixture velocity can be a primary variable of a pressure drop equation for one or more connections between segments of the MSW as part of the DF model, and such pressure drop equation can be solved by the execution of the reservoir simulator to model flow through the segments of the MSW.

The DF model can also be continuous and differentiable over all primary variables, and is applicable for pipe inclinations in the range −90° to +900 for the segments of the MSW.

In one embodiment, the DF model can be defined for two-phase flow (e.g., a gas phase and a liquid hydrocarbon phase) according to:

$$u_{dr}^\theta = (m_1\{u_{dr}^V\}\sin\theta + \mathcal{M}_2\{u_{dr}^H\}\cos\theta) \times \mathcal{M}_3,$$

where $u_{dr}^\theta$ is the drift velocity as a function of inclination $\theta$ for any inclination $\theta$ in the range −90 to +90 degrees, $u_{dr}^V$ and $u_{dr}^H$ are the vertical and horizontal drift velocities, respectively, $m_1$ is a multiplier that is applied to the vertical drift velocity component $u_{dr}^V$, $\mathcal{M}_2$ is a multiplier that is applied to the horizontal drift velocity component $u_{dr}^H$ and corrects for transition at or near horizontal (i.e., $\theta=0$), and $\mathcal{M}_3$ is a multiplier that is applied to contributions from both the vertical drift velocity component $u_{dr}^V$ and the horizontal drift velocity component $u_{dr}^H$ and compensates for divergence for low mixture velocity, i.e., $u_m \leq 1$ m/s.

In embodiments, the vertical drift velocity component $u_{dr}^V$ can be defined according to:

$$u_{dr}^V = \frac{(1-\alpha_g C_0) C_0 N_{Ku}(\alpha_g) u_{ch}}{\alpha_g C_0 \sqrt{\rho_g/\rho_L} + 1 - (\alpha_g C_0)},$$

where $\alpha_g$ is the void fraction of the gas phase (typically provided by a reservoir simulator as $f_g$), $N_{Ku}$ is the critical Kutateladze number, $u_{ch}$ is a characteristic velocity, $\rho_g$ is the density of the gas phase, $\rho_L$ is the density of the liquid phase, and $C_0$ is a profile parameter.

In embodiments, the horizontal drift velocity component $u_{dr}^H$ can be defined according to:

$$u_{dr}^H = \sqrt{gD}\left(\xi_1 - \xi_2\left[\frac{(N_\mu)^{\xi_3}}{(N_{E\ddot{o}})^{\xi_4}}\right]\right)\alpha_g(1-\alpha_g),$$

where g is the gravity constant, D is the diameter the conduit, $\xi_1$, $\xi_2$, $\xi_3$, and $\xi_4$ are horizontal flow fitting parameters, $N_\mu$ is the viscosity number, and $N_{E\ddot{o}}$ is the Eötvös number (also known as the 'Bond' number).

In embodiments, the multiplier $\mathcal{M}_2$ can be based on mixture velocity $u_m$, for example, according to:

$$\mathcal{M}_2 = \left[1 - \frac{2}{1+\exp[50\sin(\theta+m_2 u_m)]}\right],$$

where $m_2$ is a fitted parameter.

In embodiments, the multiplier $\mathcal{M}_3$ can be based on the mixture Reynold's number $(N_{Re})_m$, for example, according to:

$$\mathcal{M}_3 = \left[1 + \frac{1000}{(N_{Re})_m + 1000}\right]^{m_3},$$

where $m_3$ is a fitted parameter.

According to aspects the DF model equation $u_{dr}^\theta = (m_1\{u_{dr}^V\}\sin\theta + \mathcal{M}_2\{u_{dr}^H\}\cos\theta) \times \mathcal{M}_3$ is a general equation. Thus, is will be appreciated that $m_1$ is generally equal to 1, but could be selected differently for specific hydrocarbons being produced. Based on DF equation, it will be appreciated that where the well segment is vertical (cos $\theta=0$), the second term of the sum goes to zero, thereby reducing the DF equation to a modification (that accounts for flow velocity) of the prior art equation of J. A. Holmes (previously referenced). On the other hand, when the well segment is horizontal or nearly horizontal, sin $\theta$ equals or approaches zero, thereby reducing the DF equation to a modification (that accounts for flow velocity) of the horizontal drift velocity with the multiplier $\mathcal{M}_2$ that corrects for transition at the horizontal inclination. As a result, the DF equation is shown to be continuous and differentiable over all primary variables, and is applicable for pipe inclinations for segments of the MSW in the range −90 to +900.

In one aspect, the reservoir simulator that incorporates the DF model can be extended to include three-phase flow (gas, liquid hydrocarbon, and water) by treating the three-phase flow as two-phase (gas-liquid) with average properties for the liquid phase; computing the two-phase volume fractions applying the presented model; and computing oil and water volume fractions within the liquid phase by applying the existing MSW drift-flux oil-water model without any modification. Details of an exemplar embodiment of the DF model are described below.

Figure 4:
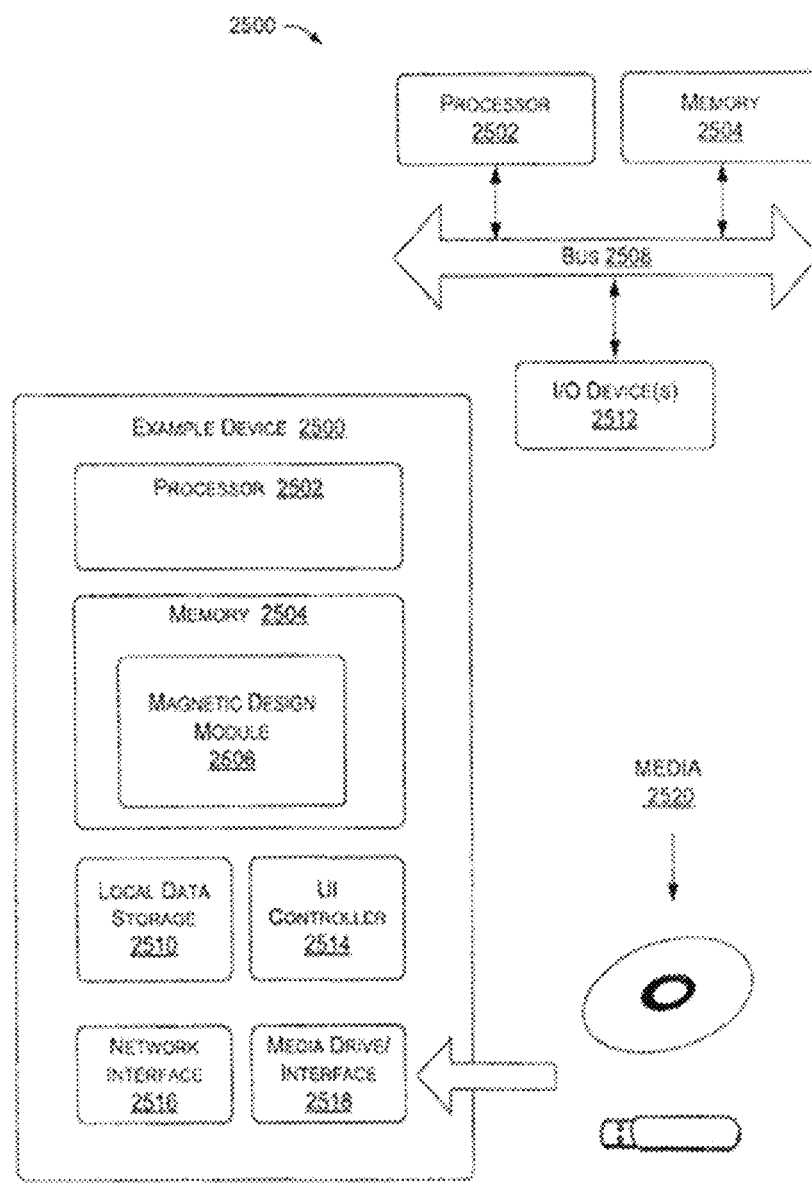
FIG. 4 is a block diagram of an exemplary computer processing system.

FIG. 4 illustrates an example device 2500, with a processor 2502 and memory 2504 that can be configured to implement various embodiments of the reservoir simulator as discussed in this disclosure. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network.

A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer. Some of the methods and processes described above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

A. Exemplary Gas-Liquid Drift-Flux (DF) Model

Only homogeneous and specific drift-flux multiphase flow models are suited for implementation in a fully-coupled wellbore-reservoir simulation, where stability and robustness are absolute requirements (refer Tang et al.[1]).

The homogeneous flow model (also known as 'no-slip') assumes both gas and liquid phases travel at the same velocity as there is 'no slippage' between the phases. Although relatively straightforward to implement, it fails to accurately predict the in situ flowing phase volume fractions. The consequence of such inaccuracy may be detrimental to forecast accuracy.

The drift-flux class of models, on the other hand, can furnish reasonably accurate in situ flowing gas volume fractions (refer Bhagwat & Ghajar[2]; Woldesemayat & Ghajar[3]). In so doing, such constructs may better capture actual wellbore behavior with corresponding benefit to forecast reliability.

The existing drift-flux model, developed in 1977 by Jon Holmes[4] (see also Shi et al.[5] and ECLIPSE™ Technical Manual[6]), represents the state-of-the-art for upward flow modelling that is stable and robust within the numerically complex fully-coupled MSW simulator. Holmes' model is even more astonishing impressive in that it can consider both co- and counter-current flows in the MSW and can perform both 'up-wind' and 'down-wind' solutions simultaneously—a feat only made possible after many man-years of development. However, the benefit of such effort is a unique product offering that is unmatched.

A.1.1 Motivation

The motivation for this study arises from the fact that the existing drift-flux (DF) model currently available in Multi-Segmented Wellbore (MSW) model functionality is only defined for pipe inclinations in the range: $\{+2° \leq \theta \leq +900\}$. Thus, the current DF model is undefined for horizontal, near-horizontal and downward flow: $\{-90° \leq \theta \leq +2°\}$. Moreover, any drift-flux model implementation must adhere to very exacting requirements necessary for stable and robust numerical solution—a non-trivial task. At present, when an MSW is defined out of this inclination range, ECLIPSE™ (ECL) and/or INTERSEC™ (IX) will still converge—but it often takes longer to do so.

The current DF model (Holmes[4]; Shi et al.[5]) utilizes an inclination correction parameter, $m(\theta)$, that was defined for $\theta \gtrsim +2°$ but is unspecified for $\theta \lesssim +2°$ (see Hasan &

Figure 5:
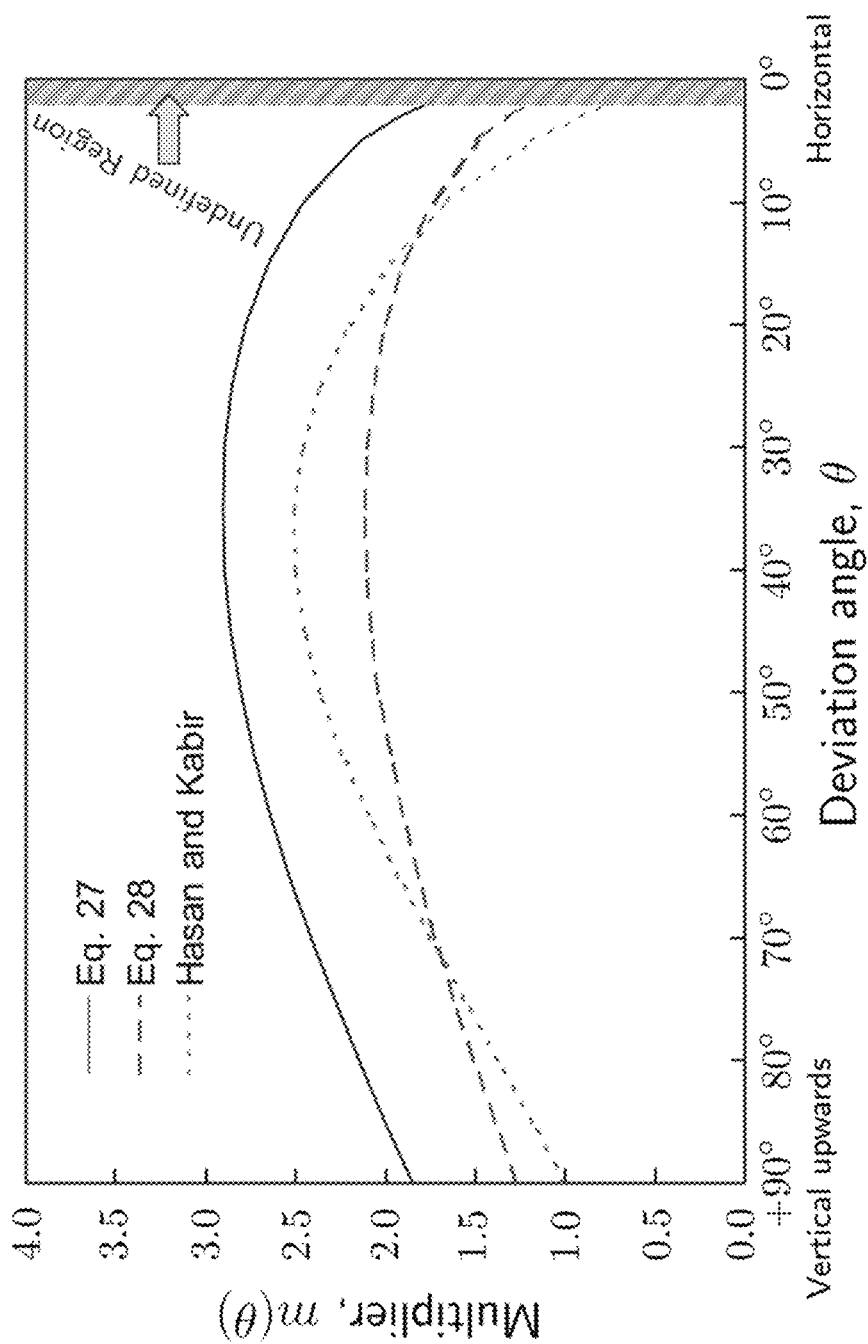
FIG. 5 is a plot of the inclination correction multiplier, $m(\theta)$ (modified from FIG. 14 from Shi et al.[5]) with an undefined region (up to horizontal) highlighted. Note that the equation numbers in FIG. 5 refer to those in Shi et al.

Kabir[7]). The inclination correction factor (or 'multiplier') is shown in Eqn. (A1) and is illustrated in FIG. 5 where the dark-colored region signifies the unspecified region up to purely horizontal flow. Note that downward flow is not shown here.

$$m(\theta)=m_0(\cos\theta)^{n_1}(+\sin\theta)^{22}, \quad \text{Eqn. (A.1)}$$

where $m_0$, $n_1$, $n_2$ are adjustable parameters.

The inclination correction factor $m(\theta)$ is then used to adjust the vertical drift velocity in the following manner:

$$u_{dr}^{\theta}=(u_{dr}^{(\theta=+90°)})m(\theta). \quad \text{Eqn. (A.2)}$$

FIG. 5 is a plot of the inclination correction multiplier, $m(\theta)$ (modified from FIG. 14 from Shi et al.[5]) with the undefined region (up to horizontal) highlighted. Note that the equation numbers in FIG. 5 refer to those in Shi et al. Note that FIG. 5 has "flipped" the definition of vertical and horizontal flow as used herein. In other words, Jon Holmes defined upward vertical flow as 0 degrees and pure horizontal as 90 degrees. The original figure as cited in Shi et al uses this convention. This it may be worth making a note of that. The "flipping" of definitions as used herein is reasonable as most multi-phase flow papers define horizontal as 0 degrees and upwards vertical as +90 degrees.

A.1.2 Components of Coupled Simulation

Figure 6:
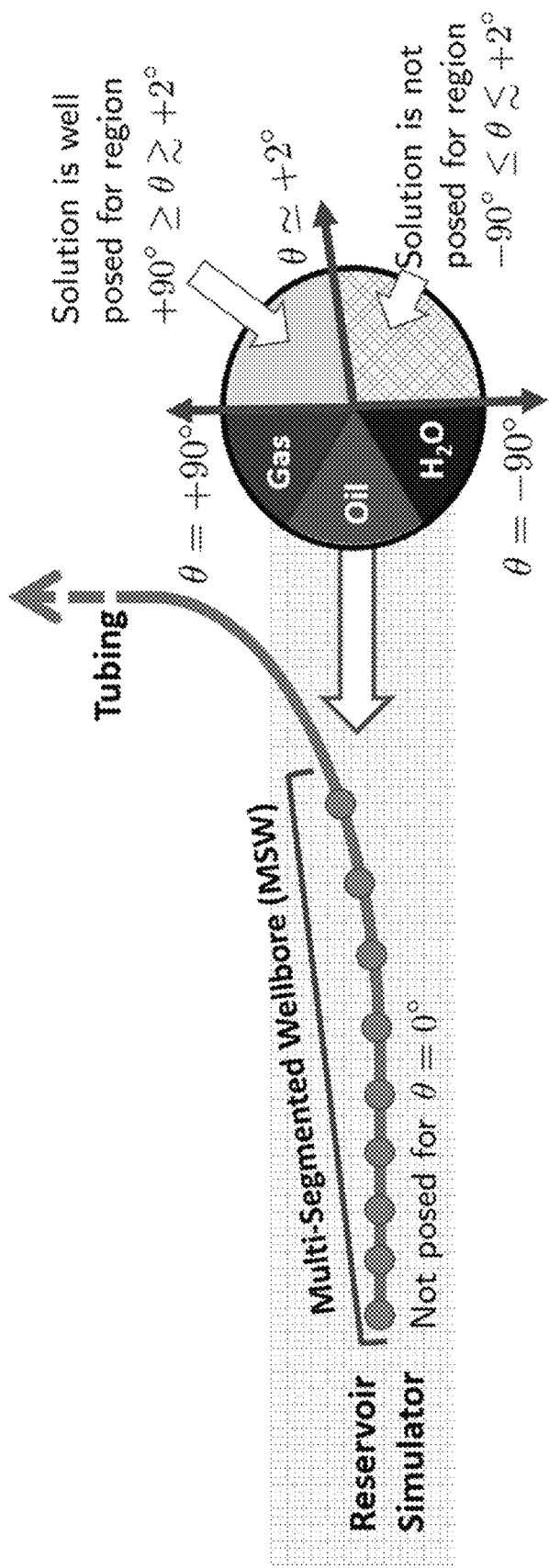
FIG. 6 is a schematic diagram illustrating relative position of a MSW within a coupled simulator-to-flowline solution space.

FIG. 6 illustrates the relative position of a MSW within a coupled simulator-to-flowline solution space. Three main modelling 'components' are shown:

1. Reservoir Simulation.
2. Multi-Segmented Wellbore (MSW) model. This computes fow through completions and in the wellbore. It is fully coupled to the reservoir simulator.
3. Tubing. May be solved using PIPESIM, lift-curves, or other flow simulators, i.e., OLGA.

Note that the left-side of the circular legend shows fluid phases being modelled. Note that 'oil+water' are often mixed to form a 'liquid' phase. The right-side of the circular legend shows the range of defined solution for the existing drift-flux model, namely: $\{+2°\leq\theta\leq+900\}$. The undefined solution region is $\{-90°\leq\theta\leq+2°\}$.

A.1.3 Suitability for MSW Implementation

Figure 7:
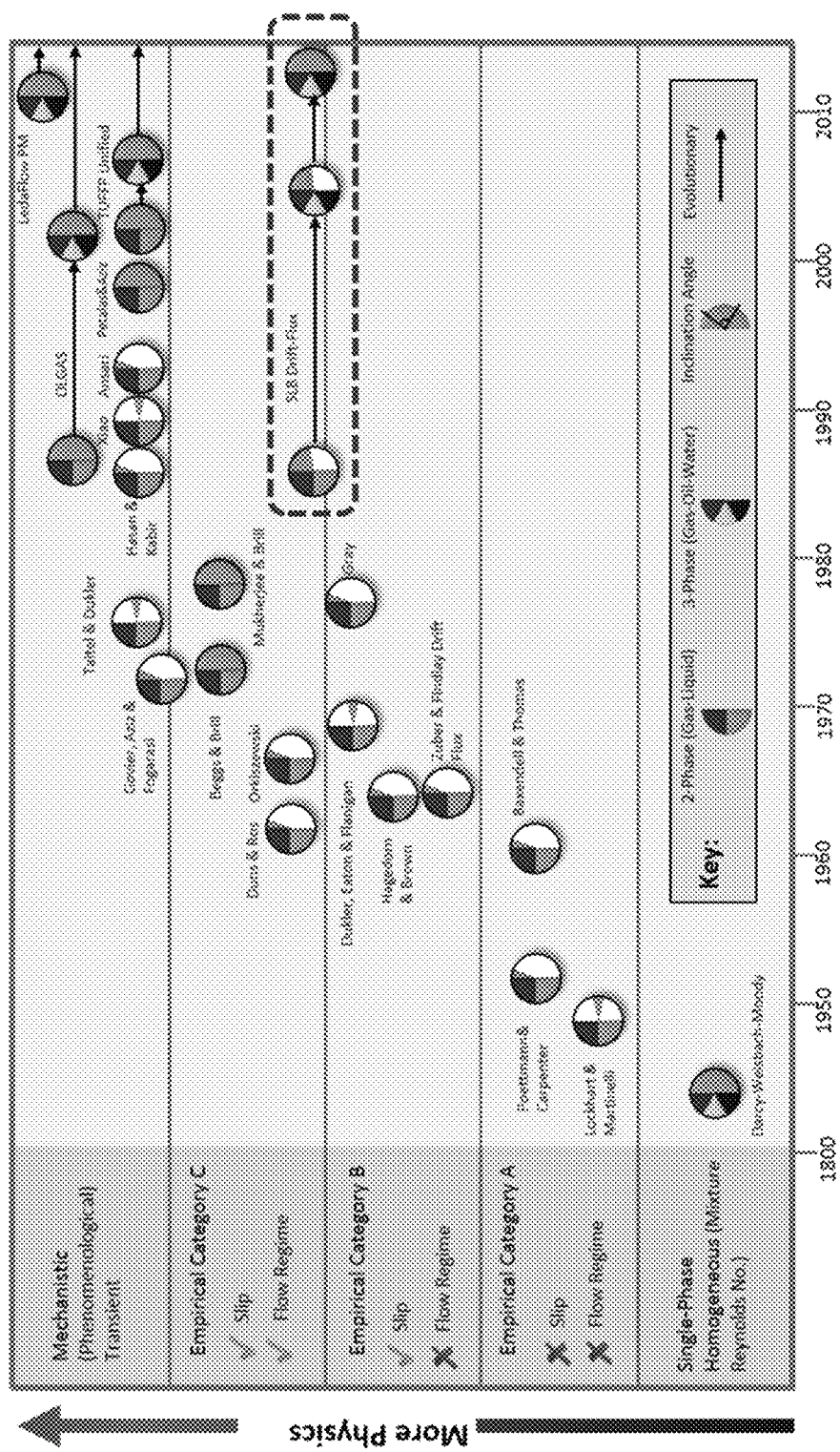
FIG. 7 is a chart depicting the evolution of multiphase flow models used in reservoir simulators.

Very few multiphase flow models are suitable for implementation in a fully-coupled wellbore-to-reservoir simulator. FIG. 7 presents a (simplified) chart of multiphase flow model evolution, classified according to their primary attributes (Shippen & Bailey[8], 2012). The dashed box demarcates the models compatible with MSW, specifically the existing drift-flux (DF) model and those developed at SDR. All other models (and likely all those not shown) will prove incompatible with MSW due to their formulation (non-smoothness, discontinuities, case-dependent parameters and so on). Specifically, FIG. 7 shows the evolution of select multi-phase flow models over time, roughly classified according to solution type. The dashed box demarcates the model that could be implemented in MSW. No other models shown can function in the MSW due to the very exacting requirements of the partial derivatives involved and the absolute need for smoothness and the absence of any discontinuities.

A.1.4 Model Requirements

Tang et al.[1] states two essential prerequisites for any model in order to be eligible for implementation in a fully implicitly coupled wellbore-reservoir simulator, namely:

1. It must be based on mixture velocity and not superficial velocities,
2. It should be continuous and differentiable over all primary variables.

It should be noted that in reservoir simulation, superficial velocities are not known beforehand. However, void fraction is known. This is in direct contrast to steady state pipe multiphase flow models (such as PIPESIM) where superficial velocities are known a priori and void fraction is the unknown. In short: the inputs and outputs of reservoir and pipe flow models can be completely reversed. Furthermore, it should be noted that these requirements are specific to the 'GURU-MSW' test harness which was used to evaluate model performance in a fully-coupled system. These do not all necessarily apply to the full MSW whose requirements may be quite different.

Jon Holmes' original drift-flux (DF) model[4] (also see Shi et al.[5]) appears to fulfil all these requirements. Moreover, this model has been successfully implemented in other simulators (Livescu et al.[9], 2010; Pan & Oldenburg[10], 2014).

As horizontal and porpoising wells are now commonplace, the need for an applicable DF model is clear. Choi et al.[11] proposed one such model, however its accuracy significantly decreases at high gas volume fraction ($\alpha_g$) and is unsuited for implementation in a fully-coupled model due to discontinuities in model formulation, thereby violating the second prerequisite stated above.

Another contemporary, and seemingly accurate and unified DF model was proposed by Bhagwat & Ghajar [2]. However, their model also possesses discontinuities and it also requires gas superficial velocity, $u_s^g$ as an input. We bring these models to the reader's attention as they will be used to benchmark performance accuracy in pure tubular flow later in this work.

A.1.5 Objectives

The objective of this work is to develop a drift-flux model that is both compatible with a fully-coupled reservoir simulator (through MSW) and also applicable for pipe inclinations in the full range from +90° to −90°. A parameter optimization approach, akin to that presented by Shi et al.[5], is adopted to obtain the best match to the data. This report covers, in order, the following:

- We first present the current 'unified' drift-flux model (developed at SDR).
- Revisions to this model proposed in order to better capture transition response.
- Model parameters for 2-phase flow are obtained through optimization.
- Model is compared against two 'state-of-the-art' drift-flux models.
- Model response within the existing 3-phase flow solution framework is evaluated.
- Finally, we evaluate smoothness and robustness in a MATLAB-driven fully-coupled simulator-MSW test harness using 'upwind' solution.

A.2 Model Development

The one-dimensional drift-flux model for gas-liquid two-phase flow describes the relative motion between gas phase velocity, $u_g$, and the average velocity of the mixture, $u_m$. A general formulation (for vertical flow only) is shown in Eqn. (A.3), first proposed by Zuber & Findlay[12] in 1965:

$$u_g=C_0 u_m+u_{dr}, \quad \text{Eqn. (A.3)}$$

where $C_0$ is the profile parameter, which accounts for the non-uniform flow profile of bubble-rise over the pipe cross section in a static flow column; $u_{dr}$ is the drift velocity, which accounts for the local slip effect between gas and liquid phases; and $u_m$ is the average two-phase mixture velocity. The average mixture velocity, $u_m$, is defined as:

$$u_m=u_s^g+u_L^s=\alpha_g u_g+(1-\alpha_g)u_L, \quad \text{Eqn. (A.4)}$$

where $\alpha_g$ is the in situ gas volume fraction, averaged across the cross-sectional area of the pipe (well, conduit). The average flow velocity of the liquid phase is then:

$$u_L = \left[\frac{1-\alpha_g C_0}{1-\alpha_g}\right] - u_{dr}\left[\frac{\alpha_g}{1-\alpha_g}\right]. \qquad \text{Eqn. (A.5)}$$

A.2.1 Vertical Flow Drift-Flux Model

The profile parameter proposed by Holmes[4], is given by:

$$C_0 = \frac{A}{1+(A-1)\gamma^2}, \qquad \text{Eq. (A.6)}$$

where $$\gamma = \max\left[\min\left(\frac{\beta-\beta}{1-B}, 1\right), 0\right], \qquad \text{Eqn. (A.7)}$$

which ensures $\{0 \le \gamma \le 1\}$. Parameter $\beta \to 1.0$ as $\alpha_g \to 1.0$ and also as $u_m$ increases. The transition to annular flow occurs when gas superficial velocity reaches the so-called 'flooding' value, i.e., $u_s^g = (u_g)_{flood}$ and is defined in Eqn. (B.2) below. This 'flooding' velocity is sufficient to prevent liquid film from falling back into the body of gas flow, thereby forming a competent bridge across the conduit. The expression for quantity $\beta$ is:

$$\beta = \max\left(\alpha_g, F_v \frac{\alpha_g |u_m|}{(u_g)_{flood}}\right). \qquad \text{Eqn. (A.8)}$$

$F_v$ represents a gas-liquid velocity-sensitive parameter (effectively a multiplier on the flooding velocity fraction). While this is a potentially tunable parameter, Shi et al.[5] recommends keeping it to $F_v=1.0$ and offer no reasonable upper- and lower-bounds if one wishes to tune this. However, adjusting $F_v$ effectively 'flattens' the flowing profile, but for our purposes we keep it constant.

The profile parameter, however, changes within the range: $\{1 \le C_0 \le A\}$ and $C_0=1$ if $A=1$. The vertical drift-velocity expression is, $$u_{dr}^V = \frac{(1-\alpha_g C_0)C_0 N_{Ku}(\alpha_g)u_{ch}}{\alpha_g C_0 \sqrt{\frac{\rho_g}{\rho_L}} + 1 - \alpha_g C_0}, \qquad \text{Eqn. (A.9)}$$

where $N_{Ku}(\alpha_g)$ and the 'characteristic velocity' $u_{ch}$ are defined below.

A.2.2 Incorporating Inclined Flow

A revised drift-velocity correlation was proposed by Bendiksen[13] (1984), which combines drift velocities for both horizontal and vertical flow as follows:

$$u_{dr}^\theta = \{u_{dr}^V\}\sin\theta + \{u_{dr}^H\}\cos\theta \qquad \text{Eqn. (A.10)}$$

where $u_{dr}$ denotes drift velocity as a function of inclination angle $\theta$ for all inclinations. The horizontal drift velocity has been shown to be highly dependent on gas volume fraction (Isao & Mamoru[14], 1987) and a model for the horizontal drift velocity component, $u_{dr}^H$ proposed by Bailey & Jumeau[15] (2015), is used:

$$u_{dr}^H = \sqrt{gD}\left(\varepsilon_1 - \varepsilon_2\left[\frac{(N_\mu)^{\varepsilon_4}}{(N_{E\sigma})^{\varepsilon_3}}\right]\right)(\alpha_g[1-\alpha_g]), \qquad \text{Eqn. (A.11)}$$

where $N_\mu$ is the 'viscosity' number (per Eqn. (B.9) below)) and $N_{E\sigma}$ is the Eötvös number (per Eqn. (B.10) below)). The first two terms in Eqn. (A.11) were inspired by the work of Ben-Mansour et al.[16] (2010), Jeyachandra et al.[17] (2012), and Zukoski[18] (1966). The third term was introduced to ensure that $u_{dr}^H \to 0$ as either $\alpha_g \to 0$ or $\alpha_g \to 1$.

The correlation of Eqn. (A.10) was designed for upward and horizontal flow $\{0° \le \theta \le +90°\}$. For downward flow, Bhagwat & Ghajar[19] (2012) observed that DF models developed for upward flow can be applied to downward flow by changing the sign of the drift velocity from positive to negative. They further proposed a new DF model, where the flipping criteria of drift velocity sign occurs at $\{-50° \le \theta \le 0°\}$ when $(N_{Fr})_g^s \le 0.1$ where $(N_{Fr})_g^s$ is the superficial Froude number for gas, defined by Eqn. (B.11). However, their model is based on superficial gas velocity and is discontinuous, both of which makes it unsuitable for implementation in MSW. This is contrary to typical steady-state pipe-flow multiphase simulators where superficial velocities are known inputs and void fraction is an output. In reservoir simulation, this is reversed and void fraction is an input and superficial velocities are the outputs.

Figure 8:
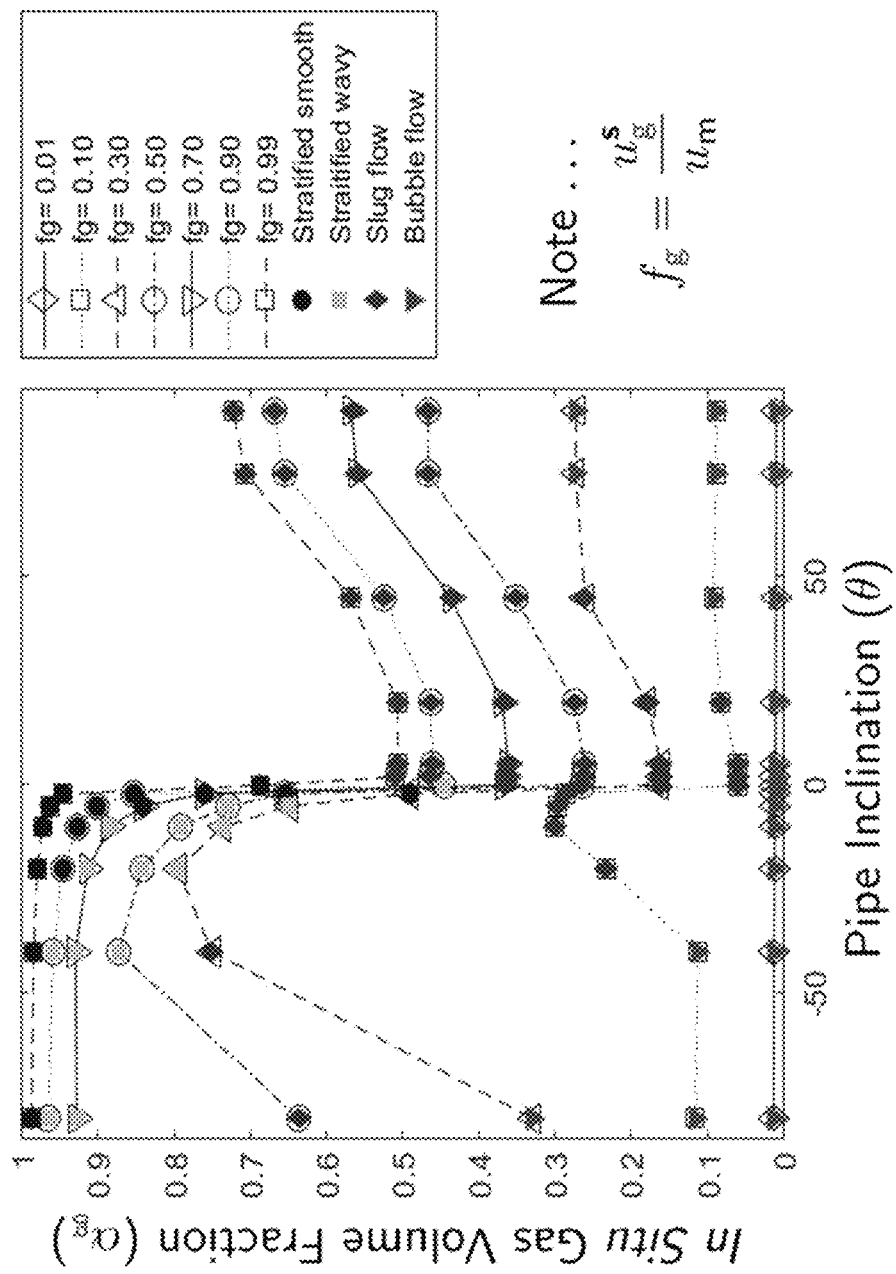
FIG. 8 is a plot derived from OLGA-S data showing in-situ gas volume fraction, $\alpha_g$, against inclination angle, $\theta$, against for different input gas fractions, $f_g$ (denoted by marker shape).
Figures 9A, 9B:
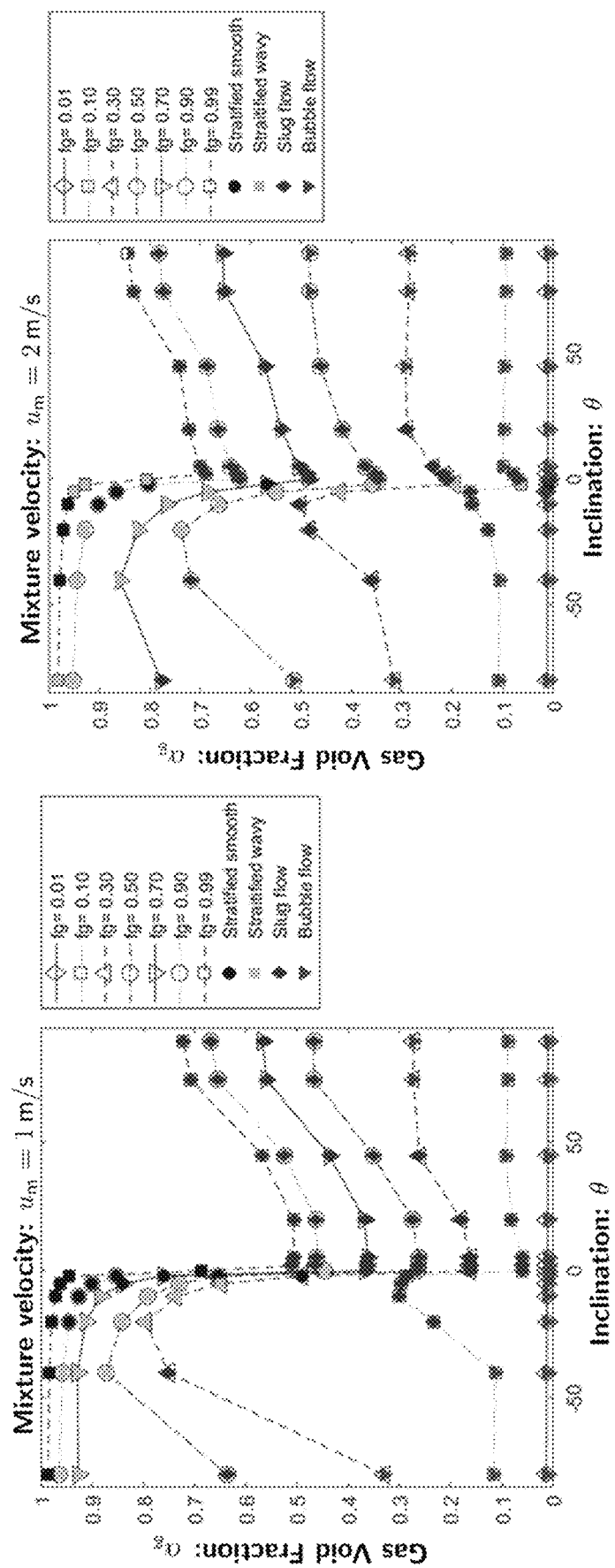
FIGS. 9(a) to 9(d) are plots derived from OLGA-S data showing in situ gas volume fraction, $\alpha_g$, against inclination angle, $\theta$, for different input gas fractions, $f_g$. Each plot applies to a different mixture velocity. Specifically, $u_m=1$ m/s for FIG. 9(a); $u_m=2$ m/s for FIG. 9(b); $u_m=5$ m/s for FIG. 9(c); and $u_m=10$ m/s for FIG. 9(d). Noter that the input gas fraction, denoted by $f_g$, comes from the reservoir (porous media) itself. The fluid exits the formation into the well, whereupon gas-phase experiences "slippage" resulting in a volume fraction that may be quite different from that defined by $f_g$.
Figure 9D:
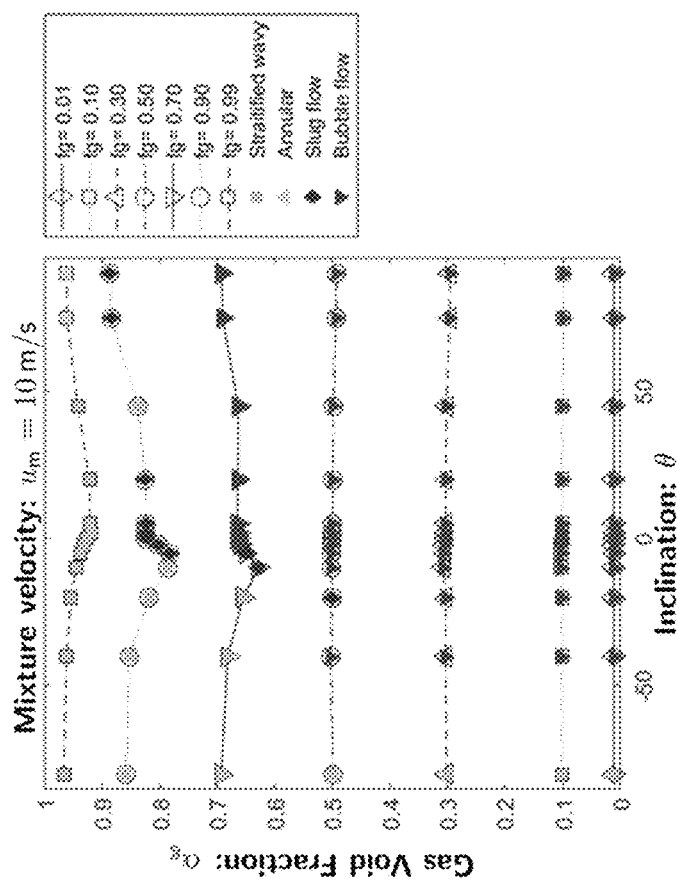
Figure 9C:
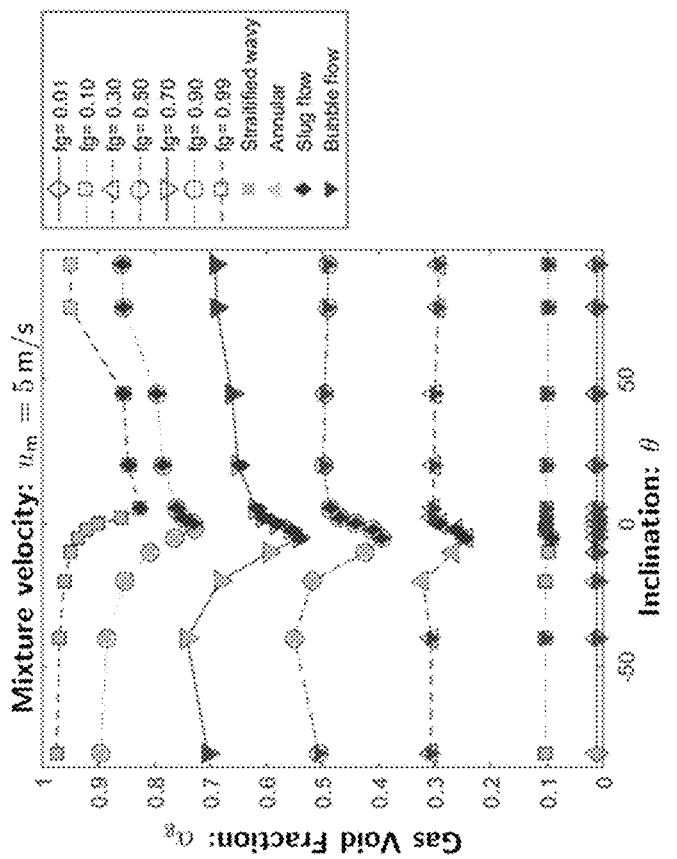
Figure 10A:
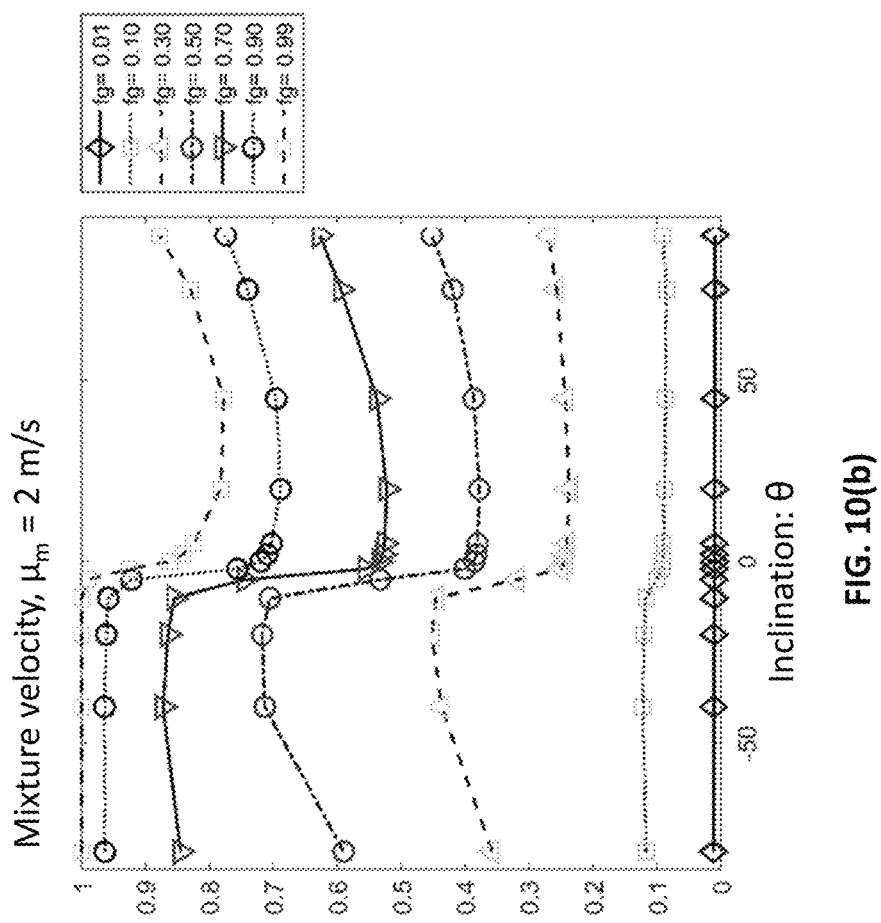
FIGS. 10(a) to 10(d) are plots generated using the proposed model showing in situ gas volume fraction, $\alpha_g$, against inclination angle, $\theta$, for different input gas fractions, $f_g$. Each plot applies to a different mixture velocity. Specifically, $u_m=1$ m/s for FIG. 10(a); $u_m=2$ m/s for FIG. 10(b); $u_m=5$ m/s for FIG. 10(c); and $u_m=10$ m/s for FIG. 10(d).
Figure 10B:
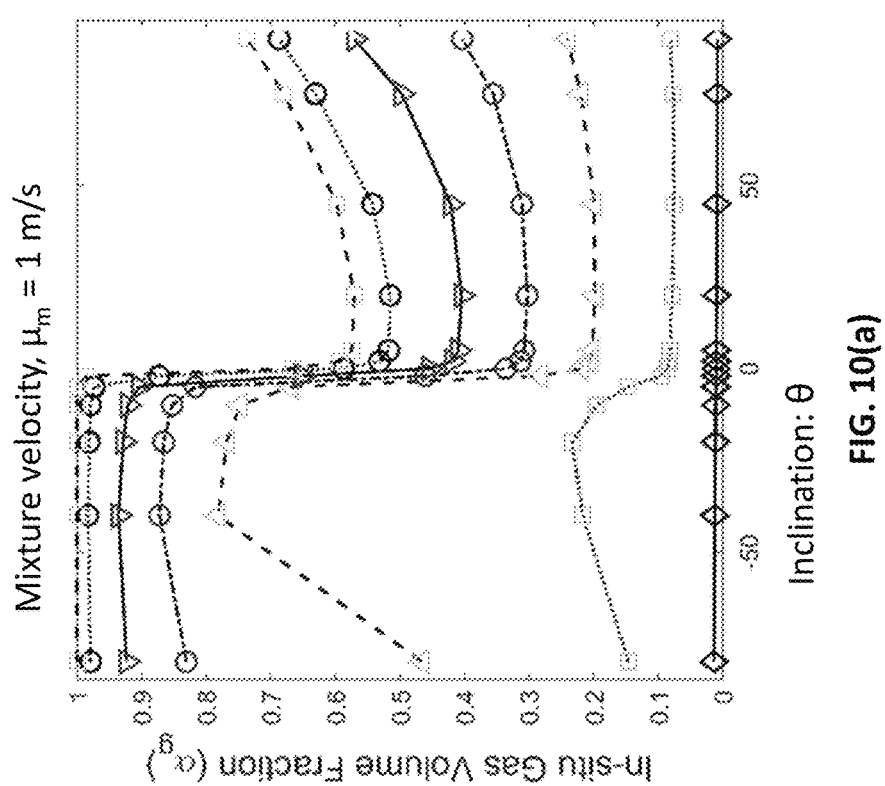
Figures 10C, 10D:
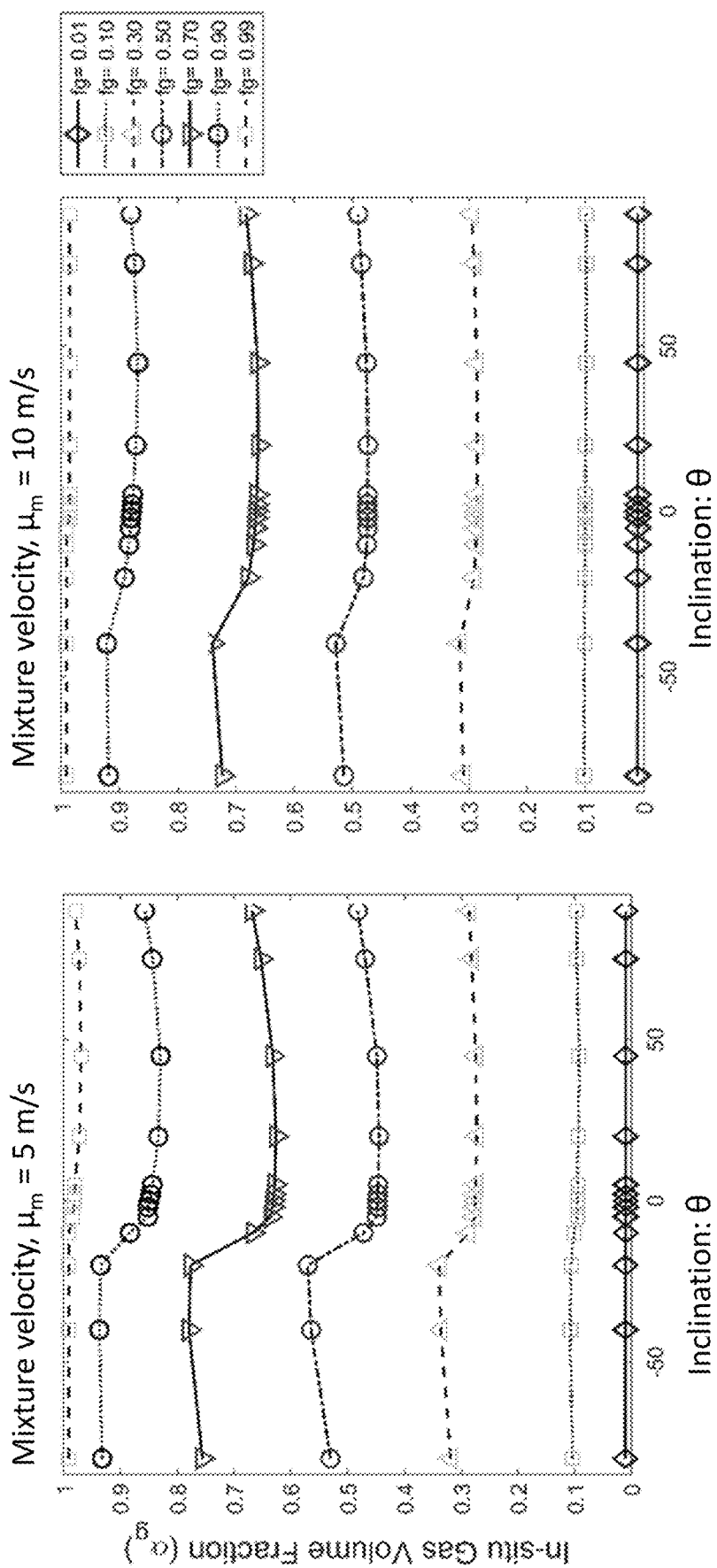

FIG. 8 shows OLGA-S data, including inclination angle, $\theta$, against in situ gas volume fraction, $\alpha_g$, for different input gas fractions, $f_g$ (denoted by marker shape). Associated flow regimes are denoted by marker colors.

A.2.3 Confounding Effects Near Horizontal Flow

Prior to implementing Eqn. (A.11) in our fully-implicit solution, we first need to investigate the potential for discontinuities, especially at the transition from horizontal-to-slightly-upwards/downwards and to trace the presence of any other potentially confounding phenomena. To help identify potential problems, we extracted data from OLGA-S and plotted it against inclinations, $\theta$, for different in situ gas volume fractions, $\alpha_g$, and different input gas fractions, $f_g$. An example is shown in FIGS. 9(a) to 9(d) where different marker shapes (and their curves) represent input gas fractions ranging from $f_g=0.01$ to $f_g=0.99$ while marker colors represent the flow regimes stated. What is noticeable is the steep transition at $\theta \square 0°$. This abrupt change will likely prove problematic in MSW implementation, but is one we need to represent as well as possible. Note that FIGS. 9(a) to 9(d) show plots of OLGA-S data for inclination angle, $\theta$, against in situ gas volume fraction, $\alpha_g$, for different input gas fractions, $f_g$. Marker shapes are described in FIG. 8. Each plot applies to a different mixture velocity. Specifically, $u_m=1$ m/s for FIG. 9(a); $u_m=2$ m/s for FIG. 9(b); $u_m=5$ m/s for FIG. 9(c); and $u_m=10$ m/s for FIG. 9(d).

Another confounding effect is mixture velocity, $u_m$, which markedly affects the shape of the response curves. Note that relative steepness of the transition around $\theta \approx 0°$ and also when $f_g \approx 0.99$. This transition appears to be mollified somewhat as $u_m$ increases and as $f_g$ reduces. Similar observations have also been reported where the phenomenon was attributed to the formation of stratified flow in downward flow.

FIGS. 9(a) to 9(d) provide two important insights that we need to consider in any proposed model, namely:

The transition at $\theta \approx 0°$ needs to be carefully defined, and
This transition is highly dependent on in situ mixture velocity, $u_m$.

A.2.4 Factoring Transition into the Model

We now attempt to accommodate the observations described earlier in sub-section A.2.3 into our model and attempt to account for the behavior at $\theta \approx 0°$ and also the impact $u_m$ has on this transition.

Consider the basic Bendiksen[13] drift velocity model, per Eqn. (A.10), but with two additional terms added to modify its response. The following is proposed:

$$u_{dr}^{\theta} = (m_1 \{u_{dr}^V\} \sin\theta + M_2 \{u_{dr}^H\} \cos\theta) \times M_3 \qquad \text{Eqn. (A.12)}$$

Note that $M \equiv m_1 = 1.0$, while the two new functionals are as follows:

$M_2$: Accounts for the sharp transition, especially at low mixture velocities.
$M_3$: Accounts for non-linear behavior between gas volume fraction, $\alpha_g$, and input gas fraction, $f_g$, especially at low mixture velocities, $u_m$.

For $M_2$ we propose a logistic function to establish a smooth transition such that $\{-1 \le M_2 \le 1\}$ with the transition being determined by $\theta$ and $u_m$, thereby yielding:

$$M_2 = \left[1 + \frac{2}{1 + \exp[50 \sin(\theta + m_2 u_m)]}\right]. \qquad \text{Eqn. (A.13)}$$

The value of '50' specified in Eqn. (A.13) came from simple trial-and-error with visual reckoning to gauge the best representation of the data. For $M_3$, it would seem reasonable that this be related to a Reynolds number in order to account for non-linear behavior at low mixture velocities, hence:

$$M_3 = \left[1 + \frac{1000}{(N_{Re})_m + 1000}\right]^{m_3}, \qquad \text{Eqn. (A.14)}$$

where $(N_{Re})_m$ is defined by Eqn. (B.12) below. The value of '1000' was suggested from previous studies and has proven reasonable reliable[2, 11].

A.2.5 Proposed Model

Inserting Eqn. (A.13) and Eqn. (A.14) into Eqn. (A.12), and adding a coefficient to $u_{dr}^V$, we obtain:

$$u_{dr}^{\theta} = \qquad \text{Eqn. (A.15)}$$

$$\left(m_1 \{u_{dr}^V\} \sin\theta + \left[1 - \frac{2}{1 + \exp[50 \sin(\theta + m_2 u_m)]}\right] \{u_{dr}^H\} \cos\theta\right) \times$$

$$\left[1 + \frac{1000}{(N_{Re})_L + 1000}\right]^{m_3}$$

The model for $u_{dr}^V$ is identical to the unmodified version of DF Jon Holmes' original, see Eqn. (A.9) (i.e., pure vertical flow and no use of the $m(\theta)$ 'correction factor'). Meanwhile, $u_{dr}^H$ is the same as that proposed by Bailey & Jumeau[15], per Eqn. (A.11).

We now revisit the rate-dependent plots, shown earlier in FIGS. 9(a) to 9(d). This time, however, we generate them using the proposed model, see FIGS. 10(a) to 10(d). Specifically, FIGS. 10(a) to 10(d) are plots of inclination angle, $\theta$, against in situ gas volume fraction, $\alpha_g$, for different input gas fractions, $f_g$, generated using the proposed model, Eqn. (A.15). Lines and marker shapes are defined in FIG. 8. Note that the issue of model parameterization is discussed later.

We note that there is a reasonable match between the OLGA-S benchmark and the model, although there is a smoother, less pronounced (smeared), transition at $u_m \gtrsim 2$ m/s at high values of $f_g$. However, as input gas fraction reduces this 'smearing' effect reduces and the desired transition at around $\theta \approx 0°$ becomes more pronounced. While not a perfect representation of the data, the proposed model would appear to provide the desired response to the (high quality) OLGA-S data reasonably well.

Figure 11A:
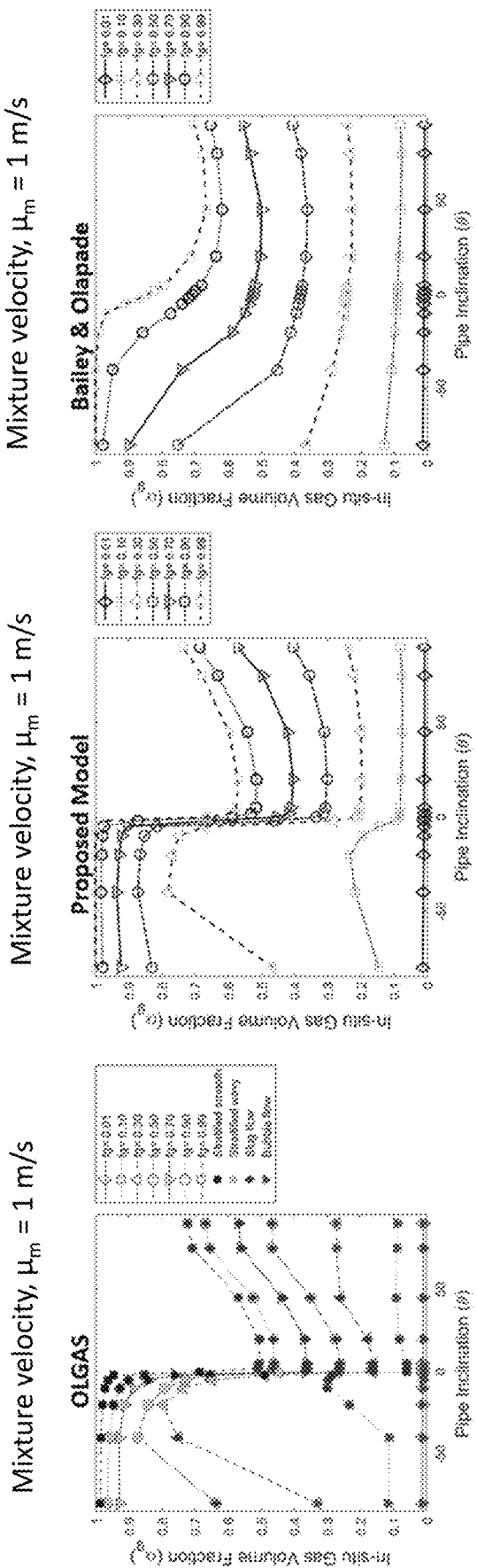
FIGS. 11(a)(i) to (iii) are plots generated using OLGA-S data, the proposed model and the Bailey & Olapade model showing in situ gas volume fraction, $\alpha_g$, against inclination angle, $\theta$, for different input gas fractions, $f_g$. The mixture velocity $u_m=1$ m/s.

Finally, for purposes of comparison, we plot the same type of figure, for $u_m = 1$ m/s only, but side-by-side and adding the results obtained from an earlier SDR-derived model (refer Olapade et al.[20, 21], 2013), as shown in FIGS. 11(a)(i) to (iii) and 11(b)(i) to (iii). Previously thought quite accurate, the improvement of the new model over our earlier efforts is clearly visible. Specifically, FIGS. 11(a)(i) to (iii) and 11(b)(i) to (iii) are plots of OLGA-S data, proposed model and the Olapade et al. [20, 21] model for $u_m = 1$ m/s and 5 m/s, respectively. At 1 m/s the proposed model resembles OLGA-S quite well while the Olapade et al., (Bailey & Olapade) model is smeared at the transition. At the higher mixture velocity, $u_m = 5$ m/s, we observe that at high $f_g$, both the proposed model and B&O are similarly smeared. However, the new model has more pronounced transitions at intermediate values of $f_g$. While it does not fully match OLGA-S data exactly, it does represent an improvement. Thus, it would seem that the proposed model furnishes satisfactory responses at all inclinations, it appears to be responsive to low values of $u_m$ (previously found problematic) and represents the transition at $\theta \square 0$ reasonably well, especially as $f_g \to 1$.

A.3 Parameter Optimization

The average in situ gas volume fraction, $\alpha_g$, over the pipe cross-section is determined by solving the implicit function:

$$f(\alpha_{g,i}^*; X_{P,\varepsilon}) = \frac{u_g^s}{C_0(\alpha_{g,i}^*; X_{P,\phi}) u_m + u_{dr}^\theta(\alpha_{g,i}^*; X_{P,\phi})} - \alpha_{g,i}^*, \qquad \text{Eqn. (A.16)}$$

where $\alpha_{g,i}^*$ represents the value of $\alpha_g$ for iteration i and the superscript * denotes an intermediate value. $X_p$ are tunable model parameters and $\phi$ represents other known properties. Mixture velocity is defined as follows:

$$u_m = u_g^s + u_L^s = \alpha_g u_g + (1 - \alpha_g) u_L, \qquad \text{Eqn. (A.17)}$$

The Wijngaarden-Dekker-Brent root-finding algorithm (Press et al.[22], 1988) is then used to locate the root of Eqn. (A.16). If multiple roots are found, the lower one is assumed to represent the physical solution, refer Landman[23] (1991). $X_p$ represents the following 11 parameters (all tunable):

$$X_p = \{A, B, a_1, a_2, \xi_1, \xi_2, \xi_3, \xi_4, m_1, m_2, m_3\}. \qquad \text{Eqn. (A.18)}$$

The first four parameters apply to $u_{dr}^V$ in Eqn. (A.9), while the remaining seven apply to $u_{dr}^H$ in Eqn. (A.11). The parameters are obtained by minimizing the average error between the experimental and calculated gas volume fractions (the objective function, $F_{obj.}$), namely:

$$F_{obj.} = \frac{1}{N} \sum_{i=1}^{N} |\alpha_g^{exp.} - \alpha_g^{calc.}|, \qquad \text{Eqn. (A.19)}$$

where N is the number of data records available. The superscripts 'exp.' and 'calc.' represent 'experimental' and 'calculated' quantities, respectively.

Table A.1 below shows lower- and upper-bounds for parameters in constrained optimization.

TABLE A1

Lower- and upper-bounds used in optimization of parameters $X_p$.

| Bounds for | Vertical: $u_{dr}^V$ | | | | Horizontal: $u_{dr}^H$ | | | | | | |
|---|---|---|---|---|---|---|---|---|---|---|---|
| $X_p$ | A | B | $a_1$ | $a_2$ | $\xi_1$ | $\xi_2$ | $\xi_3$ | $\xi_4$ | $m_1$ | $m_2$ | $m_3$ |
| Lower | 1.0 | 0.1 | 0.1 | 0.3 | 0.1 | 0.1 | 0.1 | 0.1 | 0.5 | 0.5 | 1.0 |
| Upper | 1.5 | 0.9 | 0.7 | 0.9 | 2.0 | 2.0 | 1.0 | 1.0 | 2.0 | 3.0 | 2.0 |

A.4 Data Used in the Analysis

Table A.2 summarizes the two datasets utilized to determine model parameters:

TUFFP contains 5,805 data records extracted from so-called 'TUFFP' database* (also referred to as the 'FFPDB', Fluid Flow Project Data Base). The full TUFFP database (as of 2015) contained 14,010 data records from 59 sources (but of variable quality). For our purposes we utilized a subset, deemed 'typical' of flow in a wellbore, and where data reliability was thought 'reasonably good' (admittedly this was subjective). This resulted in 5,805 data records, from 22 sources, as summarized in Table C.2 below. This covers inclinations $\{-90° \leq \theta \leq +90°\}$ and diameters $\{1.0 \leq D \leq 6.73\}$ (stated in inches).

OLGA-S contains 13,440 data generated from the OLGA-S library available in PIPESIM [25]. This library (some refer to it as a correlation which it is strictly not) was derived from high-quality experiments conducted by SINTEF at their Tiller multiphase flow laboratory, Norway. The OLGA-S dataset covers pipe inclinations: $\{-80° \leq \theta \leq +90°\}$.

$$f_g = \frac{u_g^s}{u_m}. \quad \text{Eqn. (A.20)}$$

We clearly see that the TUFFP dataset is skewed more towards higher input gas fractions, namely: $f_g \leq 0.8$. Furthermore, there are 2,138 data points for pure horizontal flow, $\theta=0°$, and 966 data points alone for pure upwards vertical flow, $\theta=+90°$.

On the other hand, OLGA-S data extraction was designed to be more evenly distributed than TUFFP data, with a focus around horizontal and near-horizontal flow, namely: $\theta=\{-80°, \ldots, -5°, -2°, -1°, 0°, +1°, +2°, +5°, \ldots, +90°\}$. The OLGA-S data was also uniformly distributed for $D=\{1, 3, 5, 7\}$ (stated in inches). Note that while field units are stated here, all calculations employ the SI system.

A.5 Models Used for Comparison

Two state-of-the-art drift-flow models from the literature, applicable for all inclinations, are also considered in this work for purposes of a comparative analysis. One model is that proposed by Choi et al.[11] (2012), while the other is that developed by Bhagwat & Ghajar[2] (2014). For brevity, these models are referred to as 'Choi' and 'B&G', respectively. B&G is thought to be the 'best performer' in the literature to date.

A.5.1 Choi et al., 2012

Published in 2012 by Choi et al.[11], the model is as follows:

$$C_0 = \frac{2}{1+\left[\frac{(N_{Re})_{2p}}{1000}\right]^2} + \frac{1.2 - 0.2\sqrt{\frac{\rho_g}{\rho_L}}(1-e^{-18\alpha_g})}{1+\left[\frac{1000}{(N_{Re})_{2p}}\right]^2}, \quad \text{Eqn. (A.21a)}$$

where $(N_{Re})_{2p}$ is defined in Eqn. (B.13) below and

TABLE A.2

Key parameters for TUFFP and OLGA-S data sets. 'Sup'l' is shorthand for 'superficial'.

| Variables | Pipe Diameter [inch] | Inclination $\theta$ [degrees] | Gas Sup'l Velocity $u_g^s$, [m/s] | Liquid Sup'l Velocity $u_L^s$, [m/s] | Liquid Viscosity [cP] | Input Gas Fraction fg |
|---|---|---|---|---|---|---|
| TUFFP Data Set (5,805 Records) | | | | | | |
| Minimum Value | 1.0 | −90° | 0.023 | 0.0003 | 0.1 | 0.006 |
| Maximum Value | 6.7 | +90° | 82.32 | 5.2 | 74.4 | 0.999 |
| OLGA-S Data Set (13,440 Records) | | | | | | |
| Minimum Value | 1.0 | −80° | 0.0001 | 0.001 | 0.5 | 0.0001 |
| Maximum Value | 7.0 | +90° | 14.976 | 14.965 | 50.0 | 0.997 |

Figures 12A, 12B, 12C:
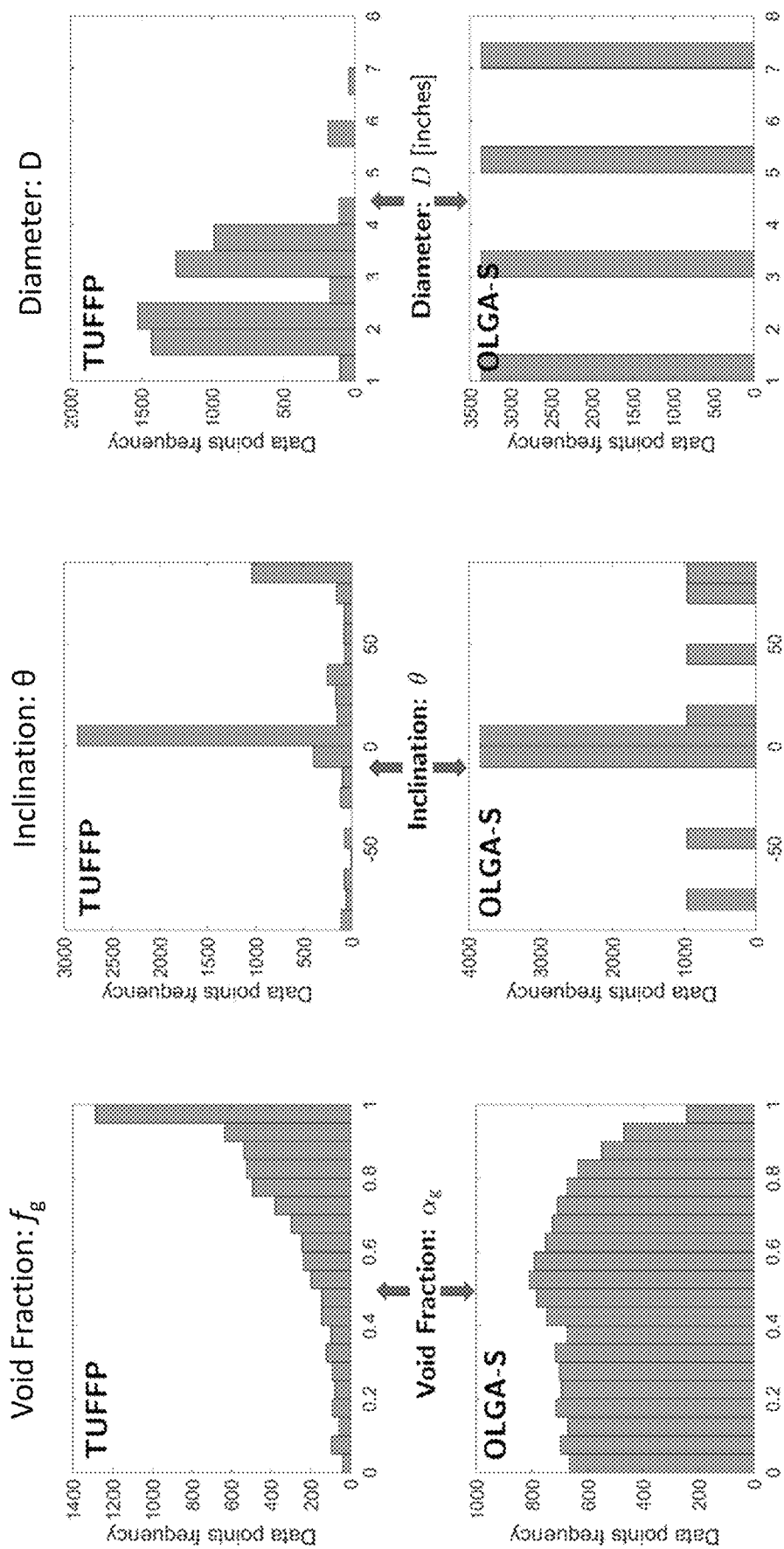
FIGS. 12(a), 12(b) and 12(c) present data distributions for three parameters: input gas fraction, $f_g$, pipe inclination, $\theta$, and pipe diameter, D, respectively.

FIGS. 12(a), 12(b) and 12(c) present data distributions for three parameters: input gas fraction, $f_g$, pipe inclination, $\theta$, and pipe diameter, D, where the input gas fraction, $f_g$, is defined as follows:

$$u_{dr} = 0.0246\cos\theta + 1.606\left[g\sigma_{g-L}\frac{(\rho_L - \rho_g)}{\rho_L^2}\right]^{0.25}\sin\theta. \quad \text{Eqn. (A.21b)}$$

A.5.2 Bhagwat & Ghajar, 2014

Published in 2014 by Bhagwat & Ghajar[2], the model is as follows:

$$C_0 = \frac{2 - \left(\frac{\rho_g}{\rho_L}\right)^2}{1 + \left[\frac{(N_{Re})_{2p}}{1000}\right]^2} + \frac{\left[\left(\sqrt{\frac{(1+(\rho_g/\rho_L)^2\cos\theta)}{(1+\cos\theta)}}\right)^{(1-\alpha_g)}\right]^{2/5} + C_{0,1}}{1 + \left[\frac{1000}{(N_{Re})_{2p}}\right]^2}, \text{ where} \qquad \text{Eqn. (A22a)}$$

$$C_{0,1} = \begin{cases} 0 & \text{when}\{-50° \leq \theta \leq 0°\} \text{ and } (N_{FR})_g^s \leq 0.1 \\ \left(C_1 - C_2\sqrt{\frac{\rho_g}{\rho_L}}\right)[(2.6-\beta)^{0.15} - \sqrt{f_{2p}}](1-\chi)^{1.5} & \text{otherwise} \end{cases} \qquad \text{Eqn. (A22b)}$$

The coefficient $C_1 = 0.22$ for circular and annular pipe geometries, and $$\beta = \frac{u_g^s}{u_L^s + u_g^s}.$$

The 'superficial' Froude number is defined as:

$$(N_{Fr})_g^s = \sqrt{\frac{\rho_g}{\rho_L - \rho_g}} \frac{u_g^s}{\sqrt{gD\cos\theta}}, \qquad \text{Eqn. (A23)}$$

The parameter $\chi$ is the 'two phase flow quality' and is not defined by these authors, but is approximated using the limiting cases specified by Cioncolini & Thome[26] (2012) such that as $(\rho_g/\rho_L) \to 1.0$ then $\chi \to \alpha_g$. Other definitions for $\chi$ apply, and are dependent on the 2-phase Reynolds number, $(N_{Re})_{2p}$, defined in Eq. (B.13). Drift velocity is defined as:

$$u_{dr} = \qquad \text{Eqn. (A24)}$$
$$(0.35\sin\theta + 0.45\cos\theta) \times \sqrt{\frac{gD(\rho_L - \rho_g)}{\rho_L}} (1-\alpha_g)^{0.5} C_2 C_3 C_4,$$

where $C_2$, $C_3$ and $C_4$ are defined as follows:

$$C_2 = \begin{cases} \left(\frac{0.434}{\log_{10}(u_L/0.001)}\right)^{0.15} & \text{when } u_L > 10cP \\ 1 & \text{otherwise} \end{cases},$$

$$C_3 = \begin{cases} \left(\frac{L_a}{0.025}\right)^{0.9} & \text{when } L_a < 0.025 \\ 1 & \text{otherwise} \end{cases},$$

$$C_4 = \begin{cases} -1 & \text{for } \{-50° \leq \theta \leq 0°\} \text{ and } (N_{Fr})_g^s \leq 0.1 \\ 1 & \text{otherwise} \end{cases}.$$

The 2-phase friction factor, $f_{2p}$, is defined by the Fanning function (per Colebrook [27,28], which is in turn derived from exhaustive experimental investigations by Nikuradse [29] in 1933) as:

$$\frac{1}{\sqrt{f_{2p}}} = -4.0\log_{10}\left(\frac{\epsilon/D}{3.7} - \frac{1.256}{(N_{Re})_{2p}\sqrt{f_{2p}}}\right), \qquad \text{Eqn. (A.25)}$$

Numerous explicit approximations of Eqn. (A.25) exist in the literature, a good overview of which is found in Yildirim [30] (2009). The Laplace variable, $L_a$, is essentially the inverse of the non-dimensional hydraulic pipe diameter, defined by Kataoka & Ishii [31] (1987), and is:

$$L_a = \frac{\sqrt{\frac{\sigma_{g-L}}{g(\rho_L - \rho_g)}}}{D}.$$

A.6 Results

We compare the proposed model against the two drift-flux models stated earlier in Section A.5: see Eqn. (A.21) (the so-called 'Choi' model) and Eqns. (A.22a) and (A.22b) (the so-called 'B&G' model).

A6.1 Optimal Parameters

Using the data sets discussed in Section A.4 optimized model parameters were computed and are summarized in Table A.3. Note that the units of parameter $m_2$ are stated in $\theta \cdot s/m$, while all others are dimensionless.

TABLE A.3

Optimal parameters for the proposed model: The TUFFP data set optimal parameters are denoted as $X^{TUFFP}_{opt.}$ and the OLGA-S data set optimal parameters are denoted as $X^{OLGA-S}_{opt.}$

| | Vertical Component: $u_{dr}^V$ | | | | Horizontal Flow Component: $u_{dr}^H$ | | | | | | |
|---|---|---|---|---|---|---|---|---|---|---|---|
| $X_p$ | A | B | $a_1$ | $a_2$ | $\xi_1$ | $\xi_2$ | $\xi_3$ | $\xi_4$ | $m_1$ | $m_2$ | $m_3$ |
| $X^{TUFFP}_{opt.}$ | 1.088 | 0.833 | 0.577 | 0.769 | 1.981 | 1.759 | 0.574 | 0.477 | 1.017 | 2.303 | 1.000 |
| $X^{OLGA-S}_{opt.}$ | 1.000 | 0.773 | 0.591 | 0.786 | 1.968 | 1.759 | 0.574 | 0.477 | 1.000 | 2.300 | 1.000 |

Note that the optimal parameter for the OLGA-S suggests that A=1.0 in $u_{dr}^V$. This suggests that profile parameter $C_0$=1.0 for all instances where it was evaluated thereby implying that B has little impact on performance of $u_{dr}^V$. Model error metric, $\varepsilon$, minimized during optimization is defined as follows ('exp' is observed experimentally and 'calc' is calculated):

$$\varepsilon = \frac{1}{N}\sum_{j=1}^{N}\left|\frac{(\alpha_g^{calc.})_j - (\alpha_g^{exp.})_j}{(\alpha_g^{exp.})_j}\right|. \qquad \text{Eqn. (A.26)}$$

It is worth observing that if A=1.0 then the value of B becomes irrelevant. In Table A.3, for $X_{opt.}^{OLGA-S}$, we consider B=0.773 to be an artefact of the optimization since A=1.0 and has, therefore, no intrinsic meaning.

A.6.2 TUFFP Data: Model Comparison

Table A.4 summarizes comparative performance of different drift-flux (DF) models against the TUFFP dataset. The percentage of the data falling within the ±20% error bands and also that data falling within the ±10% error bands are shown in this table.

Figure 13A:
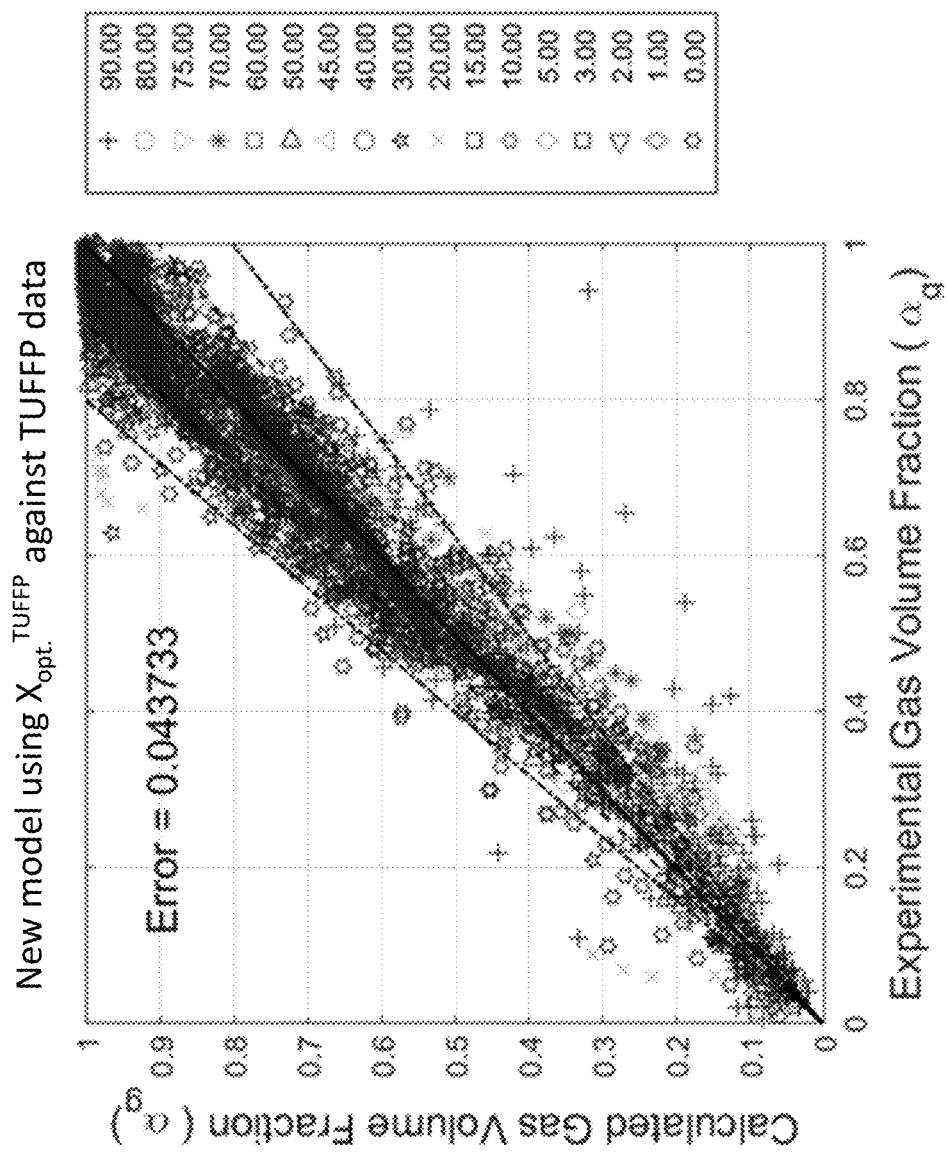
FIGS. 13(a) to 13(d) are cross-plots of predicted gas volume fractions for different DF models against measured gas volume fractions for horizontal and upwards data extracted from the TUFFP dataset. Specifically.
Figure 13B:
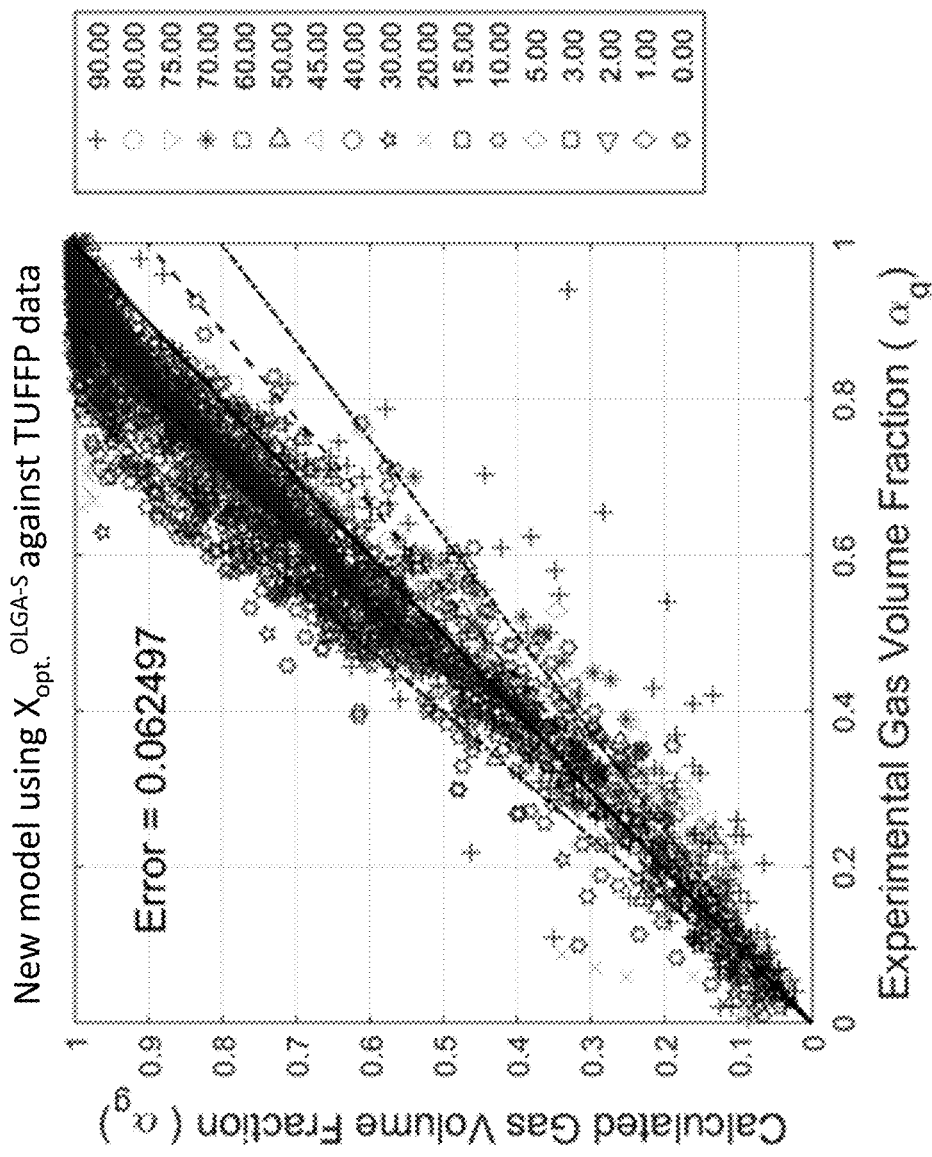
Figure 13C:
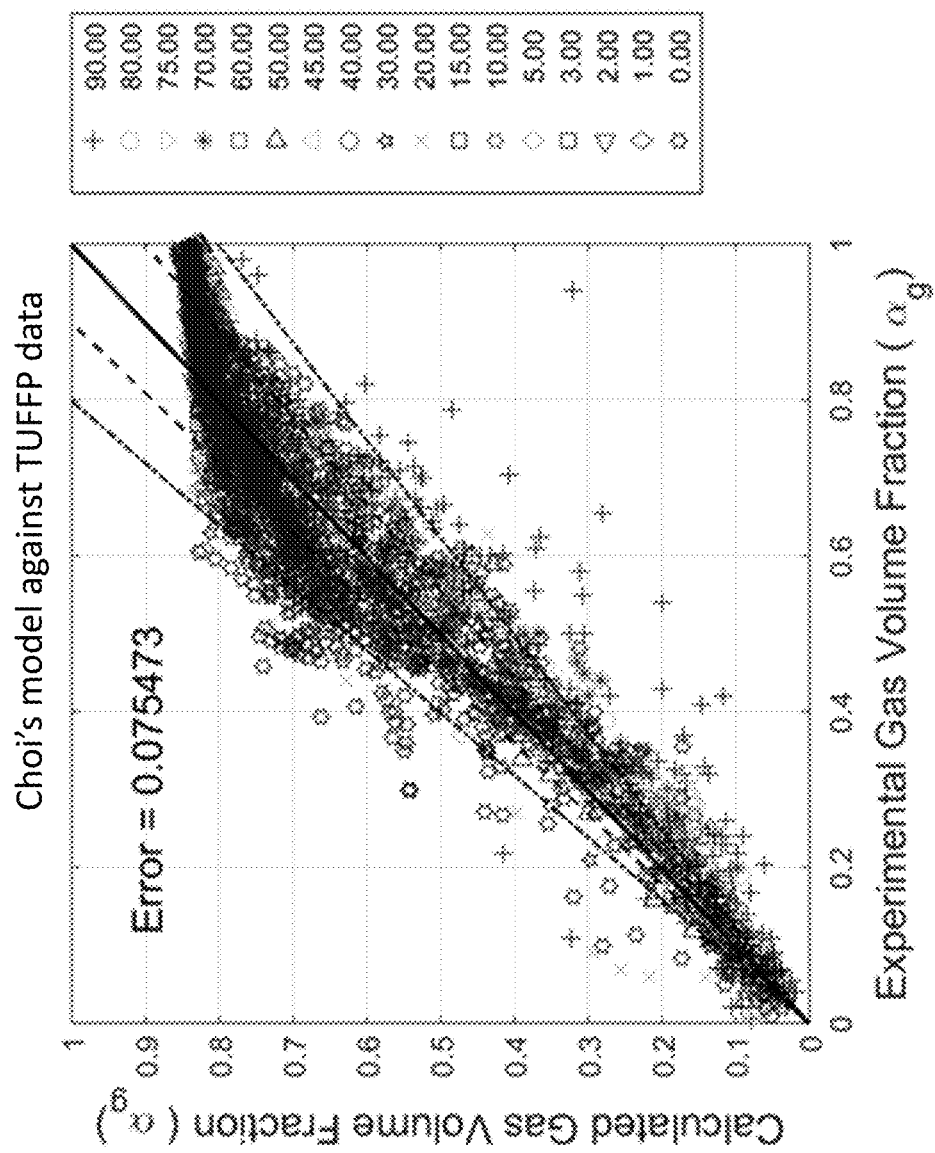
Figure 13D:
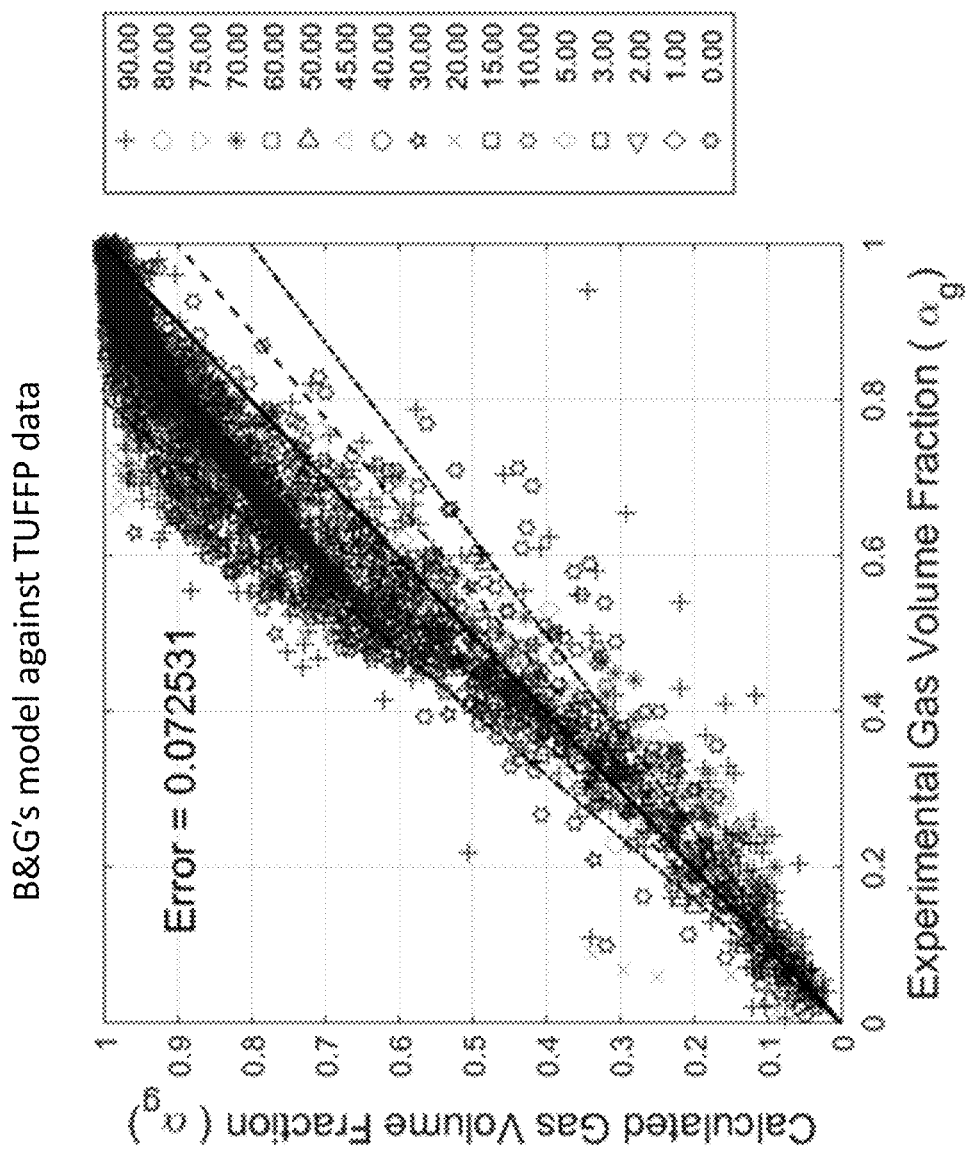

FIGS. 13(a) to 13(d) present cross-plots of predicted gas volume fractions for different DF models against measured gas volume fractions for horizontal and upwards data extracted from the TUFFP dataset. Specifically, FIG. 13(a) is the cross-plot for the proposed model with the $X_{opt.}^{TUFFP}$ parameter set (per Table A.3). FIG. 13(b) is the cross-plot for the proposed model with the $X_{opt.}^{OLGA-S}$ parameter set (also in Table A.3). FIG. 13(c) is the cross-plot for Choi's model. FIG. 13(d) is the cross-plot for the B&G's model. All of the cross-plots are against upward and horizontal pipe inclinations in the TUFFP dataset. The proposed model (using optimal parameter set $X_{opt.}^{OLGA-S}$, as specified in Table A.3 tends to over-predict the gas volume fraction which may be due to the profile parameter $C_0$ always being equal to 1.0 in our particular parameterization. Choi's model tends to underpredict gas volume fraction when $\alpha_g \geq 0.8$. B&G's model tends to over-predict gas volume fractions when $\alpha_g \geq 0.5$.

Figure 14A:
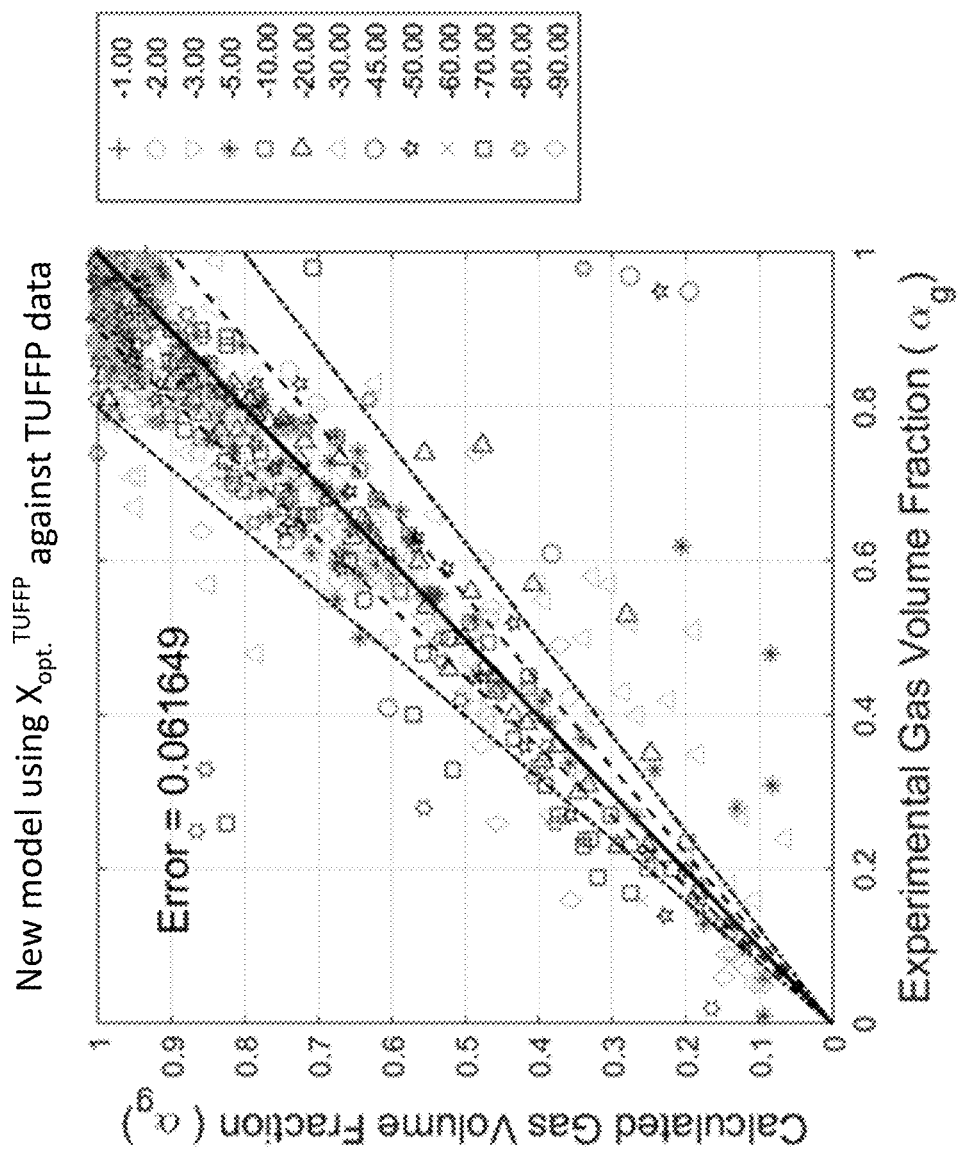
FIGS. 14(a) to 14(d) are cross-plots of predicted gas volume fractions for different DF models against measured gas volume fractions for downwards flow data extracted from the TUFFP dataset.
Figure 14B:
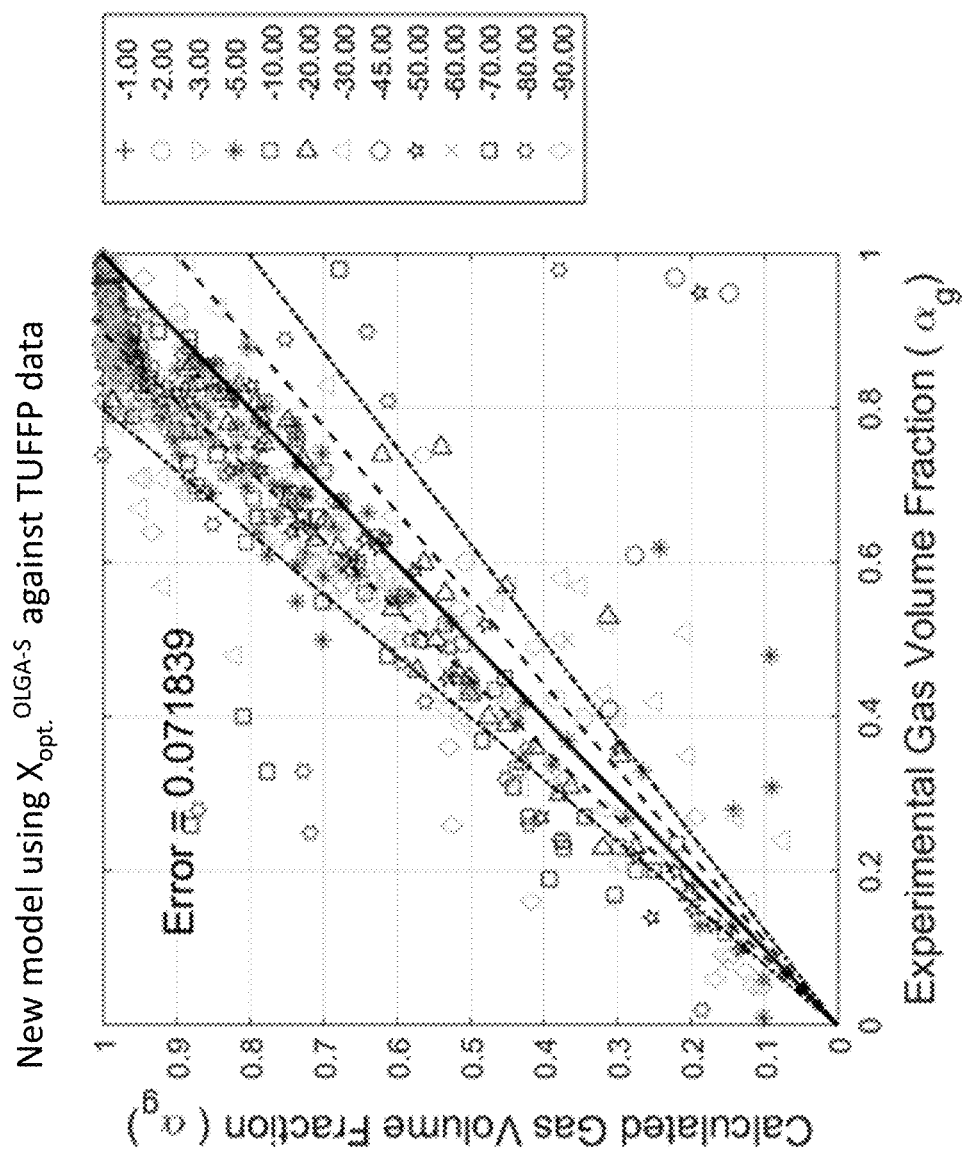

FIGS. 14(a) to 14(d) present similar comparison cross-plots for downwards flow data extracted from the TUFFP dataset. FIG. 14(a) is the cross-plot for the proposed model with the $X_{opt.}^{TUFFP}$ parameter set (per Table A.3). FIG. 14(b) is the cross-plot for the proposed model with the

TABLE A.4

Performance comparison of different drift-flux (DF) models against the TUFFP dataset. Note that 'B&G' refers to Bhagwat & Ghajar [2] DF model, while 'Choi' refers to the model by Choi et al. [11]. The numbers under headings labelled '±10%' represent the percentage of predictions that fall within the ±10% quality bounds. Likewise for values under headings '±20%'.

| Conduit Inclination Range | Upwards Flow 2,730 data points $\{0° < \theta \leq +90°\}$ | | | Horizontal Flow 2,138 data points $\theta = 0°$ | | | Downwards Flow 937 data points $\{-90° \leq \theta < 0°\}$ | | |
|---|---|---|---|---|---|---|---|---|---|
| Comparison criteria | $\varepsilon$ | ±20% | ±10% | $\varepsilon$ | ±20% | ±10% | $\varepsilon$ | ±20% | ±10% |
| This model $X_{opt.}^{TUFFP}$ | 0.045 | 90.4 | 73.4 | 0.042 | 94.2 | 77.3 | 0.062 | 88.9 | 69.9 |
| This model $X_{opt.}^{OLGA-S}$ | 0.060 | 87.9 | 59.0 | 0.066 | 87.8 | 62.2 | 0.072 | 85.1 | 62.0 |
| Choi's model | 0.078 | 88.9 | 45.8 | 0.072 | 90.0 | 52.7 | 0.099 | 90.0 | 42.0 |
| B&G's model | 0.069 | 83.3 | 53.9 | 0.077 | 83.2 | 48.0 | 0.065 | 86.9 | 67.2 |

The proposed model (with optimized parameters) exhibits the best performance over all pipe inclinations. Around 90% of predictions fall within the ±20% error bands and 70% fall within the ±10% error bands for all pipe inclinations. Although Choi's model has similar performance within the ±20% error band, far fewer data fall within the ±10% bounds. The performance of the proposed model using $X_{opt.}^{OLGA-S}$ as model parameters—but applied to the TUFFP data—is reasonable compared with the other two models. For all three models, the performance for horizontal flow are comparable to the accuracy obtained for upward flow prediction. The proposed model, and Choi's, have better performance in upward and horizontal flow regions, while B&Gs model has better performance for downward flow.

Figure 14C:
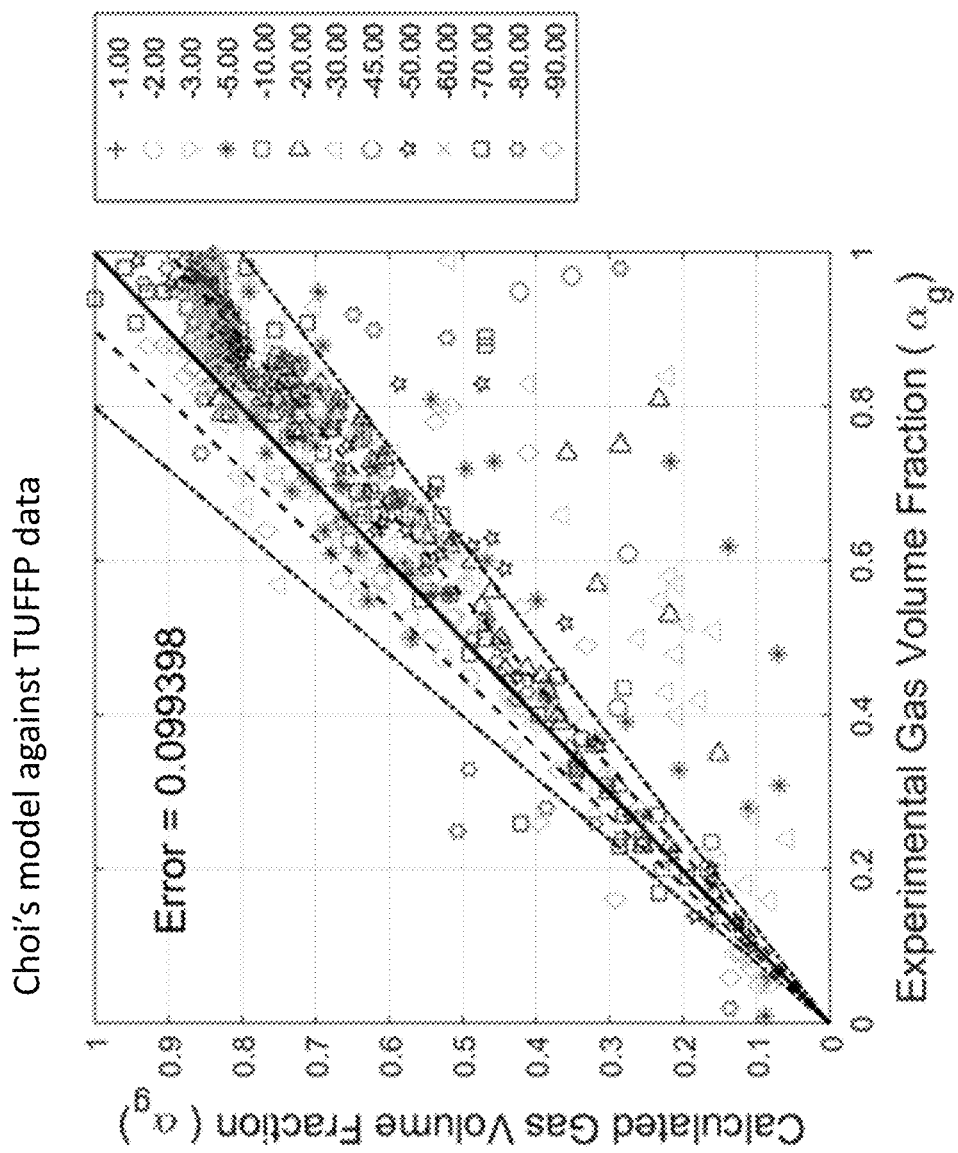
Figure 14D:
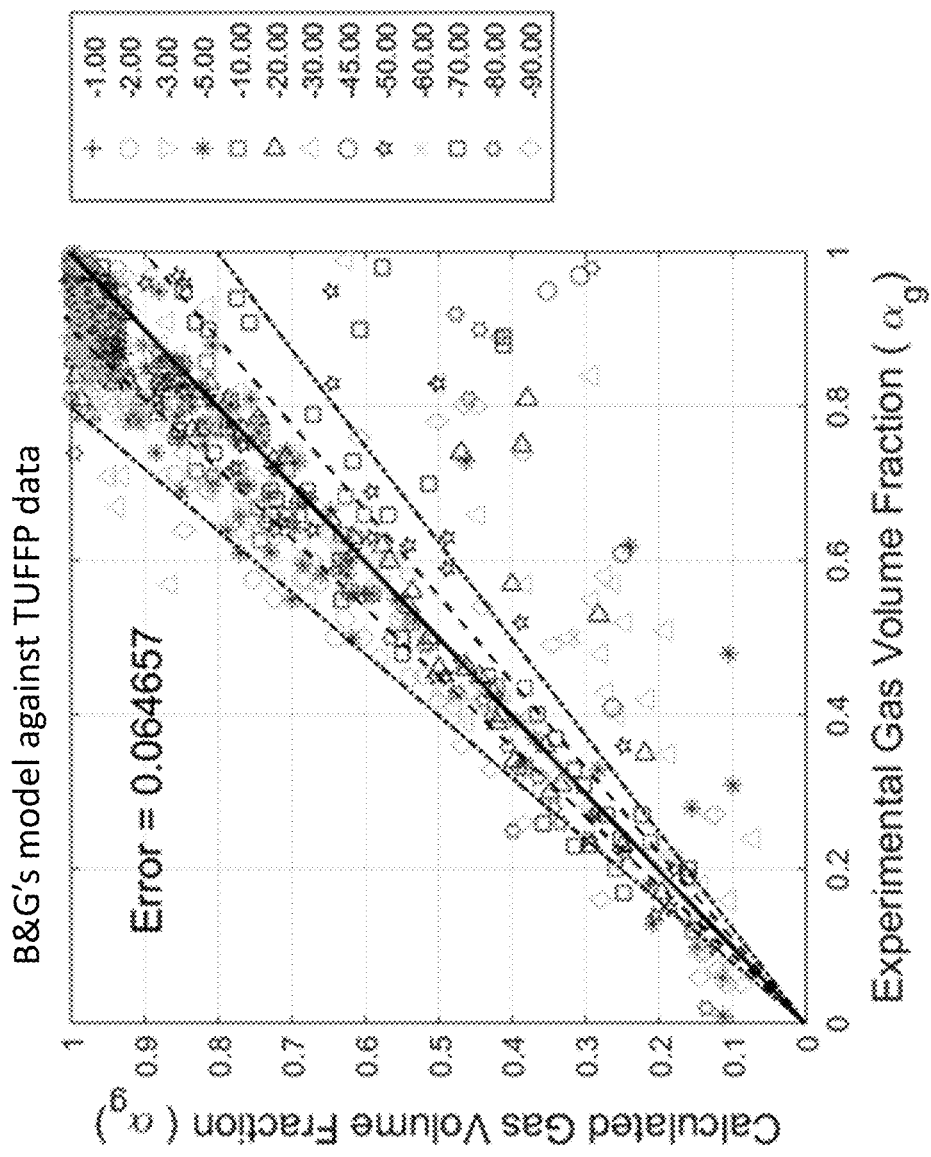

$X_{opt.}^{OLGA-S}$ parameter set (also in Table A.3). FIG. 14(c) is the cross-plot for Choi's model. FIG. 14(d) is the cross-plot for the B&G's model. All of the cross-plots are against downward pipe inclinations in the TUFFP dataset. It is clear from the cross-plots of FIGS. 14(a) to 14(d) that the major differences between models correspond to high gas volume fraction, namely: i.e., $\{0.75 \leq \alpha_g \leq 1.0\}$. The cross-plots for downward flow are more scattered, compared to upward and horizontal inclination for all three models (per FIGS. 14(a) to 14(d)). Outliers of the proposed model are evenly distributed outside the ±20% error bounds, while outliers of Choi and B&G's model are densely clustered below the 20% error bound. Possible reasons for these significant differences in behavior for downward flow are discussed later.

A.6.3 OLGA-S Data: Model Comparison

Table A.5 summarizes comparative performance of the different DF models against the OLGA-S dataset.

TABLE A.5

Simple statistical comparison of different drift-flux models for the OLGA-S dataset.

| Conduit Inclination Range | Upwards Flow 6,720 data points $\{0° < \theta \le +90°\}$ | | | Horizontal Flow 960 data points $\theta = 0°$ | | | Downwards Flow 6,720 data points $\{-80° < \theta < 0°\}$ | | |
|---|---|---|---|---|---|---|---|---|---|
| Comparison criteria | $\varepsilon$ | ±20% | ±10% | $\varepsilon$ | ±20% | ±10% | $\varepsilon$ | ±20% | ±10% |
| This model $X_{opt.}^{TUFFP}$ | 0.022 | 97.9 | 80.6 | 0.023 | 97.3 | 82.0 | 0.030 | 95.1 | 81.8 |
| This model $X_{opt.}^{OLGA-S}$ | 0.019 | 97.8 | 90.7 | 0.023 | 96.7 | 89.2 | 0.030 | 94.7 | 84.9 |
| Choi's model | 0.050 | 95.4 | 32.4 | 0.043 | 96.0 | 43.0 | 0.055 | 91.6 | 45.0 |
| B&G's model | 0.022 | 95.4 | 83.7 | 0.027 | 96.3 | 78.8 | 0.033 | 92.8 | 80.8 |

The predictions of the correlations are all improvements over those observed using the TUFFP dataset. It is probably due to data quality, namely that the OLGA-S dataset is known to be more consistent. The performance of the proposed model, applying optimized parameter sets $X_{opt.}^{TUFFP}$ and $X_{opt.}^{OLGA-S}$ are roughly similar, see Table 5. The parameter set $X_{opt.}^{OLGA-S}$ slightly outperforms in terms of the quantity of points falling within the ±10% error bands. The proposed model and that of B&G have similar mean absolute errors, $\varepsilon$, for upward and downwards inclinations, although the B&G's model error at horizontal is slightly higher than that obtained from the proposed model. The performance of the two models are also comparable in terms of the percentage of results falling within the ±20% and ±10% error bounds. In general, however, both models perform significantly better than Choi's model. We also observe that all three models have significantly better performance for upward and horizontal inclinations than they do for downward flow.

Figure 15A:
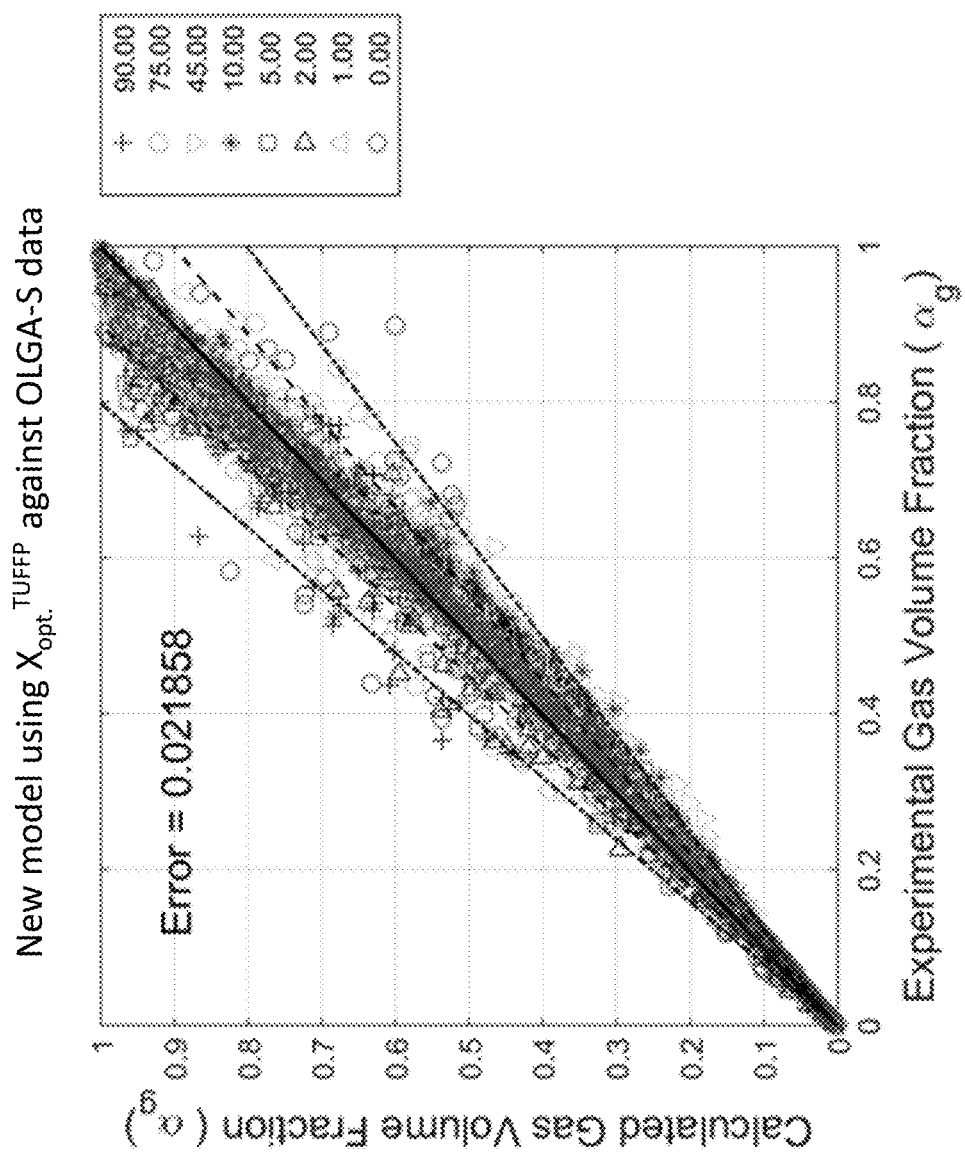
FIGS. 15(a) to 15(d) are cross-plots of predicted gas volume fractions for different DF models against gas volume fractions for horizontal and upwards flow extracted from the OLGA-S dataset.
Figure 15B:
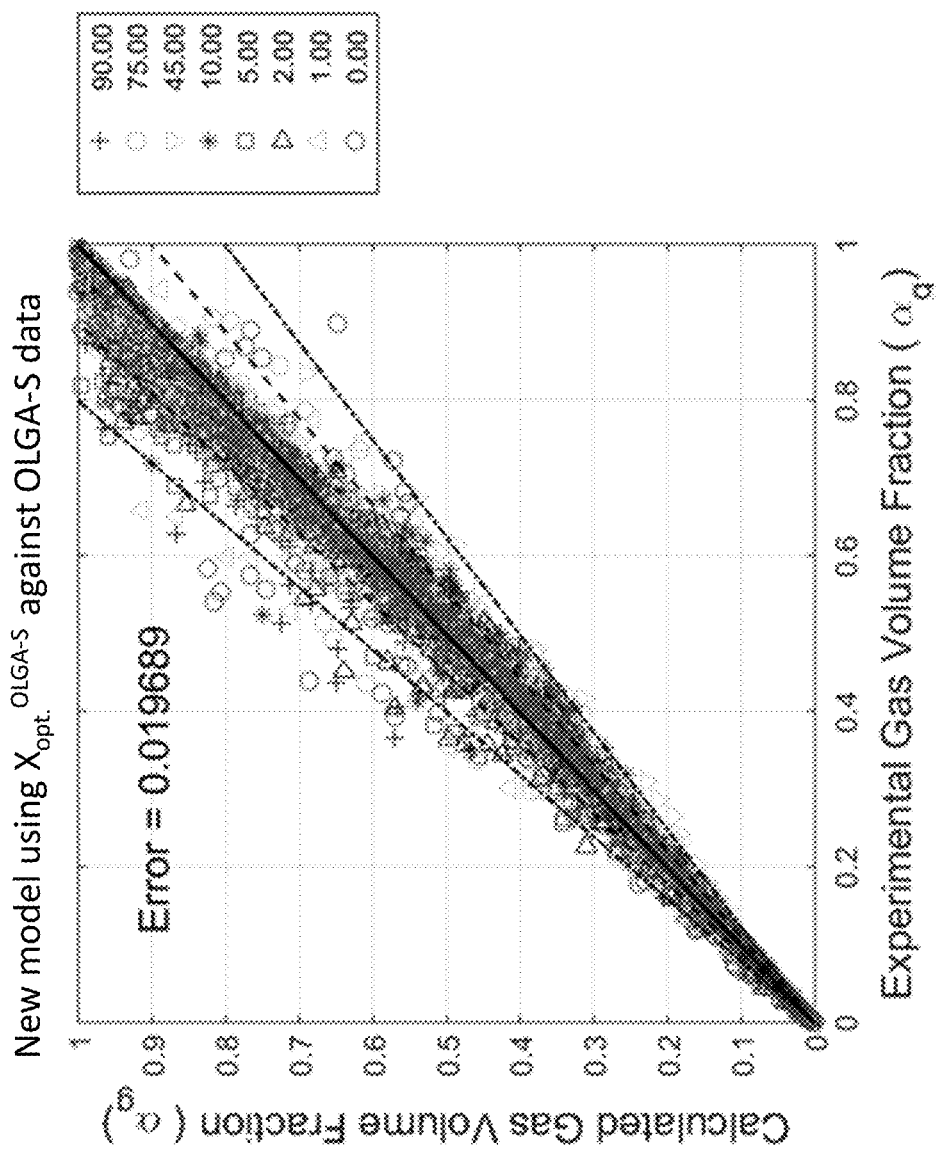
Figure 15C:
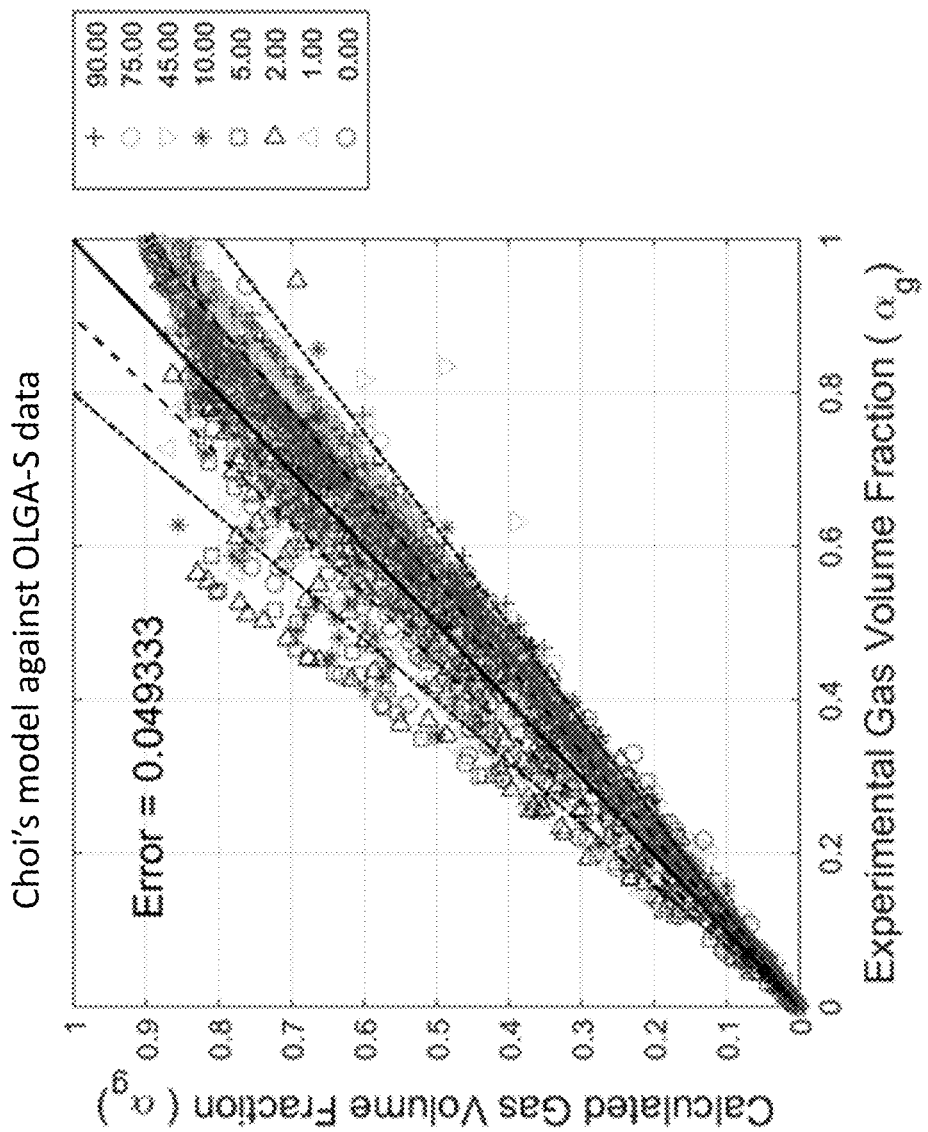
Figure 15D:
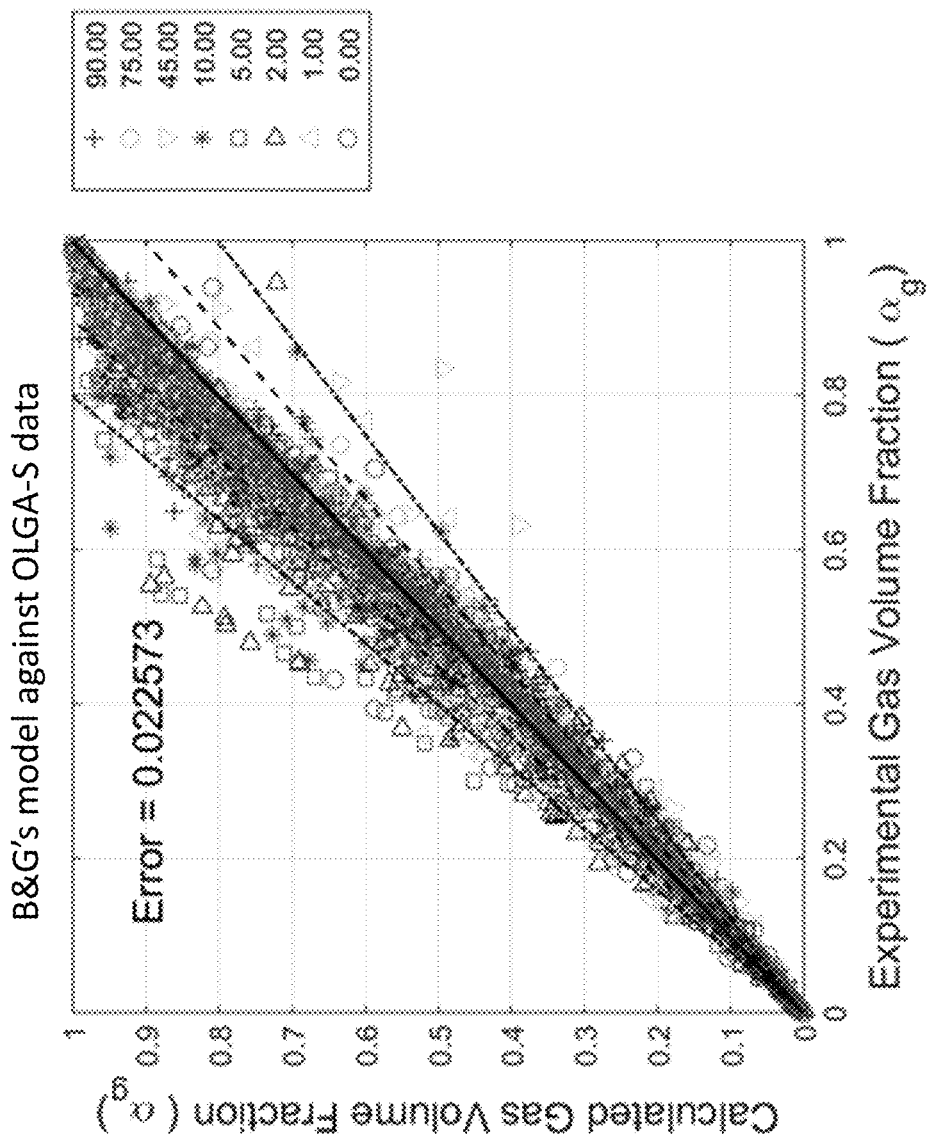

FIGS. 15(a) to 15(d) present cross-plots of predicted gas volume fractions for different DF models against gas volume fractions for horizontal and upwards flow extracted from the OLGA-S dataset. FIG. 15(a) is the cross-plot for the proposed model with the $X_{opt.}^{TUFFP}$ parameter set (per Table A.3). FIG. 15(b) is the cross-plot for the proposed model with the $X_{opt.}^{OLGA-S}$ parameter set (also in Table A.3). FIG. 15(c) is the cross-plot for Choi's model. FIG. 15(d) is the cross-plot for the B&G's model All of the cross-plots are against upward and horizontal pipe inclinations in the OLGA-S dataset. These plots show that that the performance of the proposed model (employing optimized parameter sets $X_{opt.}^{TUFFP}$ and $X_{opt.}^{OLGA-S}$ are comparable, although the results using $X_{opt.}^{TUFFP}$ has fewer predictions located outside the ±20% error bounds. The major outliers observed for all models (proposed, Choi and B&G) approximately lie within the mid-range of gas volume fraction, namely: i.e., $\{0.25 \le \alpha_g \le 0.75\}$, and lie above the ±20% error bound, suggesting they all over-predict $\alpha_g$. For high gas volume fractions in the range: $\{0.55 \le \alpha_g \le 1.0\}$, the proposed model (using optimized parameters in Table A.3) slightly over-predicts gas volume fraction. Choi's model tends to under-predict when $\alpha_g \ge 0.8$, while B&G tends to over-predict when $\alpha_g \ge 0.5$.

Figure 16A:
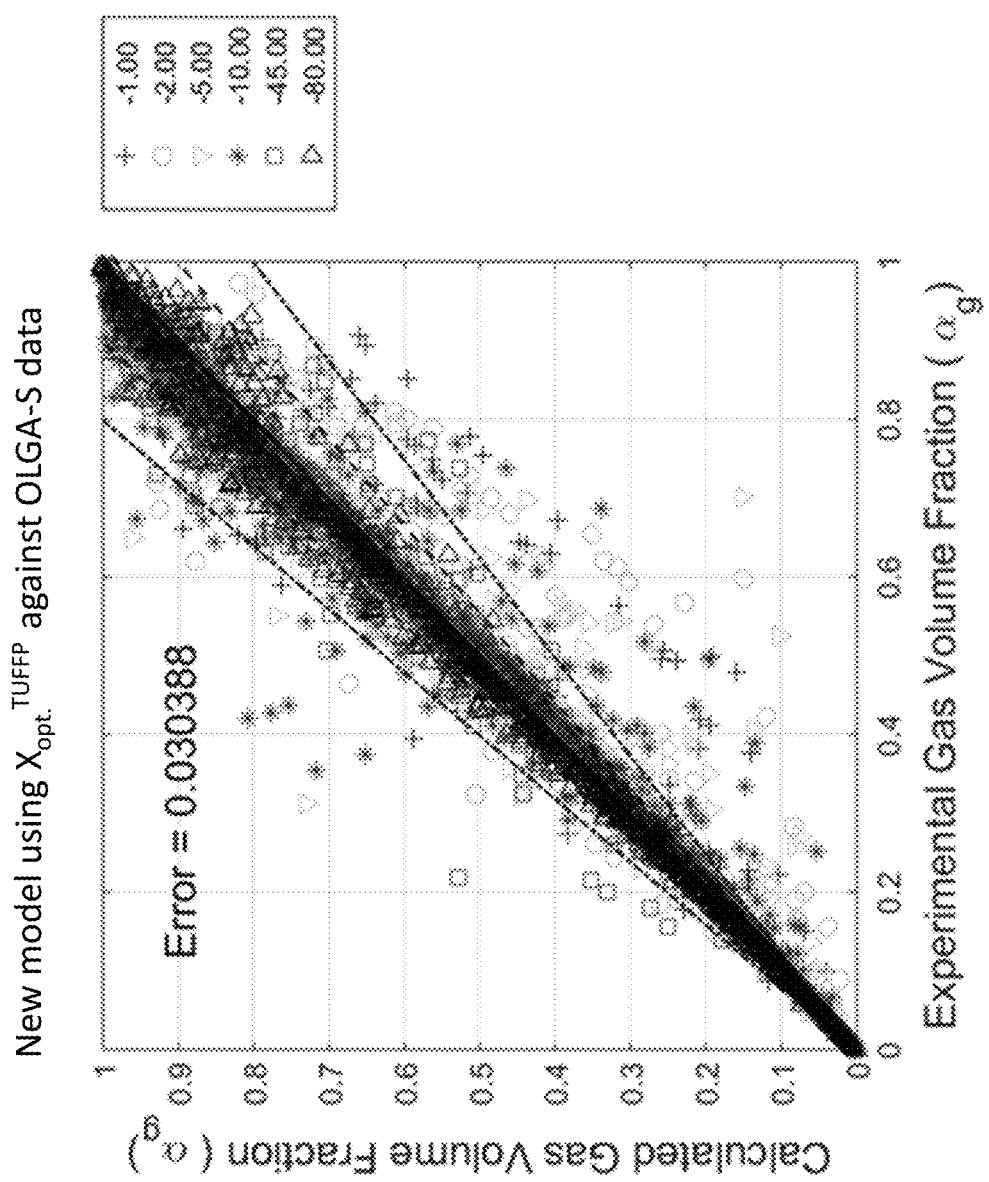
FIGS. 16(a) to 16(d) are cross-plots of predicted gas volume fractions for different DF models against gas volume fractions for downwards flow extracted from the OLGA-S dataset.
Figure 16B:
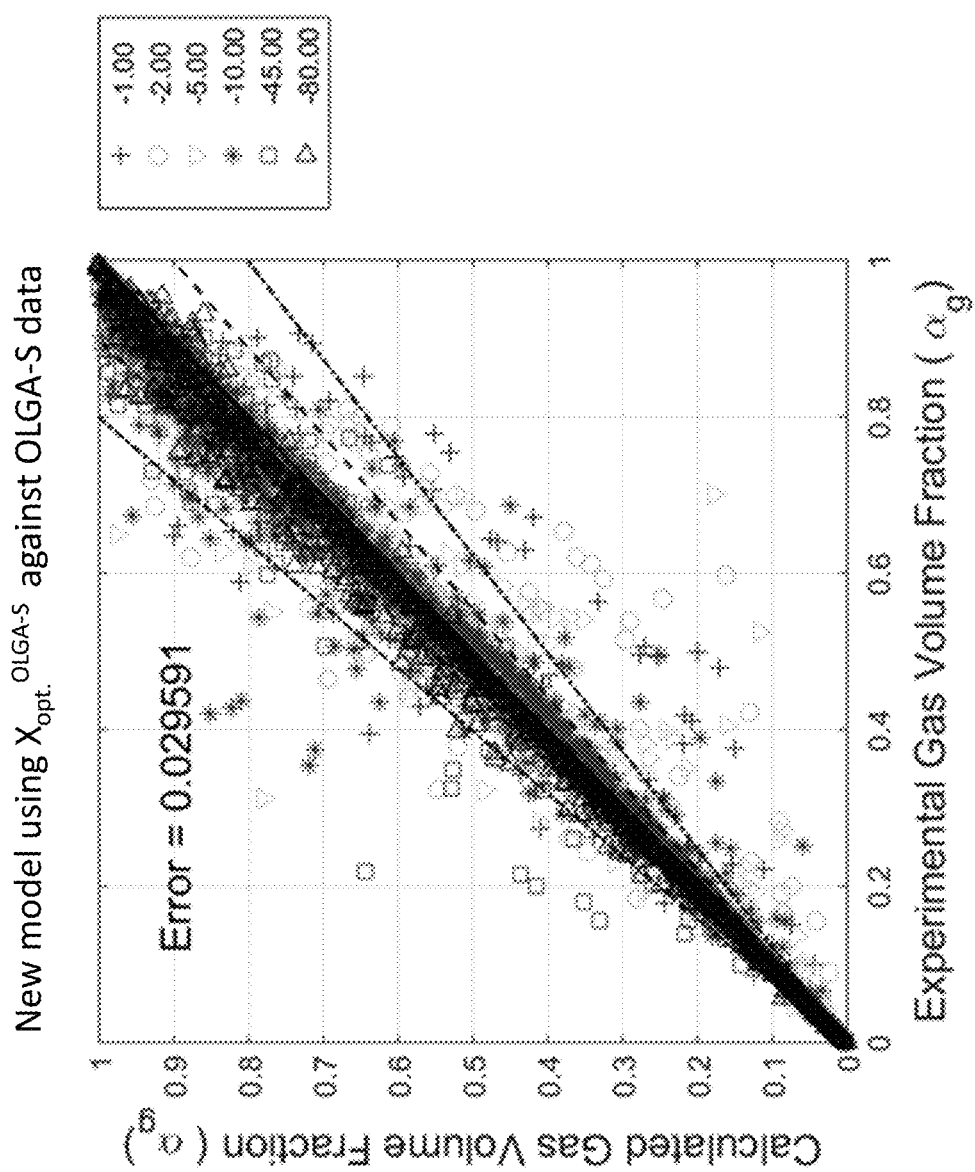
Figure 16C:
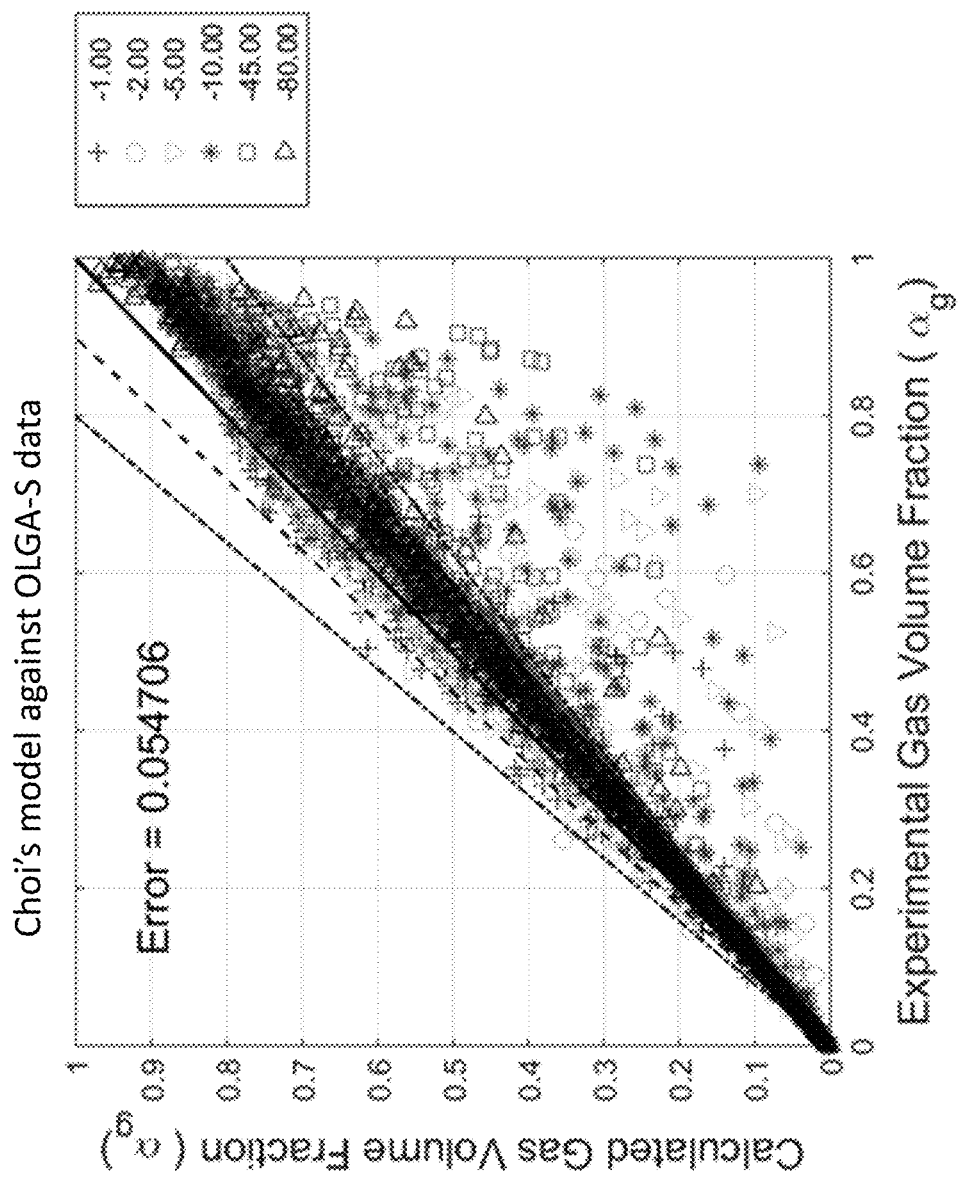
Figure 16D:
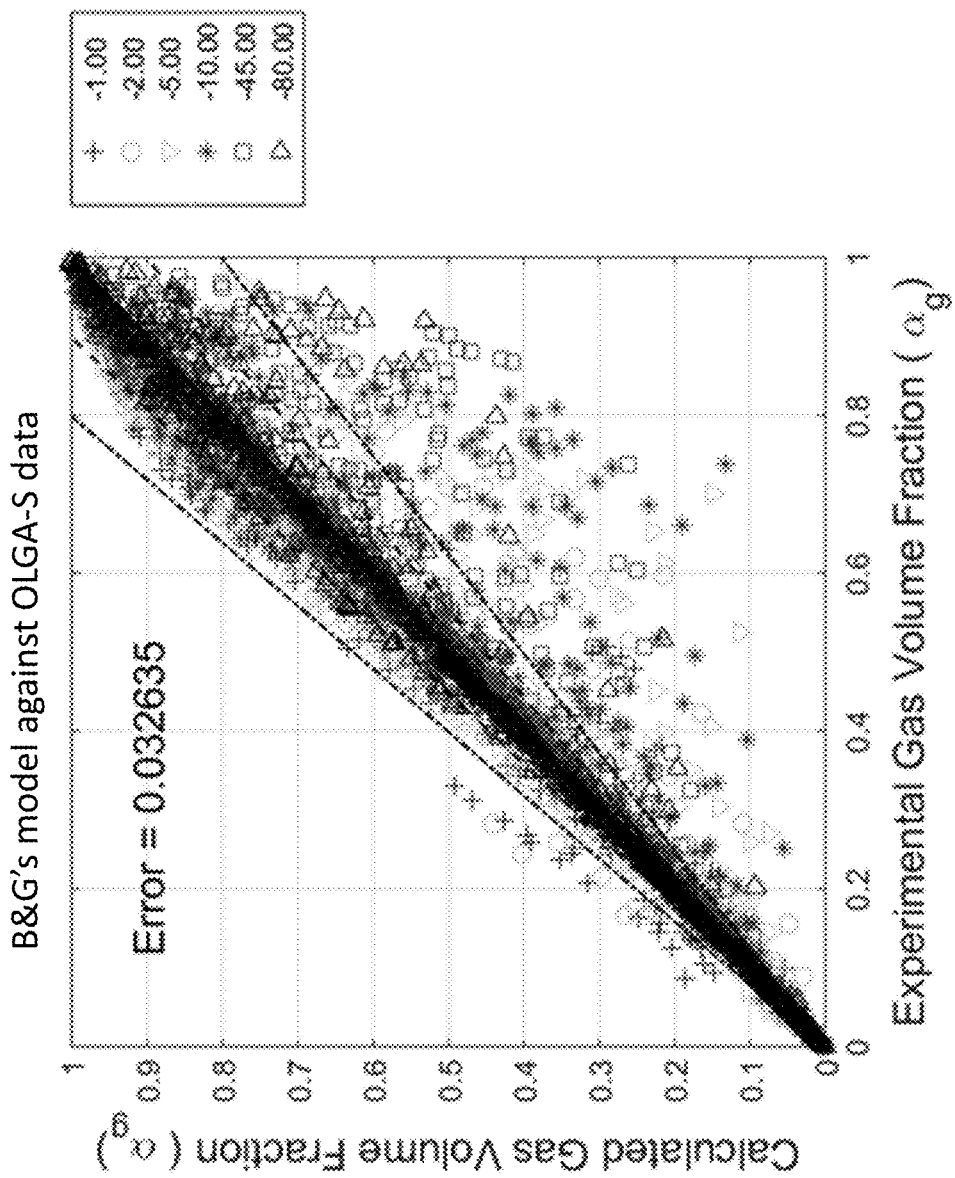
Figures 17A, 17B:
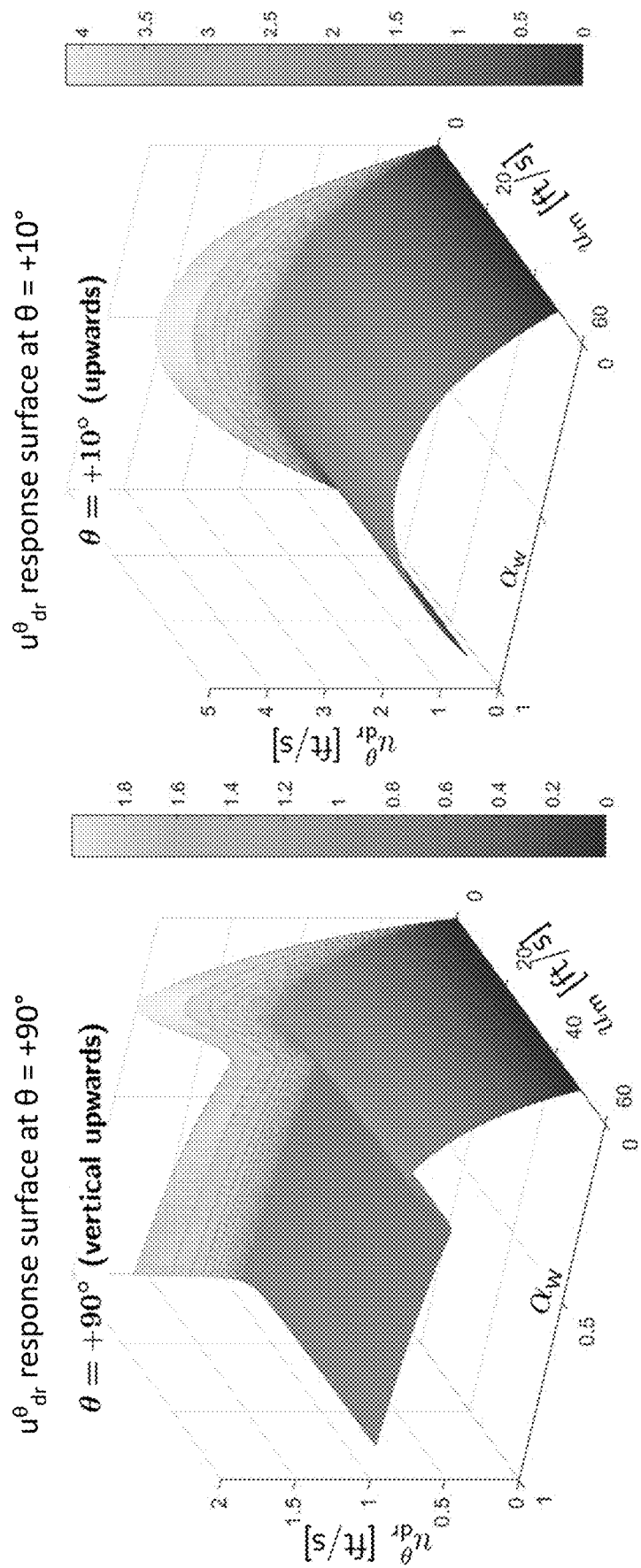
FIGS. 17(a) to 17(f) are plots of $u_{dr}^{\theta}$ with respect to $u_m$ and $\alpha_w$ at six inclination angles $\{+90°, +10°, 0°, -10°, -45°, -80°\}$ to illustrate model continuity and smoothness over the entire solution surface.
Figure 17D:
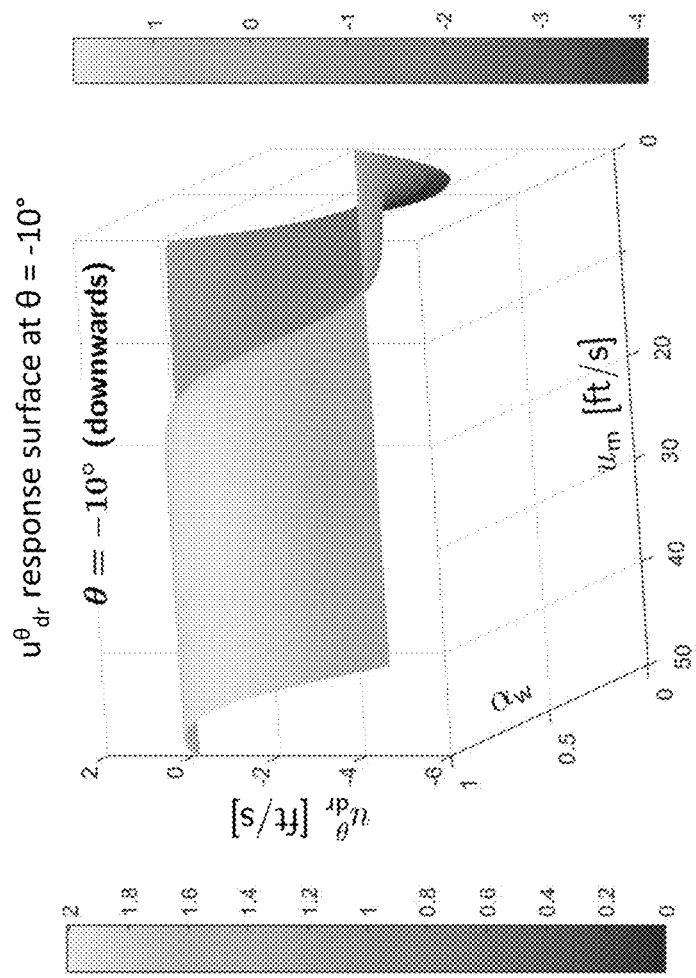
Figure 17C:
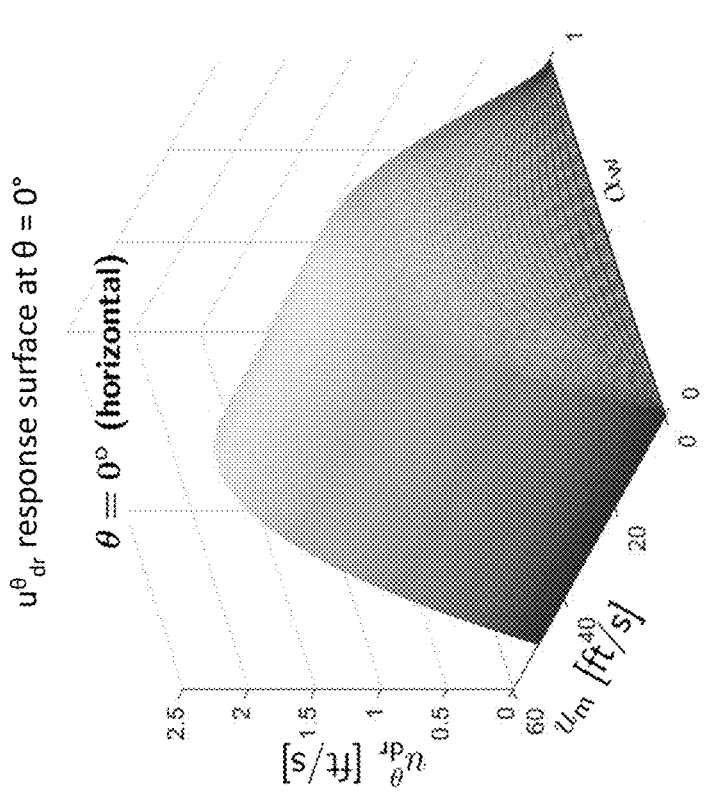
Figure 17F:
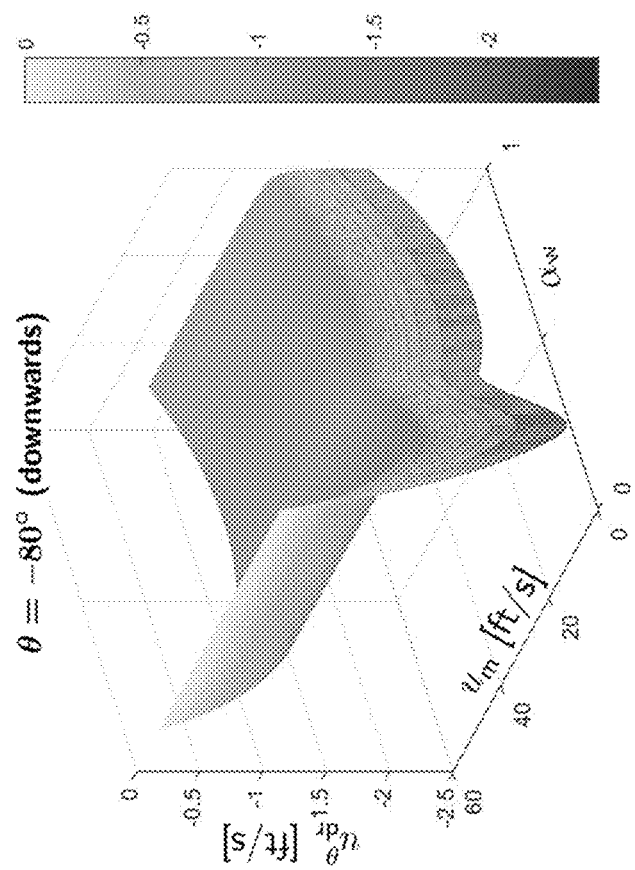
Figure 17E:
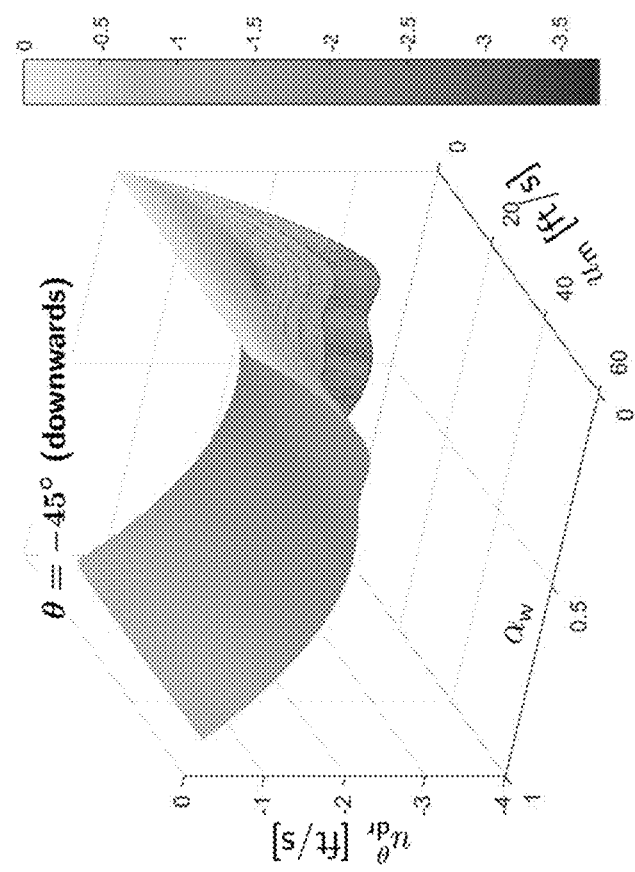
Figure 18B:
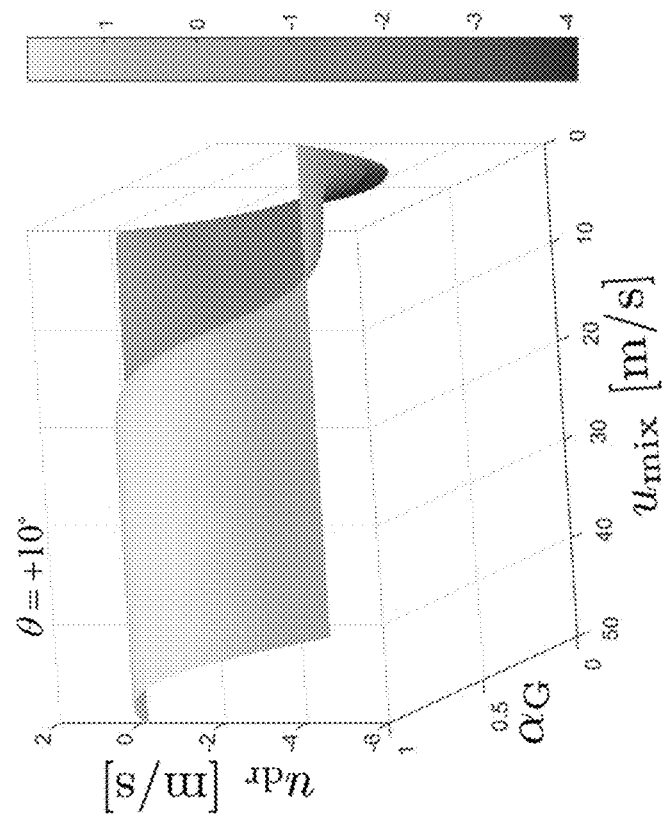
FIGS. 18(a) to 18(f) shows the derivative of $U_{dr}^{\theta}$ with respect to $u_m$ and $\alpha_w$ for six inclination angles $\{+90°, +10°, 0°, -10°, -45°, -80°\}$ with the calculated $u_{dr}^{\theta}$ spanning the range: $\{0 < u_m \leq 15$ m/s$\}$.
Figure 18A:
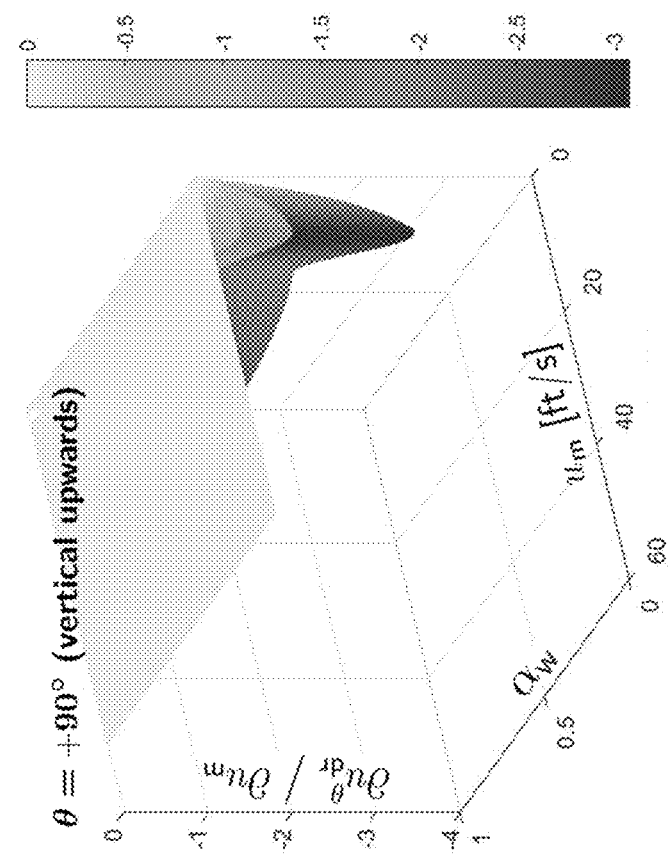
Figure 18D:
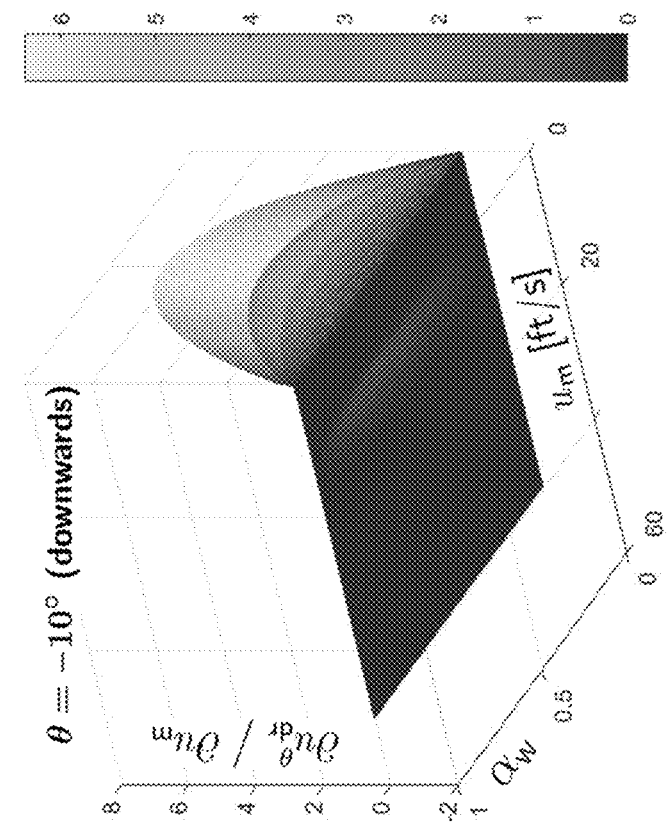
Figure 18C:
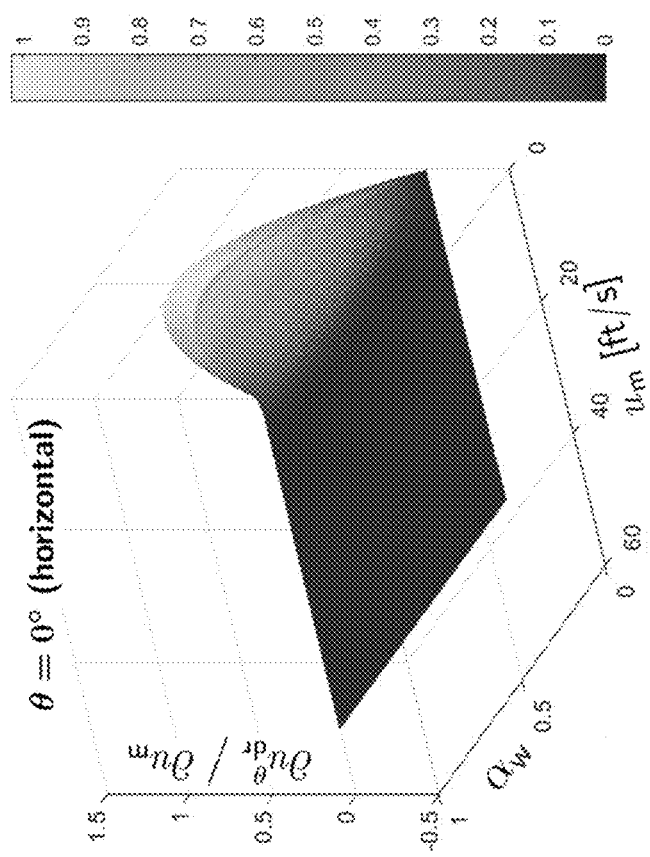
Figure 18F:
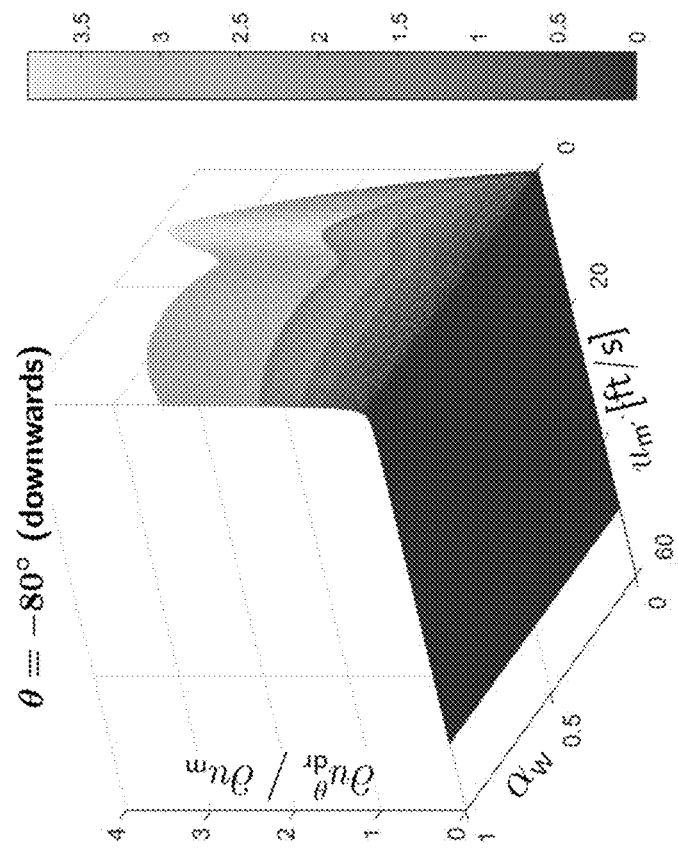
Figure 18E:
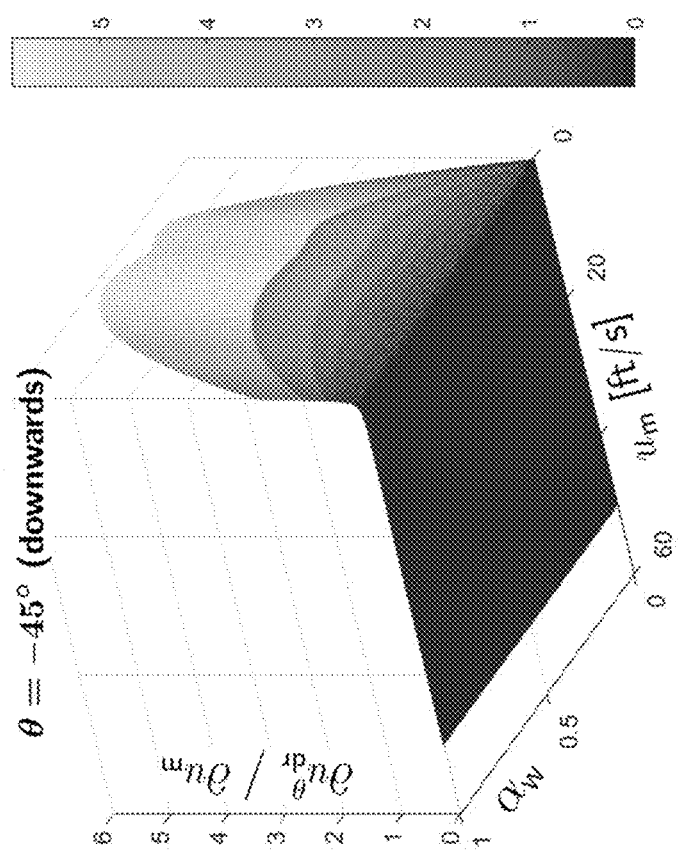

FIGS. 16(a) to 16(d) presents similar comparisons for downwards flow using the OLGA-S data set. FIG. 16(a) is the cross-plot for the proposed model with the $X_{opt.}^{TUFFP}$ parameter set (per Table A.3). FIG. 16(b) is the cross-plot for the proposed model with the $X_{opt.}^{OLGA-S}$ parameter set (also in Table A.3). FIG. 16(c) is the cross-plot for Choi's model. FIG. 16(d) is the cross-plot for the B&G's model. All of the cross-plots are against downward pipe inclinations in the OLGA-S dataset. We observe roughly the same model behavior as stated previously for the TUFFP dataset, see sub-section A.6.2. The major outliers attributed to the proposed model are slightly fewer in number than those attributable to Choi and B&G. These outliers are also more evenly distributed outside both +20% and −20% error bounds. The outliers associated with both Choi's and B&G's models appear to be more densely populated below the 20% error bound, indicating a consistent underestimation of gas volume fraction.

A.6.4 Utility of Using OLGA-S

Although the overall performance of the optimized parameter set $X_{opt.}^{TUFFP}$ (see Table A.3) is slightly better than that obtained from $X_{opt.}^{OLGA-S}$ (same table), the latter has specific utility in practical applications.

First, the OLGA-S library is embedded in PIPESIM which means new data may be generated to suit specific requirements as and when they may arise. One merely needs to re-optimize model parameters to this new data (say $X^{OLGA-Revised}$). This provides a custom-tuned flow model that better satisfies the required data.

Second, the implementation of an OLGA-derived optimized data set in a unified fully-coupled full-field simulator (such as IAM) allows engineers to define a unified flow model from sandface-to-facilities. We have a single flow model throughout.

Third, applying a profile parameter, $C_0=1.0$ can guarantee hyperbolicity of transient drift-flow modelling in standalone wellbore or pipeline simulators (Eghorieta et al.[32], 2018). This kind of simulator can be applied in gas kick modeling and detection (Xu et al.[33], 2018).

A.6.5 Evaluating Model Smoothness: Stand-Alone

Numerical smoothness of the model (not coupled to the simulator for now) is based on two criteria proposed by Tang et al., [1] (refer to section A.1.4). The first criterion is to ensure mixture velocity is an input and not superficial velocities, which is typical for steady-state pipe flow modelling. The second criterion requires the model to be continuous and differentiable in the entire range of primary variables. Jiang[34] (2008), Livescu et al.[9] (2010) and Tang et al.[35] (2017) state that, apart from pressure, P, the primary parameters for a pipe flow module of a reservoir simulator are typically:

Liquid hold-up, $\alpha_L$ (also water hold-up, $\alpha_w$ or oil hold-up $\alpha_o$), and Mixture velocity, $u_m$, (or total volume flux)

It should be noted that the criteria above apply to 'GURU-MSW' (described later). Other reservoir simulator pipe flow modules (including the commercial MSW) may utilize different sets of primary variables. Note that wll models that use natural variables employ different variables, which can include pressure, P, gas fraction (of total pipe wetted perimeter), water fraction, oil fraction, total volume flux and temperature (if thermal). The reason for differences in independent variables is that flow-line models, such as PIPESIM, tend to use correlations (e.g., Beggs & Brill[36]) which utilize these variables as well as superficial velocities: $u_L^s$ and $u_g^s$.

Liquid hold-up (similar to void fraction in 2-phase flow) and mixture velocity (similar to total volume flux) were chosen for our analysis because they are explicitly stated in the model function. However, the correct selection of primary parameters is acknowledged to be an essential aspect of model definition.

As 'GURU-MSW' code could be modified easily, other variables were indeed considered, but time constraints (and study objectives) limited our ability to evaluate other parameter combinations. It should be noted that pressure and temperature are implicit in 'GURU-MSW' also. Temperature, in particular, deserves attention.

Let us consider liquid hold-up (in this case water), $\alpha_w$, and mixture velocity, $u_m$, as representative parameters. FIGS. 17(a) to 17(f) are plots of $u_{dr}^\theta$ with respect to $u_m$ and $\alpha_w$ at six inclination angles to illustrate model continuity and smoothness over the entire solution surface. The solution surface is defined by $u_{dr}^\theta$, $u_m$ and $\alpha_w$. The model is tested against OLGA-S data. It can be easily observed that the drift-velocity correlation is continuously differentiable with respect to $\alpha_w$.

FIGS. 18(a) to 18(f) shows the derivative of $u_{dr}^\theta$ with respect to $u_m$ and $\alpha_w$ for six pipe inclinations with the calculated $u_{dr}^\theta$ spanning the range: $\{0<u_m \leq 15 \text{ m/s}\}$. FIGS. 18(a) to 18(f) show the derivative response surface of the proposed model at six inclinations (as shown). The derivative response surface is defined by $\partial u_{dr}^\theta/\partial u_m$, $u_m$, $\alpha_w$. We observe that while the derivative function of the model changes rapidly as $u_m \to 0$ [m/s], the surface remains continuous and is also limited to a 'reasonable' value range. We conclude that the model appears to comply with the prerequisites necessary for eligibility for implementation into a fully-coupled wellbore-reservoir simulator.

A.6.6 Impact of Parameter 3

Using OLGA-S data, through optimization, we determined that A=1:0. This results in $C_0$=1:0 because, from Eqn. (A.6):

$$C_0 = \frac{A}{1+(A-1)\gamma^2} \to 1.0 \text{ as } A \to 1.0.$$

Note that parameter γ, per Eqn. (A.7), was defined earlier as:

$$\gamma = \max\left[\min\left(\frac{\beta-B}{1-B}, 1\right), 0\right].$$

With A☐1.0 (the value using TUFFP data was A=1.088) we avoid the influence that $C_0$ may have on model smoothness. Note that we did not force A=1.0 as this was a natural outcome of our parameter optimization per Section A.3.

However, when A≠1.0, the formulation of β will soon impact the solution. This raises concerns about its ability to comply with the stated requirement of 'continuous and differentiable' due to the presence of the 'max' function, namely:

$$\beta = \max\left(\alpha_g, F_v \frac{\alpha_g |u_m|}{(u_g)_{flood}}\right).$$

Figures 19A, 19B:
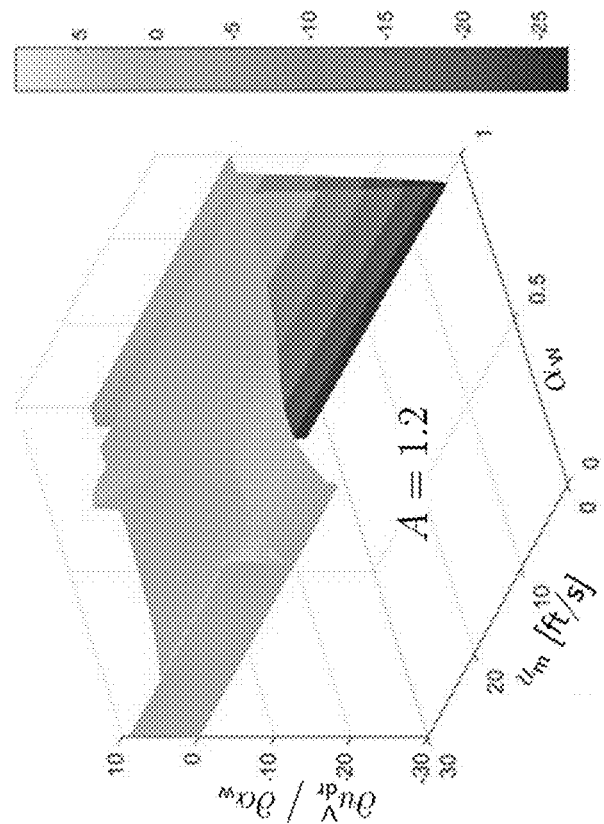
FIGS. 19(a) and 19(b) shown the response surfaces for $\partial u_{dr}^V/\partial u_m$ and $\partial u_{dr}^V/\partial \alpha_w$, respectively, when the parameter A is fixed at A=1.2.

It is reasonable to ask: does this 'max' undermine the stated requirement of 'continuous and differentiable'? A simple test is shown in FIGS. 19(a) and 19(b), which show the response surfaces when the parameter A in Eqn. (A.6) is fixed at A=1.2, thereby ensuring that the 'max' function in Eqn. (A.8) for β will affect results. The inclination θ=+90° (vertical upwards). FIG. 19(a) shows $\partial u_{dr}^V/\partial u_m$, and FIG. 19(b) shows $\partial u_{dr}^V/\partial \alpha_w$. Both are plotted against $u_m$ and $\alpha_w$. Note that this test only involves the $u_{dr}^V$ term. We pre-defined A=1.2 for all tests as this ensures the 'max' function comes into play. From FIG. 19(a) one observes a spike in the response surface of $\partial u_{dr}^V/\partial u_m$ at roughly $u_m \approx 16$ m/s. From FIG. 19(b), the solution surface of $\partial u_{dr}^V/\partial \alpha_w$ is generally smooth yet some step gradients do exist, especially around $\alpha_w \gtrsim 0.9$ and $\alpha_w \to 0$. While the surface is not 'ideal' (i.e., a benign, gentle surface), the changes observed do not affect solution stability.

We suspect that although these discontinuities in the original model for $u_{dr}^V$ does not terminate simulation, it will likely cause time-step chopping and increase convergence time. This observation may become much more significant in modelling heavy oils. This is because some researchers [11, 37, 38] suggest that $C_0$ should be closer to 2, rather than unity. This issue, however, impacts only the formulation of the existing model for $u_{dr}^V$ and does not impact $u_{dr}^H$. It will, however, affect the behavior of $u_{dr}^\theta$ and should be tagged for consideration in the future.

A.7 Three Phase Flow

We now demonstrate compatibility of the proposed model within the existing three-phase flow framework of the drift-flux model, and follow the solution procedure outlined by Shi et al.[39], 2005. While the various expressions constituting the 3-phase solution are not repeated here, the 2-step solution is as follows:

1. Treat 3-phase flow as a 2-phase Gas-Liquid flow with average properties for the liquid phase. Then compute the 2-phase volume fractions applying the proposed model, Eqn. (A.15).

2. Compute oil and water volume fractions within the liquid phase (applying the existing MSW drift-flux oil-water model without any modification).

Figure 20:
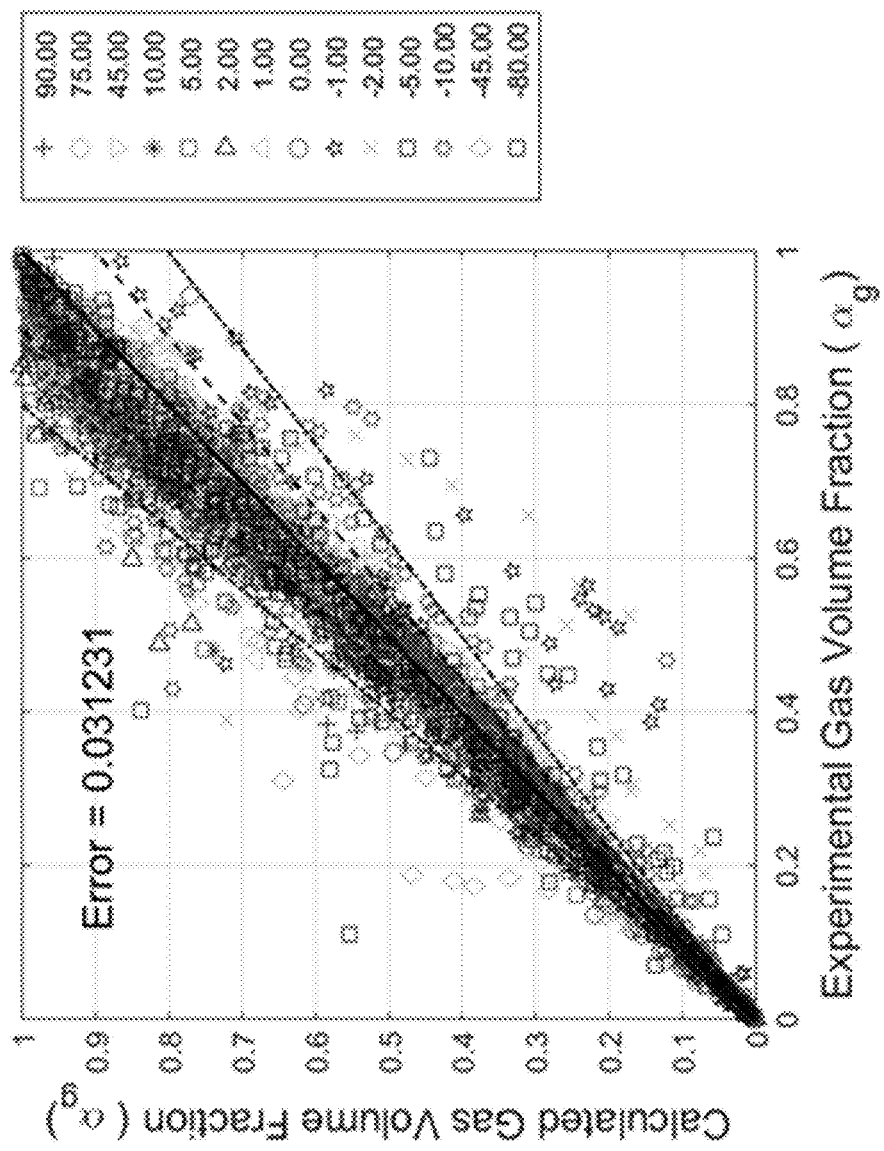
FIG. 20 is a cross-plot of $\alpha_g$ for 10,080 OLGA-S data for 2- and 3-phase flow data over inclination angles in the range: $\{-80° \leq \theta \leq +90°\}$.

We tested the model against 10,080 OLGA-S 3-phase flow data generated in the same manner as our 2-phase flow data. The range of the 3-phase flow data covered the range: $\{-80° \leq \theta \leq +90°\}$. Cross-plot over all inclinations is shown FIG. 20. Specifically, FIG. 20 is a cross-plot of $\alpha_g$ for 10,080 OLGA-S generated 3-phase flow data over pipe inclination range: $\{-80° \leq \theta \leq +90°\}$. Results used the existing MSW 2-step solution procedure, but using the proposed model to define gas-liquid flow (refer Shi et al.[39]). The results appear to agree with the data reasonably well. We can conclude that the proposed model is compatible with the existing MSW solution framework for 3-phase flow.

A.8 Coupled Model Evaluation

The new model, as defined in Eqn. (A.15), appears to furnish reasonable solutions for void fractions as shown earlier in Section A.6. We now apply it to a fully-coupled reservoir-wellbore simulator, one that effectively acts as a simplified proxy to MSW. The purpose being to estimate potential suitability for implementation into MSW.

A8.1 Simulators Used for Testing

In order to test the model, we introduce a MATLAB-driven test-harness that incorporates an ECLIPSE™ proxy (called 'GURU', refer Yan[40], 2017) and its MSW counterpart (refer Tang et al.[1] and Tang[41]). We refer to this fully-coupled simulator as 'GURU-MSW' for convenience. The ' GURU' test model consists of 195 cells with properties shown in Table A.6-1. The segmented well model comprises 12 segments located in grid range: i=[4:13]; j=7. Simulation forecast period was 500 days. The Peng-Robinson[42] Equation of State (EoS) was used throughout, with composition as shown in table A.6-2 below:

TABLE A.6-1

Basic 'GURU' reservoir model properties.

| Property | Value(s) and Units |
|---|---|
| Grid Dimensions | i = 15, j = 13, k = 1. Total: 195 cells |
| Top Depth | Z = 3000 feet |
| Grid Block Size (x and z direction) | $L_x$ = 100 feet and $L_z$ = 500 feet |
| Grid Block Size (y direction) | $L_y$ = {4 × 100, 50, 10, 5, 10, 50, 4 × 100} (all in feet) |
| Porosity | $\varphi$ = 0.10 |
| Permeability | $k_{x,y}$ = 100 mD and $k_z$ = 10 mD |
| Initial Pressure | $P_{init}$ = 3000 psia |
| Initial Temperature | $T_{init}$ = 200° F. |
| Initial Saturation | $S_{w,init}$ = 0.30 |

TABLE A.6-2

Lower table: Hydrocarbon composition.

| Component | $CO_2$ | $C_1$ | $C_{2-4}$ | $C_{5-6}$ | $C_{7+}$ |
|---|---|---|---|---|---|
| MWT | 44.01 | 16.093 | 43.369 | 78.943 | 265.35 |
| Mol %, $z_i$ | 0.06 | 60.01 | 6.55 | 4.03 | 29.35 |

The 'GURU-MSW' fully-implicit simulator utilizes an 'up-wind' solution only. This is simpler than the commercial MSW which has both 'up-wind' and 'down-wind' solvers with flow computed at segment inlets and outlets simultaneously. The numerical architecture necessary to achieve this was exceedingly hard to construct and required man-years to develop. However, the result is an ability to consider both co- and counter-current flow—something 'GURU-MSW' cannot do. As such our investigations here must be deemed preliminary. All the partial derivatives necessary for fully-coupled solution are computed using a numerical perturbation scheme in 'GURU-MSW', details of which are beyond the scope of this report.

The intent of this part of the work is to gauge model response, remove any numerical errors that may be encountered, and confirm stability and smoothness for co-current flow (i.e., upwind solution) for various well configurations.

A.8.2 Testing the Coupled Model

Tests were conducted on four different well orientations of the MSW as illustrated in FIGS. 2 and 21, namely:
1. Toe up: $\theta$=+10° (flow is upwards),
2. Toe down: $\theta$=−10° (flow is downwards),
3. Undulating hump: $\theta$=+10° then changes to −10° (i.e., flow goes up then down), and
4. Undulating sump: $\theta$=−10° then changes to +100 (i.e., flow goes down then up).

In FIG. 21, the reservoir model is shown on the left with wellbore location. Solution is along the well (toe-to-heel) from segment #12 to #1. Upwards is $\theta$=+10° and down is $\theta$=−10°. If the proposed model proves stable and robust over these configurations, then it is reasonable to assume that the model may prove suitable for any well configuration.

Different coupled wellbore-reservoir simulators may have different primary variables. Since pressure and molar density of each hydrocarbon component are implicitly correlated with density and viscosity, we take water hold-up, $\alpha_w$, and mixture velocity, urn, as representative parameters to evaluate.

Figure 22:
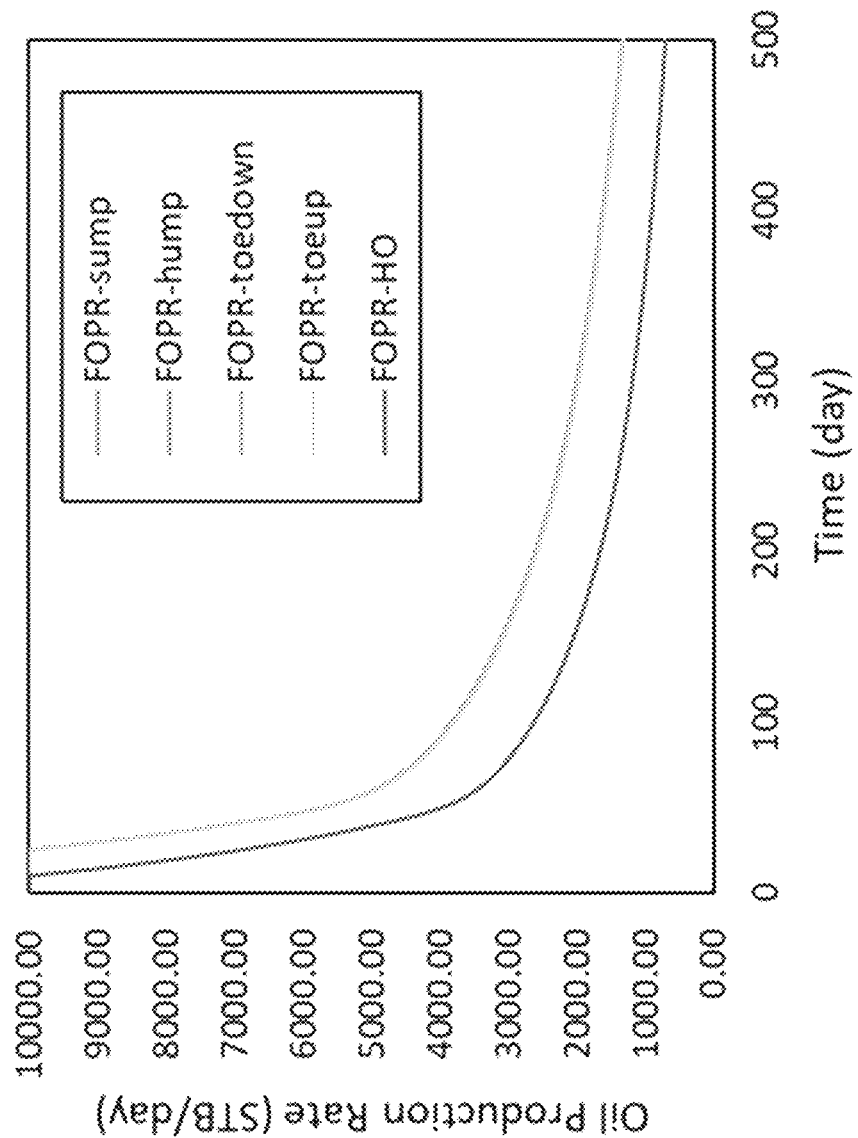
FIG. 22 are plots of forecasted oil production rate (FOPR) [bbls/day] for the four well configurations depicted in FIG. 21. These results are plotted alongside the homogeneous (no slip) flow model (denoted as FOPR-HO where FOPR stands for "Forecasted Oil Production Rate" and "HO" denotes "homogeneous").

Oil production rate forecasts, for all four well configurations, are shown in FIG. 22. Specifically, FIG. 22 depicts plots of forecasted oil production rate (FOPR) [bbls/day] for the four well configurations depicted in FIG. 21 (the first 4 items in the legend). These results are plotted alongside the homogeneous (no slip) flow model (item #5 in the legend, denoted as FOPR-HO). The following observations are drawn:

The new model proved stable for all four well orientations tested. Thus, for upwind solution, the proposed model has proven to be numerically robust and we foresee no reason why such stability will not continue for other upwind solutions.

The results are almost coincident, which is not surprising as inflow along the wellbore does not vary greatly.

The homogeneous flow model, denoted as 'FOPR-HO', differs from those using the proposed model. This is reassuring as it demonstrates the necessity of using a drift-flow model. In other words, it illustrates the impact of considerations of slippage on prediction quality.

The key point to note is that all geometries resulted in a stable solution: the proposed model proved robust for all orientations. The fact that these curves are near-coincident (though not exactly) is an artefact of the simple model used to test the model and was expected. The fact that forecasts using a drift-flux model differ markedly from the no-slip, homogeneous, is significant (and welcomed).

A.9 Discussion

To better understand the differences at the transition between upward and downward inclinations, we analyze OLGA-S data by plotting pipe inclination with gas volume fraction, $\alpha_g$, for different t gas input fractions, $f_g$, in a similar manner described earlier in sub-section A.2.3).

A.9.1 Analysis of Upward and Downward Flow Behavior

Figure 23B:
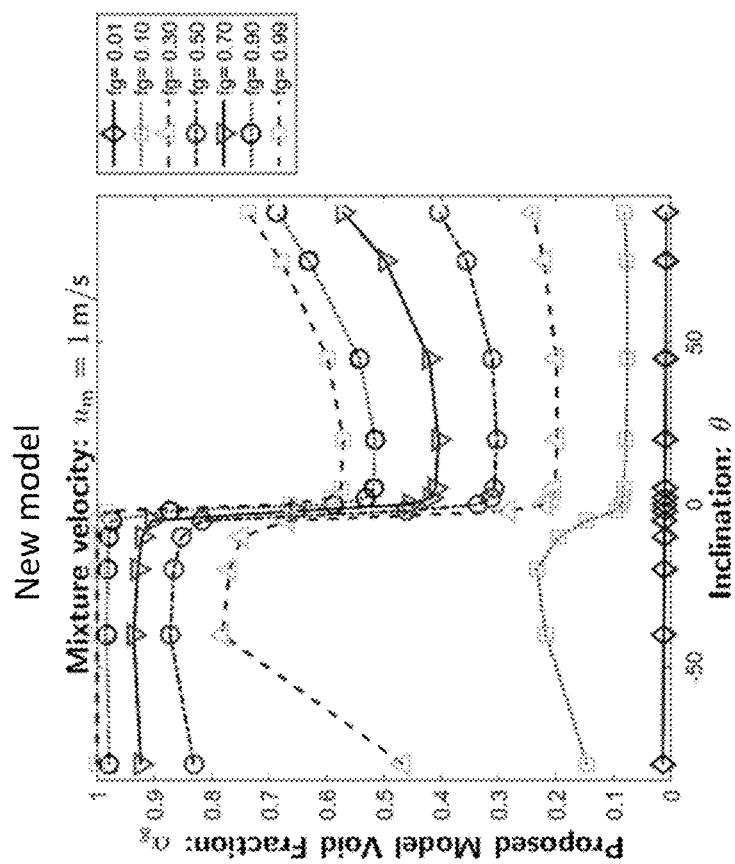
FIGS. 23(a) to 23(d) are plots that show the effect inclination has on $\alpha_g$ as functions of two mixture velocities, $u_m$, and different input gas fractions, $f_g$ for the proposed model compared against OLGA-S over the inclination range: $\{-80° \leq \theta \leq +90°\}$ with input gas fraction being in the range: $\{0.01 \leq f_g \leq 0.99\}$.
Figure 23A:
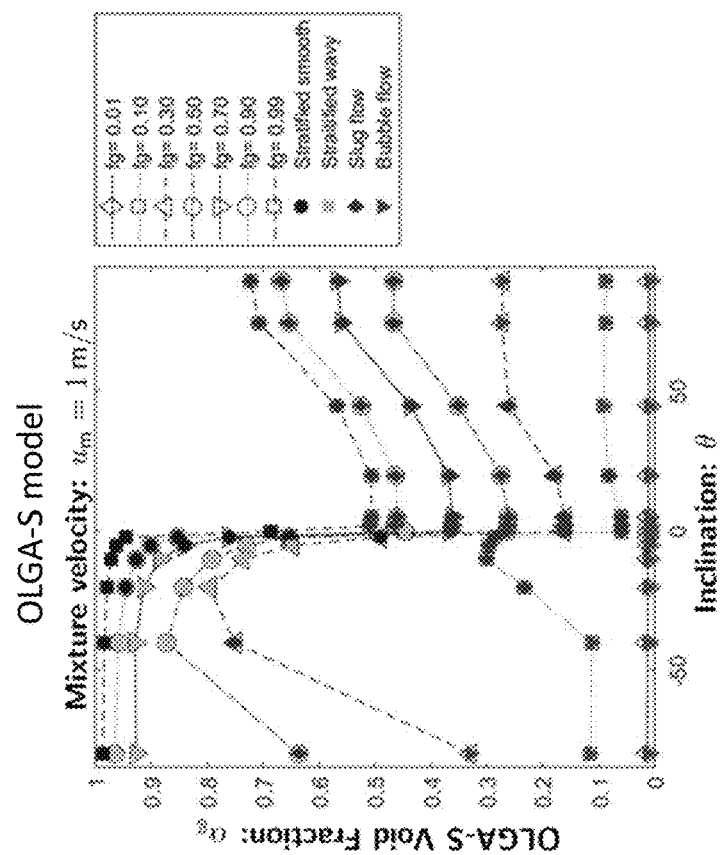
Figure 23D:
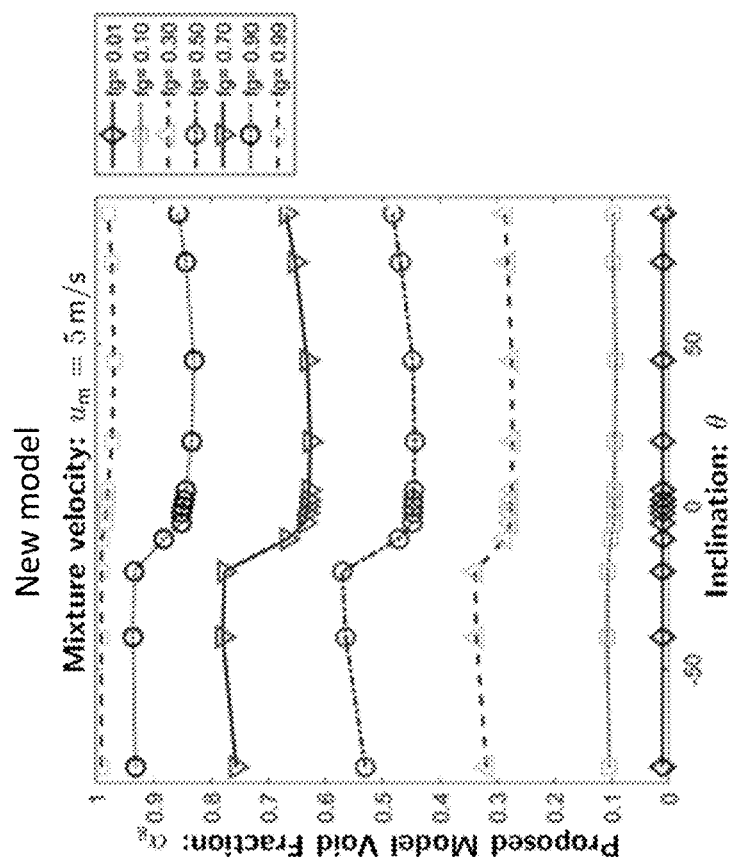
Figure 23C:
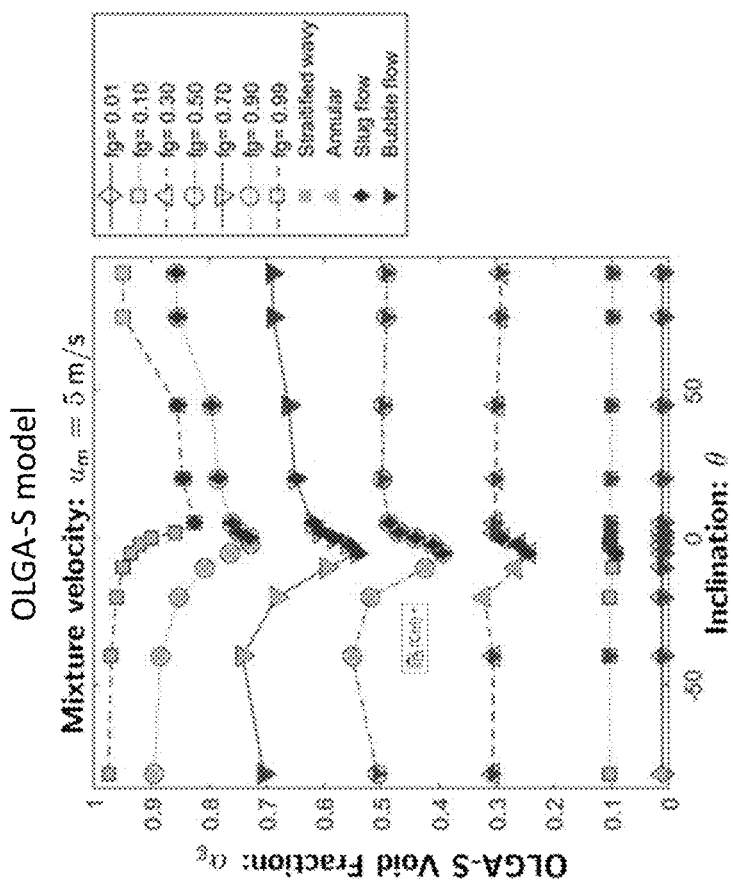

FIGS. 23(a) to 23(d) show the effect inclination has on $\alpha_g$ as functions of two mixture velocities, $u_m$, and different input gas fractions, $f_g$ for the proposed model compared against OLGA-S over the inclination range: {−80°≤$\theta$≤+90° } with input gas fraction being in the range: {0.01≤$f_g$≤0.99}. Marker colors represent different flow regimes. Specifically, FIG. 23(a) shows the void fraction predicted by the OLGA-S model for various input gas fractions where $u_m=1$ m/s. FIG. 23(b) shows the void fraction predicted by the proposed model for various input gas fractions where $u_m=1$ m/s. FIG. 23(c) shows the void fraction predicted by the OLGA-S model for various input gas fractions where $u_m=5$ m/s. FIG. 23(d) shows the void fraction predicted by the proposed model for various input gas fractions where $u_m=5$ m/s. It may be observed that inclination has a significant effect on gas volume fraction at low mixture velocity with low gas fractions. For $u_m=1$ m/s and $f_g=0.99$, gas volume fraction ($\alpha_g$) at $\theta=-2°$ is 38% higher than that observed when $\theta=0°$, and the gas volume fraction at $\theta=+2°$ is 26% lower than that of $\theta=0°$.

At this same mixture velocity ($u_m=1$ m/s), the value of gas volume fraction at $\theta=0°$ is much closer to that observed at $\theta=+20$ than it was for $\theta=-2°$ over the range $\{0.3\leq f_g\leq 0.9\}$. For example, the input gas volume fraction of $f_g=0.7$ at $\theta=+2°$, $\theta=0°$ and $\theta=-2°$ are $\alpha_g=0.363$, $\alpha_g=0.365$ and $\alpha_g=0.759$ respectively. The gas volume fraction differences observed between upward and downward flow reduces as $f_g$ becomes smaller and $u_m$ becomes larger.

Ghajar & Bhagwat[38] (2014) reported similar results to those observed in FIGS. 23(a) to 23(d) by analyzing experimental data over the ranges: $\{-20°\leq\theta\leq+20°\}$ and $\{0.01\leq f_g\leq 0.92\}$. These authors observed a decrease in gas volume fraction when inclination changed from $-20°$ to $+20°$ at low volumetric flow rates of liquid and gas. They suggested that the reason for high gas volume fractions was due to long 'residence time of the gas phase [in the test section] caused by flow stratification at downward inclinations'. The OLGA-S library predicts stratified flow patterns for downward flow and slug flow for upward flow at these low flow rates—which is in keeping with these observations.

A.9.2 Comparison Against Other Models

Figure 24A:
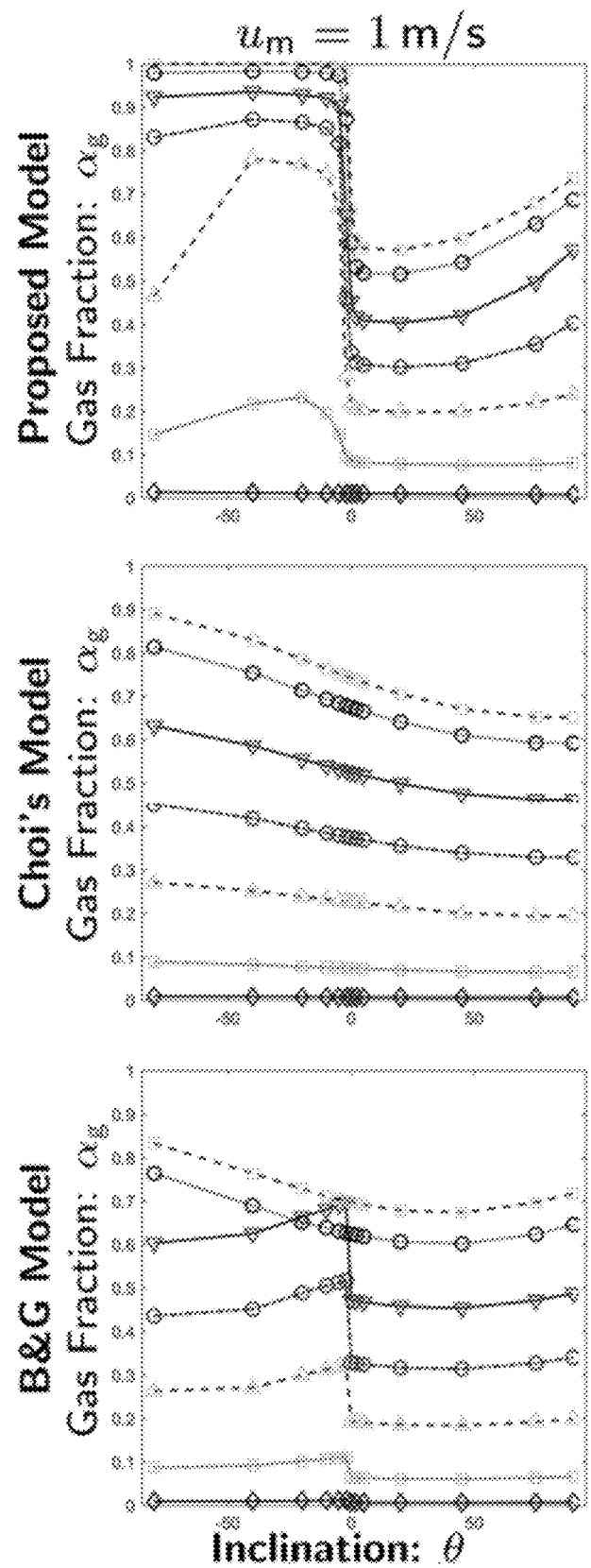
FIGS. 24(a) to 24(b) are plots that depict predictions of $\beta_g$ (gas volume fraction).
Figure 24B:
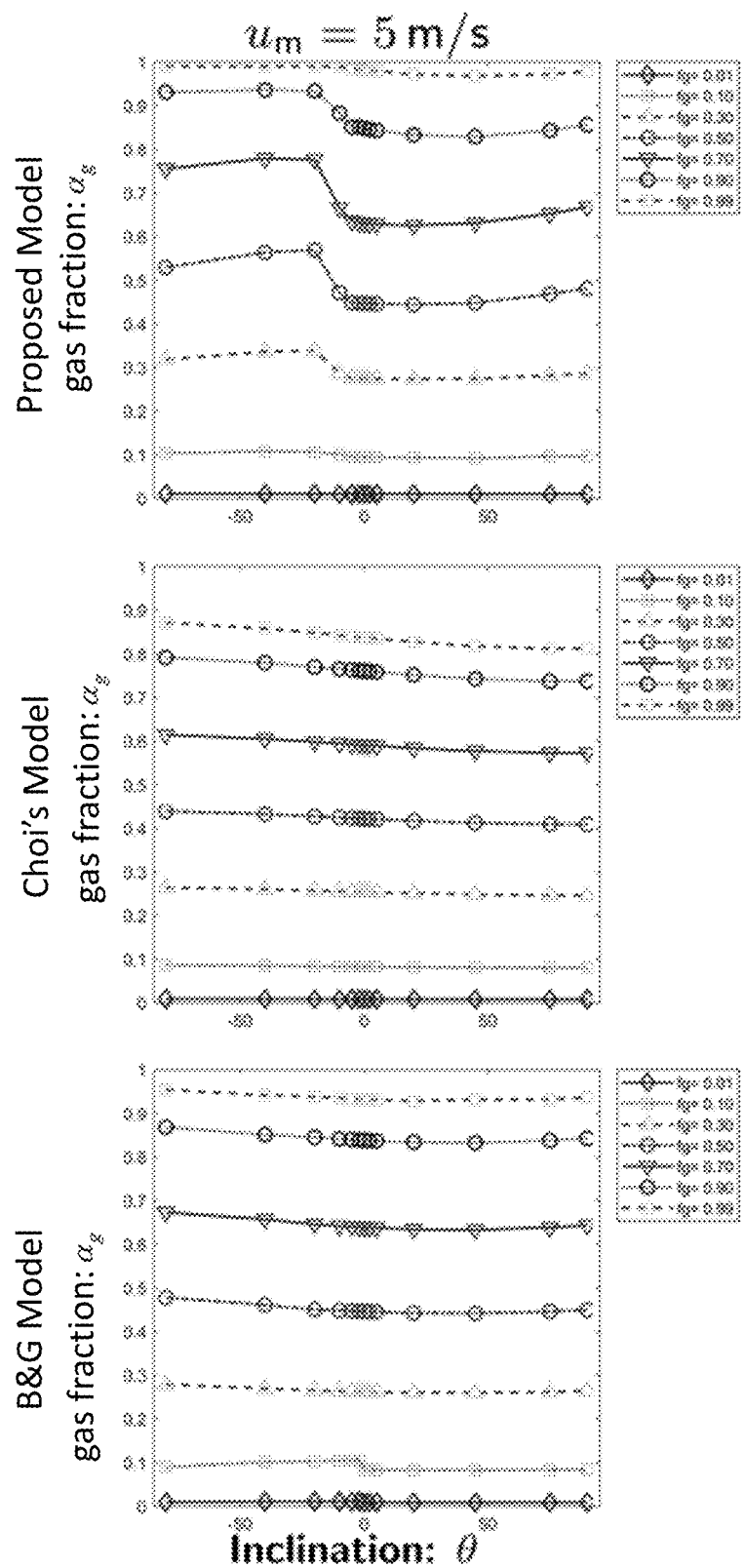

FIGS. 24(a) and 24(b) present gas volume fraction predictions for the proposed model, Choi's model and B&G's model. Specifically, FIGS. 24(a) and 24 (b) are plots that depict predictions of $\alpha_g$ (gas volume fraction) at $u_m=1$ m/s for FIG. 24(a) and at $u_m=5$ m/s for FIG. 24(b). The top plots are for the proposed model, middle plots for Choi's model and the bottom plots are for the B&G model. The different input gas fractions, $f_g$, are denoted by markers (shown in the legends) covering the range: $\{0.01\leq f_g\leq 0.99\}$. The abrupt change in the B&G model at $u_m=1$ m/s is due to the superficial Froude number 'sign flipping criterion' defined in their model.

Consider FIG. 24(a) where $u_m=1$ m/s. The proposed model (top) characterizes gas volume fraction at the horizontal transition reasonably well (i.e., the regions between upward and downward flow). Choi's model (middle) is unable to capture this trend while "B&G's" model (lower) is only partially successful as it does not predict void fraction differences well when $f_g\geq 0.9$, which is mainly due to its superficial Froude number-dependent drift velocity 'sign flipping criterion,' namely: $(N_{Fr})_g^s\leq 0.1$. On the other hand, the proposed model does appear to resemble OLGA-S data over the whole range of input gas fractions, $f_g$.

Now consider FIG. 24(b) where $u_m=5$ m/s. We observe here that gas volume fractions behave almost linearly with respect to $f_g$. The effect of inclination on $\alpha_g$ also appears less significant. Only the proposed model captures the modest impact of inclination on gas volume fraction. Conversely, predictions from Choi and 'B&G' appear to be almost independent of inclination. In the region of high input gas fraction, i.e., $f_g\geq 0.7$, the proposed model and also B&G tend to overpredict $\alpha_g$, while Choi's model tends to underpredict this quantity. This is consistent with the observations shown earlier.

A.9.3 Model Limitations

Although the proposed model represents gas volume fraction trends exhibited by OLGA-S reasonably well, it is less accurate when $u_r\lesssim 2$ m/s. This is particularly noticeable over the following range: $\{0.3\leq f_g\leq 0.7\}$. In general, the stratified flow behavior observed at low mixture velocity (and slightly-downward flow) causes all drift-flux models to have difficulties in prediction. Note that an attempt to capture physics of stratified flow in a simple drift-flux model (refer Bailey et al.[43]) resulted in numerical instabilities in preliminary testing in MSW and this avenue of analysis was terminated. It is also non-trivial to derive a correlation to predict these dramatic changes in $f_g$ at the transition.

Subsequent to the observations by Ghajar & Bhagwat[38] (2014), a revised correlation to improve model response at the transition between stratified and non-stratified flow in downward flow was proposed by Bhagwat & Ghajar[44] (2015). This correlation (not detailed here) is more complex than their previous one (sub-section A.5.2) where the transition criterion involved a Froude number based on $u_g^s$ such that $(N_{Fr})_g^s\leq 0.1$, thereby making it unsuited for our purposes.

For high viscosity oils, some researchers [11, 37, 38] have suggested using a larger value for the profile parameter, i.e., $C_0\approx 2.0$. However, to ensure solution robustness of our model, the profile parameter is restricted to the range $\{1.0\leq C_0\leq 1.2\}$. The optimized parameter set based on the TUFFP dataset has a profile parameter range of $\{1.0\leq C_0\leq 1.088\}$. The optimized parameter set based on the OLGA-S dataset has a constant profile parameter of $C_0=1.0$. Therefore, the current range of validity for the proposed model lies in a low- to medium-viscosity range, roughly $\mu_L\lesssim 70$ cP.

Finally, we have yet to determine practical upper- and lower-bounds for model parameters for purposes of optimization. The current model has 'optimized' parameters defined to mirror TUFFP data and a second set of parameters to mimic OLGA-S data. By how much we may relax these parameters remains unclear at this point.

A.9.4 Brief Comment on Heavy Oils

The upper viscosity threshold stated above (namely $\mu_L\lesssim 70$ cP)) was not driven by any inherent limitation of the model itself, but rather from the nature of the available heavy oil data. At the time of writing, the data (all from TUFFP) comprised 1,116 records from three main studies: Gokcal [37] (2008), Kora [45] (2010) and Jeyachandra [46] (2011). These considered inclinations in the narrow range: $\{-2°\leq\theta\leq+2°\}$, although oil viscosities were quite wide in range, namely: $\{70.57\leq\mu_L\leq 602\}$ (in cP). Also refer to [47, 48, 49, 50] for more detail.

For purposes of prototyping we wanted to limit our data to non-heavy flow in order to avoid any possible 'skewing' parameters due to the effects of heavy oils. This may entail a separate set of optimal parameters (triggered at some as-yet-to-be-determined threshold) or a modification to the model itself (although such extension is not recommended as one would be obliged to repeat all the stability tests described previously).

A.10 Conclusions

A new gas-liquid drift-flux model suitable for all pipe inclinations is proposed. Model parameters are optimized against data from TUFFP and OLGA-S. The model was compared against two state-of-the-art drift-flux models and proved to have comparable, or better, performance. The primary conclusions from the study are as follows:

1. Gas-Liquid two-phase flow becomes stratified at low mixture velocities for slightly downward pipe inclinations, which is difficult for any drift-flux model to represent. However, the proposed model furnishes acceptable results for this problematic flow regime.

2. Gas volume fraction increases sharply at the transition of horizontal-upward to horizontal-downward. This becomes particularly acute at low mixture velocities, roughly $u_m \Box 2$ m/s. The proposed model, however, can represent this trend reasonably well.

3. The proposed model appears to be continuous and differentiable when A=1.0, however as A increases we observe steep transitions in property surface in the model for $u_{dr}^V$. However, with some trepidation, we may venture that this may not pose a problem in any full MSW implementation as the model for $u_{dr}^V$ is well established in MSW already.

4. The proposed model exhibits smoothness and continuity over key parameters.

5. The proposed model retains in its entirety the proven vertical drift velocity ($u_{dr}^V$) model component.

6. The proposed model conforms to the specific input requirements of a fully-coupled model, namely the use of $u^m$ and $f_g$ as inputs, whereas the outputs are $\alpha_g$, $u_g^s$, $u_L^s$.

7. The proposed model has proven stable and robust for up-wind solution over four test cases in the 'GURU-MSW' test harness. Saying that, we acknowledge that the model remains untested on complex operations, such as SAGD \switch-over" situations whereby the well pair has switched from circulation to SAGD injection/production.

8. The proposed model applies when $\mu_L \lesssim 70$ cP; it is not posed for higher viscosity oils.

9. The proposed model appears to have potential for implementation in the commercial MSW. The model may also prove suitable in other applications, such as Clean-up Advisor.

10. The proposed model would appear to be flexible in that (within given bounds) parameters may be optimized (i.e., tuned) to best-fit given data, as demonstrated on the two data sets considered here. The consequence of this is a model that is reasonably consistent over the entire flowing system in a fully-coupled full-field model, such as IAM.

B.1 The Critical Kutateladze Number

The general Kutateladze number [54, 55] is defined as follows:

$$N_{Ku} = u_g \frac{\sqrt{\rho_g}}{\sqrt[4]{\rho_{g-L}(\rho_L - \rho_g)}}. \qquad \text{Eqn. (B.1)}$$

The critical Kutateladze number $N_K$ ($\alpha_g$) (Holmes[4] and Shi et al.[5]) is conditional on $\alpha_g$ and parameters $a_1$ and $a_2$ as shown in FIGS. 25(a) and 25(b). Both figures are extracted from Shi et al.[5]. FIG. 25(a) shows the gas rise velocity in a stagnant liquid column against $\alpha_g$. FIG. 25(b) shows the intermediate Kutateladze number, $N_{Ku}$, as a function of $\hat{D}$. Note that on y-axis of FIG. 25(a) $V_g \equiv u_g$ in this report.

The parameters $\alpha_1$ and $\alpha_2$ represent the end-points of the transition between flooding curves in FIG. 25(a) where $a_1 < a_2$. By combining data on the limits of counter-current flow (under a variety of conditions) and interpolating between them (to avoid discontinuities) we can derive an expression for the gas-liquid drift velocity, which was first described by Holmes[4] in 1977. This honors observations of gas-liquid relative velocities at both low and high gas volume fractions. These yield two different curves: a bubble rise curve—at low values of $\alpha_g$, and a liquid film flooding curve when $\alpha_g$ is not 'low'. Holmes connected these curves with a so-called "flooding curve" as shown in FIG. 25(a). The curve describing rise velocity of gas through a stationary liquid column is given by:

$$(u_g)_{[@u_L=0]} = \frac{u_{dr}^V}{1 - \alpha_g C_0}. \qquad \text{Eqn. (B.2)}$$

At low values of $\alpha_g$, the gas rise velocity, $(u_g)_{[@u_L=0]}$, through a stagnant liquid column was observed by Harmathy [56] to be roughly $1.53 \times u_{ch}$, where $u_{ch}$ is the 'characteristic' velocity given by:

$$u_{ch} = \left(\frac{\sigma_{g-L} g(\rho_L - \rho_g)}{\rho_L^2}\right)^{1/4}. \qquad \text{Eqn. (B.3)}$$

At higher values of $\alpha_g$, a flooding velocity is defined such that the gas velocity is just sufficient to maintain a thin annular film of liquid and prevent it falling back against the ensuing gas flow. Wallis & Makkenchery [57] (1974) defined this criteria as follows:

$$(u_g)_{[@u_L=0]} = N_{Ku}\left(\frac{\rho_L}{\rho_g}\right)^{1/2} u_{ch}. \qquad \text{Eqn. (B.4)}$$

To interpolate between the two extremes shown in FIG. 25(a) the flooding curve of Wallis[58] is used to define the limits of counter-current flow regime and assuming that $C_0$ does not vary with the flow velocity in counter-current flow, Eqn. (A.9) can be derived (as shown in Holmes[4]), namely:

$$u_{dr}^V = \frac{(1 - \alpha_g C_0) C_0 N_{Ku}(\alpha_g) u_{ch}}{\alpha_g C_0 \sqrt{\frac{\rho_g}{\rho_L}} + 1 - \alpha_g C_0}. \qquad \text{Eqn. (B.5)}$$

The critical Kutateladze number, $N_{Ku}$ ($\alpha_g$), is given by:

$$N_{Ku}(\alpha_g) = \qquad \text{Eqn. (B.6)}$$

$$\begin{cases} \dfrac{1.53}{C_0} & \text{when } \alpha_g \leq a_1 \\ N_{Ku}(\hat{D}) & \text{when } \alpha_g \geq a_2 \text{ see Eqn. } (B.8) \\ \dfrac{\left[\left\{\dfrac{1.53}{C_0}\right\}(a_2 - \alpha_g)\right] + \left[N_{Ku}(\hat{D})\Box(\alpha_g - a_1)\right]}{(a_2 - a_1)} & \text{otherwise} \end{cases}$$

while $C_0$ is given by Eqn. (A.6) and simple interpolation is used if values fall between the conditionals stated in Eqn. (B.6). Dimensionless diameter, $\hat{D}$, is given by:

$$\hat{D} = D\sqrt{\frac{g(\rho_L - \rho_g)}{\sigma_{g-L}}}. \quad \text{Eqn. (B.7)}$$

Adrian Ferramosca (in a private communication) suggested the following for $N_{Ku}(\hat{D})$:

$$N_{Ku}(\hat{D}) = \begin{cases} 0 & \text{when } \hat{D} \leq 2 \\ \dfrac{3.587 - 19.105}{\hat{D} + 3.333} & \text{when } 2 \leq \hat{D} \leq 50 \\ 3.2 \text{ Eq.} & \text{otherwise} \end{cases} \quad \text{Eqn. (B.8)}$$

Eqn. (B.8) was implemented in this work and summarized in Table B.1 below.

TABLE B.1

Table of $N_{Ku}(\hat{D})$ against $\hat{D}$.
Values can be accurately matched using Eqn. (B.8).

| $\hat{D}$ | $N_{Ku}(\hat{D})$ |
|---|---|
| 2 | 0.0 |
| 4 | 1.0 |
| 10 | 2.1 |
| 14 | 2.5 |
| 20 | 2.8 |
| 28 | 3.0 |
| 50 | 3.2 |

B.2 The Viscosity Number

The 'viscosity' number, $N_\mu$, is defined as follows:

$$N_\mu = \frac{\mu_L}{[\rho_L - \rho_g](D)^{1.5}\sqrt{g}}. \quad \text{Eqn. (B.9)}$$

B.3 Eötvös Eötvös Number (aka Bond Number)

Weber[59] observed that bubbles will not move in a horizontal tube below a critical value of the Eötvös number [60]. The Eötvös number, $N_{E\ddot{o}}$, is defined as follows:

$$N_{E\ddot{o}} = \frac{[\rho_L - \rho_g]gD^2}{\sigma_{g-L}} \equiv N_{Bo}. \quad \text{Eqn. (B.10)}$$

B.4 Froude Number

The Froude Number [62] is defined as follows with $u_{ch}$ as the velocity term:

$$N_{Fr} = \frac{u_{ch}}{\sqrt{gD}}. \quad \text{Eqn. (B.11)}$$

B.5 Reynolds Number

The mixture Reynolds number [63], using $u_m$ and liquid properties is defined as:

$$(N_{Re})_m = \frac{u_m \rho_L D}{\mu_L}, \quad \text{Eqn. (B.12)}$$

While the two-phase Reynolds Number, also using $u_m$ but with mixture liquid properties is:

$$(N_{Re})_{2p} = \frac{u_m \rho_{2p} D}{\mu_{2p}}, \text{ where} \quad \text{Eqn. (B.13)}$$

$$\rho_{2p} = \rho_L \times (1 - \alpha_g) + \rho_g \times \alpha_g, \text{ and} \quad \text{Eqn. (B.14)}$$

$$\mu_{2p} = \mu_L \times (1 - \alpha_g) + \mu_g \times \alpha_g. \quad \text{Eqn. (B.15)}$$

C. Data Used In the Analysis

The three-phase flow OLGA-S data used in the analysis above is shown below in Table C.1 below.

TABLE C.1

3-phase flow data summary. Total number of data records: 10,080. All data extracted from OLGA-S. The following pipe inclination angles were considered, each inclination with 720 data records:
$\theta \in \{-80°, -45°, -10°, -5°, -2°, -1, 0°, +1, +2°, +5°, +10°, +45°, +75°, +90°\}$.

| | | | |
|---|---|---|---|
| Hold-up & Diameter | $\alpha_L$ [0.004; 0.999] | $\alpha_w$ [$2.161 \times 10^{-5}$; 0.988] | D, [m] [0.0254; 0.1778] |
| Superficial Velocity | $u_w,^s$ [m/s] [$1.659 \times 10^{-5}$; 14.425] | $u_o,^s$ [m/s] [$1.423 \times 10^{-4}$; 14.256] | $u_g,^s$ [m/s] [$2.327 \times 10^{-5}$; 14.995] |
| Density | $\rho_w$, [kg/m³] [963; 997] | $\rho_o$, [kg/m³] [709; 876] | $\rho_g$, [kg/m³] [12.6; 15.6] |
| Viscosity | $\mu_w$, [Pa · s] [0.00300; 0.00086] | $\mu_o$, [Pa · s] [0.00005; 0.05003] | $\mu_g$, [Pa · s] [0.995; 1.197] $\times 10^{-5}$ |
| Surface Tension | $\sigma_{o-g}$, [N/m] [0.0159; 0.0270] | $\sigma_{w-o}$, [N/m] [0.0407; 0.0519] | $\sigma_{w-g}$, [N/m] [0.057; 0.069] |

The two-phase TUFFP data used in the analysis is summarized in Table C.2 below.

TABLE C.2

| Investigator(s) | Data Points | Pipe Inclination θ [degrees] | Pipe Diameter D [cm] | Superficial Velocities Gas $u_g^s$ [m/s] | Superficial Velocities Liquid $u_L^s$ [m/s] | Liquid Viscosity $\mu_L$ [cP] |
|---|---|---|---|---|---|---|
| Abdul-Majeed[64] (2000) | 88 | 0 | 5.08 | [0.196; 48.908] | [0.002; 1.825] | [1.3; 1.9] |
| Akpan[65] (2013) | 277 | 0 | 7.62 | [0.199; 5.458] | [0.137; 1.701] | [0.1; 0.14] |
| Alsaadi[66] (2013) | 277 | [2; +30] | 7.62 | [1.829; 39.992] | [0.010; 0.101] | [0.9; 1.3] |
| Beggs[67] (1973) | 188 | [−10; +10] | 2.54 | [0.299; 25.323] | [0.023; 5.203] | [0.7; 1.6] |
| Brill et al.[68] (1996) | 48 | 0 | 7.79 | [3.629; 12.656] | [0.004; 0.046] | [1.6; 1.8] |
| Caetano[69] (1986) | 478 | 90 | 6.34 | [0.023; 22.859] | [0.002; 3.579] | [0.5; 2.7] |
| Cheremisinoff[70] (1977) | 174 | 0 | 6.35 | [2.582; 25.241] | [0.017; 0.070] | [0.9; 1.2] |
| Eaton[71] (1965) | 238 | 0 | 10.20 | [0.112; 21.901] | [0.011; 2.108] | [0.7; 1.3] |
| Fan[72] (2005) | 351 | [−2; +2] | 5.08 | [4.93; 25.70] | [0.0003; 0.052] | 1.0 |
| Felizola[73] (1992) | 89 | [0; +90] | 5.10 | [0.39; 3.36] | [0.050; 1.490] | [1.3; 4.7] |
| Guner[74] (2012) | 156 | [0; +45) | 7.62 | [1.485; 39.388] | [0.010; 0.100] | 1.0 |
| Johnson[75] (2005) | 984 | [0; +5] | 10.00 | [0.711; 4.523] | [0.019; 0.605] | 1.0 |
| Kouba[76] (1986) | 53 | 0 | 7.62 | [0.302; 7.361] | [0.152; 2.137] | [1.2; 1.8] |
| Magrini[77] (2009) | 140 | [0; +90] | 7.62 | [36.63; 82.32] | [0.003; 0.040] | 1.0 |
| Meng[78] (1999) | 169 | [−2; +2] | 5.08 | [4.6; 26.6] | [0.001; 0.054] | [4.7; 6.3] |
| Minami[79] (1983) | 111 | 0 | 7.79 | [0.475; 16.590] | [0.005; 0.951] | [0.6; 2] |
| Mukherjee[80] (1979) Set #1 | 579 | Down: θ < 0° | 3.81 | [0.037; 41.310] | [0.015; 4.362] | [0.6; 74.4] |
| Set #2 | 133 | Hor.: θ = 0° | 3.81 | [0.037; 41.310] | [0.015; 4.362] | [0.6; 74.4] |
| Set #3 | 634 | Upwards: θ > 0° | 3.81 | [0.037; 41.310] | [0.915; 4.362] | [0.6; 74.4] |
| Rothe et al.[81] (1986) | 39 | [−2, 0] | 17.10 | [0.610; 4.633] | [0.061; 1.830] | 0.88 |
| Roumazeilles[82] (1994) | 113 | [−30: 0] | 5.10 | [0.914; 9.357] | [0.884; 2.438] | [1.4; 2.2] |
| Schmidt[83] (1976) | 291 | +90 | 5.08 | [0.042; 13.146] | [0.012; 3.480] | [1.0; 2.4] |
| Vongvuthipornchal[84] (1982) | 42 | 0 | 7.62 | [0.061; 2.938] | [0.070; 2.146] | [1.1; 1.5] |
| Yuan[85] (2011) | 153 | [+30; +90] | 7.62 | [9.90; 36.00] | [0.005; 0.100] | 1.0 |

Note that Table C.2 is a summary of the 'TUFFP' gas-liquid data used for model parameterization.
The total number of data points is N = 5,805.
Note:
While this data set is referred to as 'TUFFP', much of it is sourced elsewhere (not directly from the Tulsa University Fluid Flow Project itself). This naming, however, denotes that TUFFP (along with Schlumberger) have collated all this (and much more besides) into a single, documented, fully-functioning database (with full attribution).

D. Numerical Implementation: Wellbore & Simulator

Figure 26A:
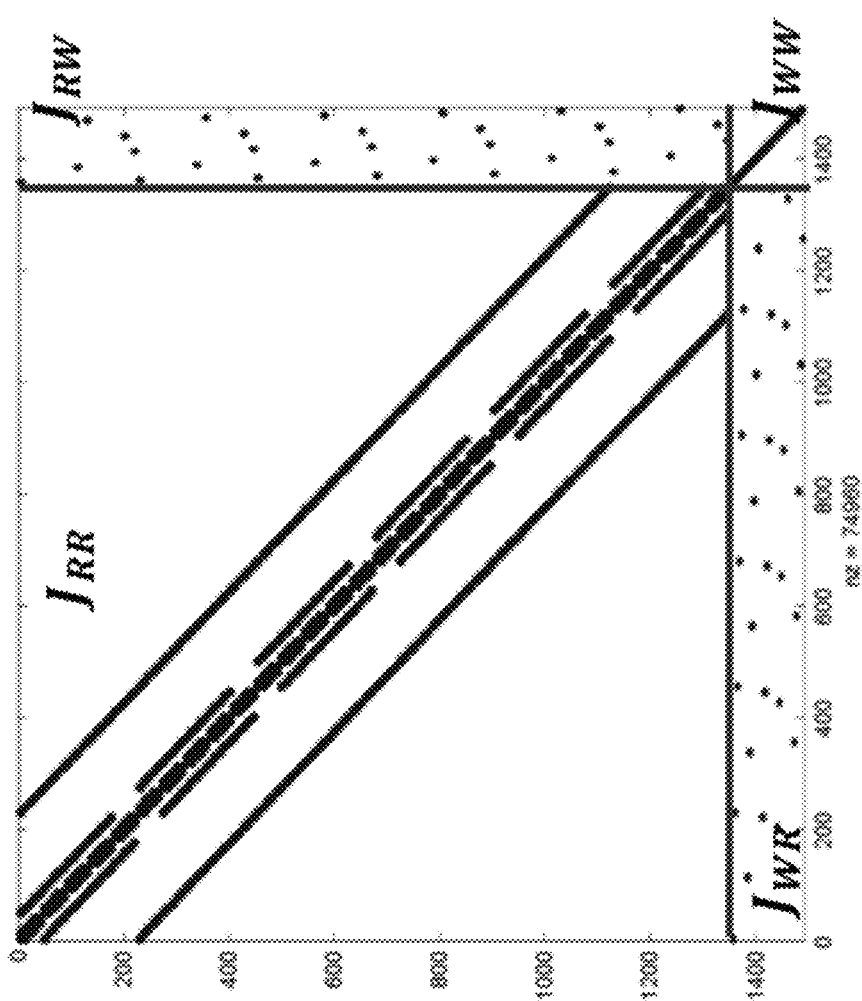
FIG. 26(a) is a schematic diagram of Jacobian matrices for a typical reservoir simulator.
Figure 26B:
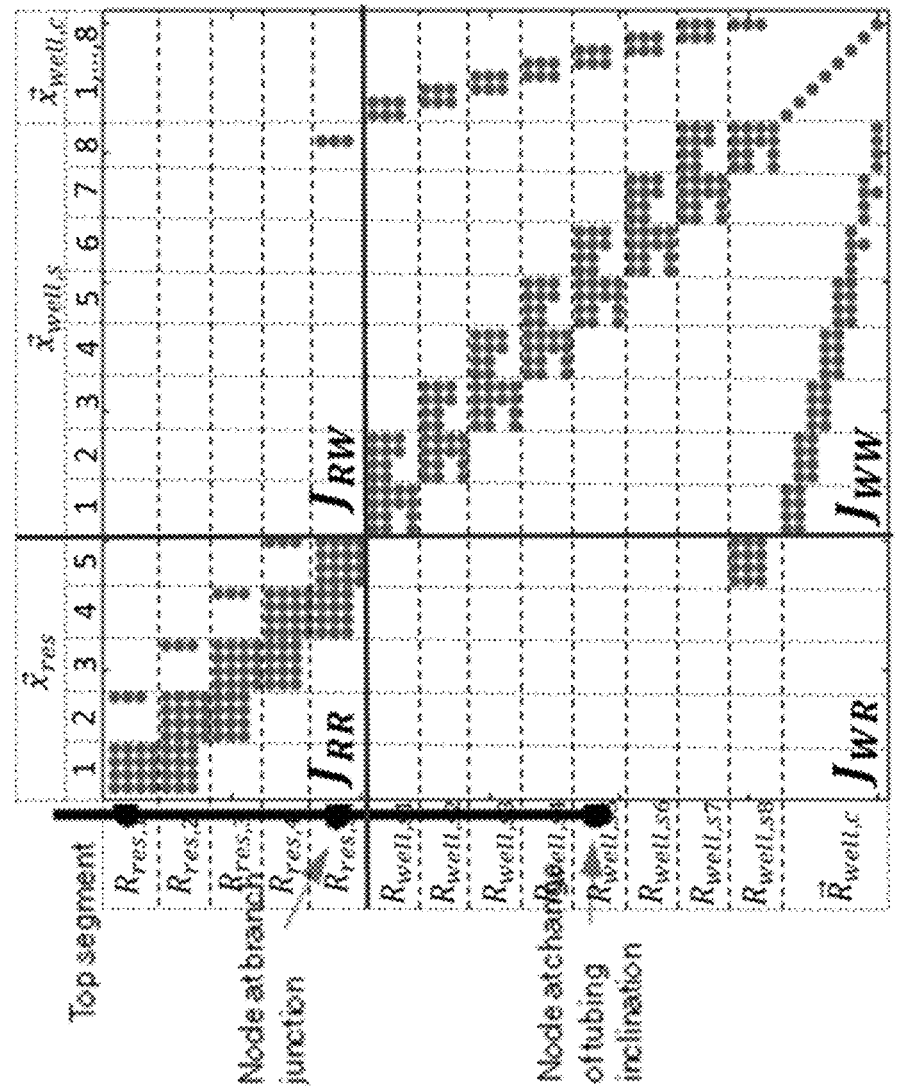
FIG. 26(b) shows Jacobian matrices for a simple, but tightly coupled, MSW model with 5×1 reservoir cells and 8 wellbore segments.

FIGS. 26(a) and 26(b) illustrates how the Jacobian, J, for a simple MSW model becomes considerably more complex, compared to a typical reservoir simulator without a coupled wellbore model defined. FIG. 26(a) shows Jacobian matrices for a typical reservoir simulator (refer Jiang[34]). FIG. 26(b) shows Jacobian matrices for a simple MSW model with 5×1 reservoir cells and 8 wellbore segments (refer Schlumberger ECLIPSE™ manual [6]).

FIG. 26(a) can be interpreted as follows: The dots represent the derivatives of primary equations with respect to primary variables in both sub-figures. FIG. 26(a) was sourced from the PhD thesis of Jiang[34] from Stanford University. The wellbore in this example is represented by a single production control equation, and the relevant primary variable is bottom hole pressure. Note that there are five wells present in FIG. 26(a).

FIG. 26(b) represents the Jacobian matrix of the coupled wellbore-reservoir simulator developed by TAMU and forms part of the dissertation of Hewei Tang (2019). The compositional simulator has the following settings:

- For each reservoir cell, there are ($n_h$+2) primary equations, as well as ($n_h$+2) primary variables where $n_h$ refers to the number of hydrocarbon components. For each wellbore segment, s, there are ($n_h$+2) primary equations, as well as ($n_h$+2) primary variables.
- For each wellbore connection, c, there is 1 primary equation and 1 primary variable.
- There are 2 hydrocarbon components in total.
- Only the 8th wellbore segment is connected (perforated) to the reservoir—in cell 5.
- The dashed lines separate the entries of Jacobian matrix into their respective reservoir and wellbore segment components (5 reservoir cells and 8 wellbore segments). There exist four primary variables/residuals for each reservoir cell and each wellbore segment, demarcated by the solid lines, which separates the Jacobian matrix, J, into four portions, namely:

$J_{RR}$: The derivation of reservoir residual equations with respect to reservoir variables:

$$J_{RR} = \partial \vec{R}_{res} / \partial \vec{x}_{res},$$

$J_{RW}$: The derivation of reservoir residual equations with respect to wellbore variables:

$$J_{RW} = \partial \vec{R}_{res} / \partial \vec{x}_{well},$$

$J_{WR}$: The derivation of wellbore residual equations with respect to reservoir variables:

$$J_{WR} = \partial \vec{R}_{well} / \partial \vec{x}_{res}, \text{ and}$$

$J_{WW}$: The derivation of wellbore residual equations with respect to wellbore variables:

$$J_{RR} = \partial \vec{R}_{well} / \partial \vec{x}_{well},$$

The dimension of Jacobian matrix is 60×60 with the dimension of $J_{RR}$ being 20×20 and the dimension of $J_{WW}$ being 40×40. The lines on the lower-right corner of FIG. 26(b) further separate the $J_{WW}$ into segment-based residuals and connection-based residuals. Note that the vector R represents the vector of residuals of primary variables while subscript s represents a well segment and subscript c represents a well connection.

Table D.1 below shows the number and type of primary variables associated with each residual equation (denoted by R) along with the total number of equations that need to be solved (right-hand column) at every time step. For each reservoir cell, the simulator solves mass balances of each hydrocarbon component, c, and water and a volume balances for phase saturation. For each wellbore segment, the simulator solves the same number of mass balance and volume balance equations. An additional pressure drop equation is then solved for each wellbore segment connection. The pressure drop equation is based on the the mixture velocity $u_m$ as a primary variable. Note that R represents the residuals as stated.

TABLE D.1

| | Residual Equations | Variable | Number | Total |
|---|---|---|---|---|
| Reservoir | Hydrocarbon component, c, mass balance $R_{[c,\ i]}$ | $N_{[c,\ i]}$ | $n_h \times n_{Cells}$ | $(n_h + 2) \times n_{Cells}$ |
| | Water mass balance $R_{[w,\ i]}$ | $N_{[w,\ i]}$ | $1 \times n_{cells}$ | |
| | Volume balance $R_{[v,\ i]}$ | $P_{[o,\ i]}$ | $1 \times n_{cells}$ | |
| Wellbore | Hydrocarbon component, c, mass balance $R_{[c,\ j]}$ | $N_{[c,\ j]}$ | $n_h \times n_{Segs}$ | $(n_h + 2) \times n_{Segs} \times n_{SegsConns}$ |
| | Water mass balance $R_{[w,\ j]}$ | $a_{[w,\ j]}$ | $1 \times n_{Segs}$ | |
| | Volume balance$R_{[v,\ j]}$ | $P_{seg}$ | $1 \times n_{Segs}$ | |
| | Pressure Drop $P_{[p,\ j]}$ | $u_m$ | $1 \times n_{SegsConns}$ | |

Nomenclature

A Parameter used to define $C_0$, Eq. (A.6)
$\alpha_{1,2}$ Parameters used in Eq. (B.6) to define $\kappa_\alpha$
B Parameter used to define Eq. (A.7)
$C_0$ Profile parameter per Eq. (A.6). Sometimes referred to as the 'distribution'parameter [-]
$C_o$ Profile parameter exactly as stated by Choi, Eq. (A.21 (a)) [-]
$C_{o,1}$ Intermediate parameter used in Bhagwat & Ghajar, Eq. (A.22(b)) [-]
D Diameter of conduit [m]
$D_h$ Hydraulic diameter used in Bhagwat & Ghajar, Eq. (A.23) [-]
$\hat{D}$ Dimensionless diameter, Eq. (B.7) [-]
$f_g$ Gas-phase input fraction, defined as $(u^s_g/u_m)$, [-]
$F_{obj}$ Objective function used to optimize model parameters, Eq. (A.19)
$F_v$ Flooding velocity fraction multiplier used in definition of $\beta$, Eq. (A.8). Default, is 1.0
g Acceleration due to gravity, (m/s$^2$)
$f_{fr}$ Fanning friction factor, [-]
J Jacobian
$L_a$ Laplace variable used in Bhagwat & Ghajar, defined by Eq. (A.24)
$m_1$ Multiplier of $u^V_{dr}$ in proposed model, specified as $m_1=1.0$ [-]
$m_2$ Fitted parameter in functional $\mathcal{M}_2$, Eq. (A.13) [θ·s/m]
$m_3$ Fitted parameter in functional $\mathcal{M}_3$, Eq. (A.14) [-]
$\mathcal{M}_2$ Logistic function multiplier to correct for transition at horizontal, Eq. (A.13) [-]
$\mathcal{M}_3$ Multiplier to compensate for divergence when $u_m \lesssim 1$ m/s, see Eq. (A.14) [-]
N Number of data records used in minimization of objective function $F_{obj}$, A.19
$\mathcal{R}$ Residuals used in fully-coupled numerical solution,
$u_{ch}$ Characteristic velocity, Eq. (B.3) [m/s]
$u_{dr}^H$ Horizontal component of drift velocity, Eq. (A.11) [m/s]
$u_{dr}^V$ Vertical component of drift velocity, Eq. (A.9) [m/s]
$u_{dr}^\theta$ Drift velocity for all inclinations, Eq. (A.15) [m/s]
$u_g$ Gas phase velocity, defined by Eq. (A.3) [m/s]
$u_L$ Liquid phase velocity [m/s]
$u_g^s$, $u_o^s$ Mixture velocity, defined by Eq. (A.4) [m/s]
$\mathcal{W}$ Superficial gas and oil velocities, respectively [m/s]

$X_p$ Productivity/Injectivity index, [Sm$^3$/day/Pa]
$X_p$ Vector of parameters used in the new model
$X_{opt.}^{OLGA-S}$ Optimized model parameters using OLGA-S data
$X_{opt.}^{TUFFP}$ Optimized model parameters using TUFFP data
$x_c$, $y_c$ fraction of component c in liquid phase, x, and gas phase, y Greek Symbol $\alpha_{g,o,L,w}$ Void fraction of gas-, oil-, liquid- and water-phases, respectively [-]
$\beta$ Parameter used in $u^V_{dr}$, Eq. (A.8)
$\rho_{g,o,L,w}$ Density of gas-, oil-, liquid- and water-phases, respectively [kg/m$^3$]
$\mu_{g,o,L,w}$ Viscosity of gas-, oil-, liquid- and water-phases, respectively [cP]
$\xi_{1-4}$ Parameters used in definition of $u^H_{dr}$, Eq. (A.11)
$\sigma_{g-L}$ Surface tension between gas and liquid phases [N/m]
$\sigma_{o-g}$ Surface tension between oil and gas phases [N/m]
$\sigma_{w-g}$ Surface tension between water and gas phases [N/m]
$\sigma_{w-o}$ Surface tension between water and oil phases [N/m]
θ Inclination angle of conduit. Defined such that θ=0° represents pure horizontal, θ+90° is upward vertical flow and θ=+90° is downward vertical flow
ε Pipe wall roughness as specified in Fanning friction factor Eq. (A.25) [m]
γ Parameter used in $u^V_{dr}$, Eq. (A.7)

Dimensionless Numbers $N_{E\ddot{o}}$ Ago E"ot"os number per Eq. (B.10) (also known as the 'Bond' number)
$N_{Fr}$ Froude number, Eq. (B.11)
$(N_{Fr})_g^s$ Superficial gas velocity Froude number per Bhagwat & Ghajar, Eq. (A.23)
$N_{Ku}$ General Kutateladze number, Eq. (B.1)
$N_{Ku}(\hat{D})$ Intermediate Kutateladze number, defined by Table B.1 and modelled using Eq. (B.7)
$N_{Ku}(\alpha_g)$ Critical Kutateladze number, Eq. (B.6)
$(N_{Re})_m$ Liquid Reynolds number, Eq. (B.11)
$N_\mu$ Viscosity number, Eq. (B.9)

Acronyms

FFPDP Fluid Flow Project Data Base
FOPR Field Oil Production Rate (stated in STB/day), an output vector of GURU-MSW
GURU General Unstructured Reservoir Utility, MATLAB-driven simulator coupled with an MSW proxy to evaluate model performance
MSW Multi-Segmented Wellbore
TUFFP Tulsa University Fluid Flow Project
OLGA-S The steady state solution of the OLGA simulator

REFERENCES

[1] Tang, M., Hasan, A. R. and Killough, J.: "Development and Application of a Fully Implicitly Coupled Wellbore/Reservoir Simulator To Characterize; the Transient Liquid Loading in Horizontal Gas Wells." paper SPE-187354-PA, *SPE Journal* 23, 2018, pp. 1-15. Originally presented at the Annual Technical Conference & Exhibition of the SPE, San Antonio, Tex. 9-11 Oct. 2017.

[2] Bhagwat, S. W. and Ghajar. A. J.: "A Flow Pattern Independent Drift Flux Model Based Void Fraction Correlation for a Wide Range of Gas-Liquid Two Phase Flow." *International Journal of Multiphase Flow*, Elsevier, 59, 2014, pp. 186-205.

[3] Woldesemayat, M. A. and Ghajar, A.: "Comparison of Void Fraction Correlation for Different Flow Patterns in Horizontal and Upward Inclined Pipes," *International Journal of Multiphase Flow*, 33, No. 4, April 2007, pp. 347-370.

[4] Holmes, J. A.; "Description of the Drift-Flux Model in the LOCA Code RELAP-UK," *Institute of Mechanical Engineers*, UK, 1977, pp. 103-108.

[5] Shi, H. Holmes. J. A., Durlofsky, L. J., Aziz. K., Diaz, L. R., Alkaya, B. and Oddie. G.: "Drift-Flux Modeling of Two-Phase Flow in Wellbores," paper SPE-84228-PA, *SPE Journal*, 10, No. 1, March 2005, pp. 24-33. Originally presented at the SPE Annual Technical Conference & Exhibition, Denver, Colo. 5-8 Oct. 2003.

[6] ECLIPSE: Reference Manual. Schlumberger, Abingdon, U K. 2018.

[7] Hasan, A. R. and Kabir, C. S.: "A Simplified Model for Oil/Water Flow hi Vertical and Deviated Wellbores," paper SPE-54131-PA, *SPE Production & Facilities*, 14, No. 1, February 1999, pp. 50-62, Originally presented as paper SPE-49163 at the SPE Annual Technical Conference & Exhibition, New Orleans, La., 28-30 Sep. 1998.

[8] Shippen, M. and Bailey W. J.: "Steady State Multiphase Flow—Past, Present and Future with Flow Assurance Perspective," in special issue of ACS Publications titled 'Upstream Engineering anti Flow Assurance' (UEFA). *Energy & Fuels*, 26, No. 7, July/August 2012, pp. 4145-4157. Originally presented at the AIChE Upstream and Flow Assurance Forum, Houston, Tex. 1-4 Apr. 2012.

[9] Livescu, S., Durlofsky. L. J. Aziz, K. and Ginestra, J. C., "A Fully-Coupled Thermal Multiphase Wellbore Flow Model for Use in Reservoir Simulation," *Journal Petroleum Science & Engineering*, 71, Nos. 3-4, April 2010, pp. 138-146.

[10] Pan, L. and Oldenburg, C. M.: "T2 Well—An Integrated Wellbore-Reservoir Simulator," *Computers & Geosciences*, Elsevier, Holland, 65, April 2014, pp. 46-55.

[11] Choi, J., Pereyra, E., Serica, C., Park, C. and Kang, J. M.: "An Efficient Drift-Flux Closure Relationship to Estimate Liquid Holdups of Gas-Liquid Two-Phase Flow in Pipes," *Energies*, 5, 14 Dec. 2012, pp. 5295-5306.

[12] Zuber. N. Fiudlay, J. A.: "Average Volumetric Concentration in Two-Phase Flow Systems," *Journal of Heat Transfer, Trans*, ASME, 26, No. 3, November 1965, pp. 453-408.

[13] Bendiksen, K. H.; "An Experimental Investigation of the Motion of Long Bubbles in Inclined Tubes," *International Journal of Multiphase Flow*, 10. No. 1, August 1984, pp. 467-183.

[14] Isao, K. Mamorn. I.: "Drift Flux Model for Large Diameter Pipe and New Correlation for Pool Void Fraction," *International Journal of Heat & Mass Transfer*, 30, No. 9, September 1987, pp. 1927-1939.

[15] Bailey. W. J. and Jumeau, F.: Report OFSR-rn-2015-193-MM-C "Drift Velocity Correlation for 2-Phase Flow," Schlumberger-Doll Research, Cambridge, Mass., 17 Dec. 2015.

[16] Beu-Mansour, A., Sharma, A. K., Jeyachandra, B. C., Gokcal, B., Al-Sarkhi, A. and Sarica, C.: "Effect of Pipe Diameter and High Oil Viscosity on Drift Velocity for Horizontal Pipes," *BHR Croup*, 2-4 Jun. 2010, pp. 237-248. Originally presented at the 7th North American Conference on Multiphase Flow Technology, Banff, Canada.

[17] Jeyachandra, B. C., Gokcal, B., Al-Sarkhi, A., Sarica, C. and Sharma, A. K.: "Drift-Velocity Closure Relationships for Slug Two-Phase High-Viscosity Oil Flow in Pipes" paper SPE-151616-PA, *SPE Journal*, 17, No. 2, June 2012, pp. 593-601. Originally presented at the Annual Technical Conference & Exhibition of the SPE, Tuscany Italy. 20-22 Sep. 2010.

[18] Zukoski, E. E.: "influence of Viscosity, Surface Tension, and Inclination Angle on Motion of Long Bubbles in Closed Tubes," *Journal of Fluid Mechanics, Trans.* ASME, 25, No. 4, August 1966, pp. 821-837.

[19] Bhagwat, S. W. Ghajar, A. J.: "Similarities and Differences in the Flow Patterns and Void Fraction in Vertical Upward and Downward Two Phase Flow," *Experimental Thermal & Fluid Science*, Elsevier, 39, 2012. pp. 213-227.

[20] Oladade, P., Bailey, W. J. and Stone, T.: Report OFSR-rn-2013-029-MM-C "Gas-Liquid Drift-Flux Model For All Inclinations," Schlumberger-Doll Research, Cambridge, Mass., February 2013.

[21] Oladade, P. and Bailey, W. J.: Report OFSR-rn-2013-155-MM-C "A Comparison of Drift-Flux Models Against a Large Multiphase Flow Data Bank," Schlumberger-Doll Research, Cambridge, Mass., September 2013.

[22] Press, W. H., Flannery, B. P., Tbukolsky, S. A. and Vetterling, W. T.: *Numerical Retypes in C: The Art of Scientific Computing.* Cambridge University Press, Cambridge, UK, 1988.

[23] Landman, M. J.: "Non-Unique Holdup and Pressure Drop in Two-Phase Stratified Inclined Pipe Flow," *International Journal of Multiphase Flow*, 17, No. 3, May-June 1991, pp. 377-394.

[24] Padsalgikar, A.: "TUFFP Experimental Database (FFPDB)," presentation to the TUFFP Advisory Board Meeting, University of Tulsa Fluid Flow Projects (TUFFP), University of Tulsa, Okla., 22 Sep. 2015.

[25] PIPESIM: Production System Analysis Software User Manual, Schlumberger, AbTC, Abingdon, UK, 2017.

[26] Cioncolini, A. and Thome, J. R.: "Void Fraction Prediction in Annular Two-Phase Flow." *International Journal of Multiphase Flow*, 43, July 2012, pp. 72-84.

[27] Colebrook, C. F. and White, C. M.: "Experiments with Fluid Friction in Roughened Pipes," *Proceedings of the Royal Society Series A: Math. Phys. Set.*, London. UK, 161, No. 904, 1937. pp. 367-381.

[28] Colebrook, C. F.: "Turbulent Flow in Pipes with Particular Reference to the Transition Region Between Smooth and Rough Pipe Laws," *Journal of Institute of Civil Engineering*, London, UK. 11, 1938/1939, pp. 133-156.

[29] Nikuradse, J.; "Ströranogsestze in Raulum Rohren," (Transl. "Laws of Flow in Rough Pipes,") *Forschungs-*

*Arbeit des Ingenieur-Wesens, VDI Forschungsheft,* Berlin, 1933, p. 361. Republished (in English) in *NACA TM* 1950, pp. 1292

[30] Yildirim, G.: "Computer-Based Analysis of Explicit Approximations to the Implicit Colebrook-White Equation in Turbulent Flow Friction Factor Calculation," *Advances in Engineering Software*, 40, No. 11, November 2009, pp. 1183-1190.

[31] Kataoka, I. and Ishii, M.: "Drift Flux Model for Large Diameter Pipe and New Correlation for Pool Void Fraction," *International Journal of Heat & Mass Transfer*, 30, 1987, pp. 1927-1939.

[32] Eghorieta, R. A., Afolabi, T. A., and Panacharocnsawad, E.: "Drift Flux Modeling of Transient High-Viscosity-Liquid and Gas Two-Phase Flow in Horizontal Pipes," *Journal of Petroleum Science & Engineering*, Elsevier, 171, December 2018, pp. 605-617.

[33] Xu, Z., Song, X., Li, G., Wu, K., thing, Z. and Zhu, Z.: "Development of a Transient Non-Isothermal Two-Phase Flow Model for Gas Kick Simulation in HTHP Deep Well Drilling," *Applied Thermal Engineering*, 141, August 2018, pp. 1055-1069.

[34] Jiang, Y.: "Techniques for Modeling Complex Reservoirs and Advanced Wells," PhD thesis, Department of Petroleum Engineering, Stanford University, C A, 2008.

[35] Tang, H., Chai, Z. and Killough. J.; "Application of Multi-Segmented Well Modelling to Simulate Well Interference," B. N. Petrov and F. Czáki, (Eds), Society of Exploration Geophysicists (SEG), Proc., Unconventional Resources Technology Conference, Austin, Tex., 24-26 Jul. 2017. pp. 419-429.

[36] Beggs, H. D. and Brill, J. P.: "A Study of Two-Phase Flow in Inclined Pipes," *J. Petroleum Technology, Trans., AIME*. 25, No. 5, May 1973, pp. 607-617.

[37] Gokeal. B.: "An Experimental and Theoretical Investigation of Sing Flow for High Oil Viscosity in Horizontal Pipes," PhD thesis, Dept. Petroleum Engineering, University of Tulsa, Okla., 2008.

[38] Ghajar, A. J. and Bhagwat. S. W.: "Gas-Liquid Two Phase Flow Phenomenon in Near Horizontal Upward and Downward Inclined Pipe Orientations," *International Journal of Mechanical Aerospace, Industrial & Mechatronics Engineering*, 8, No. 6, 2014, pp. 1030-1053.

[39] Shi, H., Holmes, J. A., Durlofsky, L. J., Aziz, K., Diaz, L. R., Alkaya, B. and Oddie, G.: "Drift-Flux Parameters for Three-Phase Steady-State Flow in Wellbores," paper SPE-89836-PA, *SPE Journal*, 10, No. 2, June 2005, pp. 130-137. Originally presented at the SPE Annual Technical Conference & Exhibition, Houston, Tex., 26-29 Sep. 2004.

[40] Yau, B.: "Development of General unstructured Reservoir Utility and Fracture Reservoir Modeling," PhD thesis, Department of Petroleum Engineering, Texas A&M University, May 2017,

[41] Tang, H.: "Development and Application of a Fully Implicitly Coupled Wellbore-Reservoir Simulator," PhD thesis, Department of Petroleum Engineering, Texas A&M University, 2019.

[42] Peng. D.-Y. and Robinson, D. B.: "A New Two-Constant Equation of Slate," *Industrial & Engineering Chemistry Fundamentals*, 15, No. 1, February 1976, pp. 59-64.

[43] Li, Y., Bailey, W. J., Rashid, K., Court, B., Shippen, M. E. and Holmes, J. A.: "Optimized Parameters and Extension of a 2-Phase Flow-Regime-Independent Flow Model," paper #39, Proc., Hunt, Alex P. (Ed.), 15th International Conference on Multiphase Technology, Cannes, France. BHR Group Limited, Cranfield, Bedfordshire, UK, 15-17 Jun. 2011, pp. 225-239.

[44] Bhagwat, S. W. and Ghajar, A. J.: "An Empirical Model to Predict the Transition Between Stratified and Non-stratified Gas-Liquid Two-Phase Flow in Horizontal and Downward Inclined Pipes." *Heat Transfer Engineering*, 86, No. 18, 2015, pp. 1485-1494.

[45] Kora, C.: "Effects of High Viscosity on Slug Liquid Holdup in Horizontal Pipes,", Masters Thesis, Department of Petroleum Engineering, University of Tulsa, Okla., 2010.

[46] Jeyachandra, B. C.: "Effect of Pipe Inclination on Flow Characteristics of High Viscosity Oil-Gas Two-Phase Flow," Masters thesis, Department of Petroleum Engineering, University of Tulsa, Okla., 2011.

[47] Kora, C., Sarica, C., Zhang, H.-Q., Al-Sarkhi, A. and Al-Safran, E. M.: "Effects of High Oil Viscosity on Slug Liquid Holdup in Horizontal Pipes," paper CSUG/SPE 146954, presented at the Canadian Unconventional Resources, Calgary, Alberta, Canada, 15-17 Nov. 2011.

[48] Al-Safran, E. M., Kora, C. and Sarica, C.: "Prediction of liquid Volume Fraction in Slugs in Two-Phase Horizontal Pipe Flow With High Viscosity Liquid," paper BHR-2013-H4, BHR Group. Proc. 16th International Conference on Multiphase Production Technology, Cannes, France, 12-14 Jun. 2013, pp. 415-428.

[49] Al-Safran, E. M., Kora, C. and Sarica, C.: "Prediction of Slug Liquid Holdup in High Viscosity Liquid and Gas Two-Phase Flow in Horizontal Pipes," *J. Petroleum Science & Engineering*, Elsevier, Holland, 133, September 2015, pp. 566-575.

[50] Jeyachandra, B. C., Sarica, C., Zhang, H.-Q. and Pereyra, E. J.: "Effects of Inclination on Flow Characteristics of High Viscosity Oil/Gas Two Phase Flow," paper SPE 159217, presented at the SPE Annual Technical Conference & Exhibition, San Antonio, Tex., 8-10 Oct. 2012.

[51] Li, Y., Bailey, W. J., Couët. B., Rashid, K., Shippen, M. and Holmes, J.: Report OFSR-rn-2001-121-MM-C "Development of a 2-phase Flow-Regime-Independent Multiphase Flow Model," Schlumberger-Doll Research, Cambridge. Mass., June 2011.

[52] Bailey, W. J., Li, Y., Couët, B. Raebid. K., Shippen, M. and Holmes, J.: "Two-Phase Flow-Regime-Independent Flow Model," *Schlumberger Journal of Modeling & Simulation*, 3, June 2012, pp. 75-83.

[53] Stone, T., Damns, C. E. P., Woiceshyn, G, Law, D. H-S. Brown, G. Olapade, P. and Bailey, W. J.: "Advanced Wellbore Simulation of Row Control Devices with Feedback Control for Thermal Operations," paper SPE-161594, presented at the SPE Reservoir Simulation Symposium, The Woodlands, Tex., 18-20 Feb. 2013.

[54] Kutateladze, S. S.: "On tire Transition to Film Boiling Under Natural Convection," *Kotloturbostroenie*, 3, 1948.

[55] Kutateladze. S. S.: Fundamentals of Heal Transfer. Academic Press, New York, N.Y., 1963.

[56] Harmathy, T. Z.: "Velocity of Large Drops and Bubbles in Media of Infinite and Restricted Extent," *AIChE Journal* 6, No. 2, June 1960, pp. 281-288.

[57] Wallis. G. B. and Makkenchery, "The Hanging Film Phenomenon in Vertical Annular Two Phase Flow," *Journal of Fluids Engineering, Trans*, ASME, Series I. 96. No. 3, September 1974, pp. 297-298.

[58] Walks, G. B., One-Dimensional Two-Phase Flow, 2nd Edition, McGraw-Hill Book Co. Inc., New York, N.Y., 1969.

[59] Weber, M. E.: "Drift in Intermittent Two-Phase Flow in Horizontal Pipes," *Canadian Journal of Chemical Engineering*, 59, No. 3, June 1981, pp. 398-399.

[60] Baron Loránd Eötvös de Vásárosnamérry, Roland *Eötvös Gesammelte Arbeiten*, (Tranl.: Roland Eötvös Collected Works), Akadémiai Kiado, Budapest, Hungary. Edited by P. Selényi, 1953. Author often cited as Roland, Baron von Eötvös

[61] Bond, W. N.: "Tire Viscosity of Air," *Proceedings of The Physical Society*, 49, No. 3, 1937.

[62] Fronde, W.: *On The Rolling Of Ships*, Parker, Son And Bourn, West Strand, London, UK, 1862.

[63] Reynolds, O.: "An Experimental Investigation of the Circumstances Which Determine Whether the Motion of Water Shall Be Direct Or Sinuous, and of the Law of Resistance in Parallel Channels," *Philosophical Transactions of the Royal Society*, 174, 1883, pp. 935-982.

[64] Abdul-Majeed, G. H.: "Liquid Slug Holdup in Horizontal and Slightly Inclined Two-Phase Slug Flow," *Journal of Petroleum Science & Engineering*. Elsevier, Holland, 27, No. 12. July 2000, pp. 27-32.

[65] Akpan, I. B.: "Two-Phase Metering," Masters thesis, Department of Petroleum Engineering, University of Tulsa. Okla., 1980.

[66] Alsnadi. Y.: "Horizontal Slug Flow Modeling and Metering," PhD thesis, Department of Petroleum Engineering, University of Tulsa, Okla., 2013.

[67] Beggs. H. D. "An Experimental Study of Two-Phase Flow in Inclined Pipes," PhD thesis, Department of Petroleum Engineering, University of Tulsa, Okla., 1973.

[68] Brill, J., Chen, X. T., Flores, J. G. and Marcano, R.: "1995 Final Report: Transportation of Liquids in Multiphase Pipelines under Low Liquid Loading Conditions," Eighty-Sixth Research Report submitted to The Pennsylvania State University, University Park. Pa., Tulsa University Fluid Flow Projects (TUFFP), University of Tulsa, Okla., February 1996.

[69] Caetano, E. F.: "Upward Vertical Two-Phase Flow Through an Annulus," PhD thesis, Department of Petroleum Engineering, University of Tulsa, Okla., 1986.

[70] Cheremsinoff, N. P.: "Experimental and Theoretical Investigation of Horizontal Stratified and Annular Two-Phase Flow with Heat Transfer," PhD thesis, Clarkson College of Technology, Potsdam, N.Y. 1977.

[71] Eaton, B. A.: "The Prediction of Flow Patterns, Liquid Holdup and Pressure Losses Occurring During Continuous Two-Phase Flow in Horizontal Pipes," PhD thesis, Department of Petroleum Engineering, University of Texas at Austin (TAMU), TX, 1965.

[72] Fan, Y.: "An Investigation of Low Liquid Loading Gas-Liquid Stratified Flow in Near-Horizontal Pipes," PhD thesis, Department of Petroleum Engineering, University of Tulsa, Okla., 2005.

[73] Felizola, H.: "Slug Flow in Extended Reach Directional Wells," Master thesis, Department of Petroleum Engineering, University of Tulsa. Okla., 1992.

[74] Gnner. M.: "Liquid Loading of Gas Wells with Deviations from 0 to 45," PhD thesis. Department of Petroleum Engineering, University of Tulsa, Okla., 2012.

[75] Johnson, G. W.: "A Study of Gas-Liquid Pipe Flow," PhD thesis, Faculty of Mathematics and Natural Sciences, University of Oslo, Norway, August 2005. (ISSN: 1501-7710).

[76] Kouba, G.: "Horizontal Slug Flow Modeling and Metering," PhD thesis, Department of Petroleum Engineering, University of Tulsa, Okla., 1986.

[77] Magrini, K. L.: "Liquid Entrainment in Annular Gas-Liquid Flow in Inclined Pipes," Masters thesis, Department of Petroleum Engineering, University of Tulsa, Okla., 2009.

[78] Meng. W.: "Low Liquid Loading Gas-Liquid Two-Phase Flow in Near-Horizontal Pipes," PhD thesis, Department of Petroleum Engineering. University of Tuba, O.K., 1999.

[79] Minami. K.: "Liquid Holdup in Wet-Gas Pipelines," Masters thesis, Department of Petroleum Engineering, University of Tulsa, Okla., 1983.

[80] Mukherjee, H.: "An Experimental Study of Inclined Two-Phase Flow," Fluid Flow Projects Sixteenth Research Report. PhD thesis, Department of Petroleum Engineering, University of Tulsa, Okla., 1979.

[81] Rothe, P. H., Crowley, O. L. and Sam, R. G.: "Investigation of Two-Phase Flow in Horizontal at Large Pipe Size and High Gas Density," Technical Report, AGA Pipeline Research Committee Project PR 172-507, 8, 1986.

[82] Roumazeilies, P.: "An Experimental Study of Downward Slug Flow in Inclined Pipes," Masters thesis, Department of Petroleum Engineering. University of Tulsa, Okla., 1994.

[83] Schmidt, "Experimental Study of Gas-Liquid Flow in a Pipeline-Riser Pipe System," Masters thesis, Department of Petroleum Engineering, University of Tulsa, Okla., 1994.

[84] Vougvuthiporuchai, S.: "Experimental Study of Pressure Wave Propagation in Two-Phase Mixtures," PhD thesis, Department of Petroleum Engineering, University of Tulsa, Okla., 1982.

[85] Yuan, G.: "Liquid Loading of Gas Wells," Masters thesis. Department of Petroleum Engineering, University of Tulsa, O K, 2011.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

All references, including publications, patent applications and patents, cited herein are hereby incorporated by reference to the same extent as if each reference were individually and specifically indicated to be incorporated by reference and were set forth in its entirety herein.

Although only a few example embodiments have been described in detail above, those skilled in the art will readily appreciate that many modifications are possible in the example embodiments without materially departing from this invention. By way of example only, while particular definitions of $\mathcal{M}_2$ and $\mathcal{M}_3$ were provided and include particular constants, it will be appreciated that other constants could be provided as long as $\mathcal{M}_2$ is a function of mixture velocity and $\mathcal{M}_3$ is a function that accounts for flow rate (via Reynold's number or an equivalent thereof). Accordingly, all such modifications are intended to be included within the scope of this disclosure as defined in the following claims. In the claims, means-plus-function clauses, if any, are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

The invention claimed is:

1. A method of optimizing hydrocarbon production of a subterranean reservoir of hydrocarbons traversed by at least one multi-segmented wellbore (MSW), comprising:
    gathering information regarding the subterranean reservoir, wherein gathering the information comprises receiving logging information from at least one flow control device disposed between the subterranean reservoir and the at least one MSW;
    providing the information to a reservoir simulator incorporating a gas-liquid drift-flux (DF) model that is based on mixture velocity within the pipe, wherein the DF model accounts for pipe inclinations between $-90°$ and $+90°$ of the at least one MSW; wherein the DF model is defined according to $$u_{dr}^\theta = (m_1\{u_{dr}^V\}\sin\theta + M_2\{u_{dr}^H\}\cos\theta) \times M_3,$$

where $u_{dr}^\theta$ is the drift velocity for a given pipe inclination angle $\theta$ between $-90°$ and $+90°$,
    $u_{dr}^V$ and $u_{dr}^H$ are respectively the vertical and horizontal drift velocities,
    $m_1$ is a multiplier for the vertical drift velocity,
    $\mathcal{M}_2$ is a multiplier that corrects for transition at horizontal ($\theta = 0°$), and
    $\mathcal{M}_3$ is a multiplier that compensates for divergence when mixture velocity $u_m$ is below a selected threshold value; and
    running the reservoir simulator to generate a solution to optimize hydrocarbon production of the subterranean reservoir, wherein the solution comprises one or more optimized settings for the at least one flow device.

2. The method of claim 1, wherein the at least one MSW includes a segment inclined within two degrees of horizontal.

3. The method of claim 1, wherein the DF model allows a user to specify segments of the at least one MSW that experience a number of different flow types through adjacent segments of the at least MSW, wherein the number of different flow types include upward flow, downward flow, upward-to-downward flow, downward-to-upward flow, and pure horizontal flow.

4. The method of claim 1, wherein the solution specifies at least one of location and operational parameters for downhole equipment along a completion of the at least one MSW for production.

5. The method of claim 4, further comprising using the solution to build the completion or control the downhole equipment, and producing hydrocarbons from the completion.

6. The method of claim 1, wherein the selected threshold value is 1 m/s.

7. The method of claim 1, wherein $m_1 = 1$.

8. The method of claim 1, wherein $$u_{dr}^V = \frac{(1-\alpha_g C_0) C_0 N_{Ku}(\alpha_g) u_{ch}}{\alpha_g C_0 \sqrt{\rho_g/\rho_L} + 1 - (\alpha_g C_0)}$$

where $\alpha_g$ is the void fraction of the gas phase obtained from a determination of the reservoir simulator, $N_{Ku}$ is the critical Kutateladze number,
$u_{ch}$ is a characteristic velocity,
$\rho_g$ is the density of the gas phase,
$\rho_L$ is the density of the liquid phase, and
$C_0$ is a profile parameter.

9. The method of claim 8, wherein $C_0=1$.

10. The method of claim 1, wherein:

$$u_{dr}^H = \sqrt{gD}\left(\xi_1 - \xi_2\left[\frac{(N_\mu)^{\xi_3}}{(N_{E\ddot{o}})^{\xi_4}}\right]\right)\alpha_g(1-\alpha_g),$$

where g is the gravity constant,
D is the diameter the conduit,
$\xi_1, \xi_2, \xi_3$, and $\xi_4$ are horizontal flow fitting parameters,
$N_\mu$ is a viscosity number, and
$N_{E\ddot{o}}$ is an Eotos number.

11. The method of claim 1, wherein $\mathcal{M}_2$ is a function of a mixture velocity, and $\mathcal{M}_3$ is a function of a mixture Reynold's number.

12. The method of claim 11, wherein $$\mathcal{M}_2 = \left[1 - \frac{2}{1 + \exp[50\,\sin(\theta + m_2 u_m)]}\right]$$

where $m_2$ is a fitted parameter and $u_m$ is the mixture velocity.

13. The method of claim 11, wherein $$\mathcal{M}_3 = \left[1 + \frac{1000}{(N_{Re})_m + 1000}\right]^{m_3}$$

where $m_3$ is a fitted parameter and $(N_{Re})_m$ is the mixture Reynold's number.

14. A processor-based system that stores program instructions that, when executed on the system, cause the system to perform the method of claim 1.

15. A computer-readable medium storing program instructions that, when executed by a processor, cause the processor to perform the method of claim 1.

16. The method of claim 1, further comprising automatically modifying operation of the at least one flow control device based on the one or more optimized settings of the at least one flow device of the solution.

17. The method of claim 1, wherein the solution comprises an optimized production pressure of the at least one MSW, and wherein the method further comprises automatically modifying a production pressure of the at least one MSW based on the optimized production pressure of the solution.

18. The method of claim 1, wherein the at least one flow control device comprises a choke, a valve, a labyrinth device, a downhole separator, or a combination thereof.

19. The method of claim 1, wherein the DF model accounts for pipe inclinations between −90° and +2° of the at least one MSW.

\* \* \* \* \*